US00RE48379E

(19) United States
(12) Reissued Patent
Ho et al.

(10) Patent Number: US RE48,379 E
(45) Date of Reissued Patent: Jan. 5, 2021

(54) ELECTRONIC-INTEGRATION COMPATIBLE PHOTONIC INTEGRATED CIRCUIT AND METHOD FOR FABRICATING ELECTRONIC-INTEGRATION COMPATIBLE PHOTONIC INTEGRATED CIRCUIT

(71) Applicant: OptoNet Inc., Evanston, IL (US)

(72) Inventors: Seng-Tiong Ho, Wheeling, IL (US); Yingyan Huang, Wilmette, IL (US)

(73) Assignee: Electronic Photonic IC Inc. (EPIC Inc.), Wheeling, IL (US)

(21) Appl. No.: 14/321,362

(22) Filed: Jul. 1, 2014

Related U.S. Patent Documents

Reissue of:
(64) Patent No.: 8,213,751
Issued: Jul. 3, 2012
Appl. No.: 12/626,178
Filed: Nov. 25, 2009

U.S. Applications:
(60) Provisional application No. 61/200,315, filed on Nov. 26, 2008.

(51) Int. Cl.
*G02B 6/00* (2006.01)
*H01L 21/00* (2006.01)
*G02B 6/43* (2006.01)
*G02B 6/30* (2006.01)

(52) U.S. Cl.
CPC ..... *G02B 6/43* (2013.01); *G02B 6/305* (2013.01)

(58) Field of Classification Search
CPC ..... G02B 6/305; G02B 6/43; G02B 2006/12166; G02B 6/30; G02B 6/42; G02B 6/26
USPC ..... 385/14, 1, 131, 43; 438/29, 31
See application file for complete search history.

(56) References Cited

U.S. PATENT DOCUMENTS 2,861,229 A * 11/1958 Pankove ..... H01L 21/00 148/33.5
4,735,677 A * 4/1988 Kawachi et al. ..... 438/25
4,750,799 A * 6/1988 Kawachi et al. ..... 385/14
4,820,046 A 4/1989 Sohma et al.
(Continued)

OTHER PUBLICATIONS

International Search Report and Written Opinion for PCT/US2015/049386 dated Dec. 22, 2015.

*Primary Examiner* — Charles R Craver
(74) *Attorney, Agent, or Firm* — Christopher M. Scherer; DeWitt LLP

(57) ABSTRACT

An electronic-integration compatible photonic integrated circuit (EIC-PIC) for achieving high-performance computing and signal processing is provided. The electronic-integration compatible photonic integrated circuit comprises a plurality of electronic circuit structures and a plurality of photonic circuit structures. The electronic and photonic circuit structures are integrated by a process referred to as monolithic integration. An electronic circuit structure includes one or more electronic devices and a photonic circuit structure includes one or more photonic devices. The integration steps of electronic and photonic devices are further inserted into standard CMOS process. The photonic circuit structures and the electronic circuit structures are integrated to form the electronic-integration compatible photonic integrated circuit device.

67 Claims, 56 Drawing Sheets

(56) References Cited

U.S. PATENT DOCUMENTS 4,852,116 A * 7/1989 Takiguchi ..... H01S 5/12 372/102
4,861,128 A * 8/1989 Ishikawa ..... G11B 7/1384 346/33 A
5,123,070 A * 6/1992 Bradley ..... H01S 5/026 372/32
5,208,878 A * 5/1993 Thulke ..... H01L 27/15 257/E27.12
5,237,629 A * 8/1993 Hietala ..... G02F 1/025 333/138
5,250,462 A * 10/1993 Sasaki ..... B82Y 20/00 148/DIG. 26
5,334,551 A * 8/1994 Komatsu ..... G02B 6/131 385/129
5,395,793 A * 3/1995 Charbonneau ..... B82Y 20/00 257/E21.086
5,416,861 A * 5/1995 Koh ..... G02B 6/12007 385/14
5,471,440 A * 11/1995 Isobe ..... G11B 11/10543 369/110.02
5,471,552 A * 11/1995 Wuu ..... G02B 6/136 216/24
5,621,837 A * 4/1997 Yamada ..... G02B 6/42 385/88
5,757,106 A * 5/1998 Sato ..... H01L 41/107 310/359
5,761,350 A * 6/1998 Koh ..... G02B 6/4212 385/14
5,960,131 A * 9/1999 Fouquet ..... G02B 6/3538 385/16
6,021,239 A * 2/2000 Minami ..... G02B 6/34 359/900
6,169,838 B1 1/2001 He et al.
6,238,943 B1 * 5/2001 Kobayashi ..... G02B 6/12004 372/45.01
6,339,662 B1 1/2002 Koteles et al.
6,370,306 B1 * 4/2002 Sato ..... B82Y 20/00 385/12
6,374,001 B1 * 4/2002 Bozeat ..... G02F 1/025 385/131
6,393,185 B1 * 5/2002 Deacon ..... 385/50
6,922,508 B2 * 7/2005 Glebov et al. ..... 385/43
6,999,670 B1 * 2/2006 Gunn, III ..... G02F 1/025 385/131
7,045,374 B2 * 5/2006 Lee ..... H01S 5/227 385/126
7,166,520 B1 * 1/2007 Henley ..... H01L 21/2007 257/E21.122
7,283,233 B1 10/2007 Ho et al.
7,359,588 B2 * 4/2008 Kang ..... B82Y 20/00 385/1
7,426,328 B2 * 9/2008 Zhou ..... G02B 6/32 359/652
7,428,362 B2 * 9/2008 Hyde ..... B82Y 20/00 385/129
7,486,845 B2 * 2/2009 Black ..... B29D 11/00759 359/489.11
7,643,719 B1 * 1/2010 Zhou ..... G02B 3/0087 385/129
7,713,767 B2 * 5/2010 Chan ..... G02B 6/132 257/E21.598
7,783,140 B2 * 8/2010 Wang ..... G02B 1/00 385/14
7,831,115 B2 * 11/2010 Bchir ..... G02B 6/02042 385/127
7,920,268 B2 * 4/2011 Song ..... G01N 21/7703 250/336.2
8,379,458 B1 * 2/2013 Or-Bach ..... H01L 21/76254 365/177
8,462,338 B1 6/2013 Ho et al.
2003/0035632 A1 * 2/2003 Glebov et al. ..... 385/43
2003/0044118 A1 * 3/2003 Zhou ..... G02B 6/1228 385/43
2003/0140317 A1 * 7/2003 Brewer ..... H01L 21/6835 257/211
2004/0001368 A1 * 1/2004 Huggins ..... G11C 11/155 365/200
2004/0063322 A1 * 4/2004 Yang ..... B81C 1/00357 438/689
2004/0202440 A1 * 10/2004 Gothoskar ..... G02B 6/1228 385/129
2006/0264004 A1 * 11/2006 Tong ..... H01L 21/76254 438/455
2007/0029043 A1 * 2/2007 Henley ..... B29C 63/0013 156/717
2007/0122097 A1 * 5/2007 Schmidt ..... G01N 21/0303 385/131
2007/0158787 A1 * 7/2007 Chanchani ..... B81C 1/00238 257/619
2007/0248308 A1 * 10/2007 Feng ..... B82Y 20/00 385/129
2011/0058584 A1 * 3/2011 Ohno ..... B82Y 20/00 372/45.01
2011/0091147 A1 * 4/2011 Hashimoto ..... B82Y 20/00 385/2
2013/0278677 A1 * 10/2013 Vaeth ..... B41J 2/1628 347/40

* cited by examiner

ELECTRONIC-INTEGRATION COMPATIBLE PHOTONIC INTEGRATED CIRCUIT AND METHOD FOR FABRICATING ELECTRONIC-INTEGRATION COMPATIBLE PHOTONIC INTEGRATED CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATION

This application claims the priority of U.S. provisional patent application, Ser. No. 61/200,315, filed Nov. 26, 2008, titled, 'ELECTRONIC-INTEGRATION COMPATIBLE PHOTONIC INTEGRATED CIRCUIT AND METHOD FOR FABRICATING ELECTRONIC-INTEGRATION COMPATIBLE PHOTONIC INTEGRATED CIRCUIT', the contents of which are herein incorporated by reference.

FIELD OF THE INVENTION

This invention relates generally to the field of Integrated Circuits and more specifically to Photonic Integrated Circuits that are compatible with Electronic Device Integration.

BACKGROUND OF THE INVENTION

An electronic Integrated Circuit (IC) is a device having integration of electronic circuits and components onto the surface of a substrate of a semiconductor material by processes of fabrication. The substrate materials include, but are not limited to, silicon (Si), Silicon on insulator (SOI), germanium (Ge), indium phosphide (InP), gallium arsenide (GaAs), gallium nitride (GaN) etc. Majority of the electronic integrated circuits; however, are fabricated on silicon due to their low cost of fabrication and the high reliability of silicon electronics. GaAs, InP, and GaN are used only occasionally. For example, GaAs and InP are used when high speed is required and GaN is used when high power is required. In electronics, an integrated circuit can also be referred to as a microcircuit, a microchip, a silicon chip, or simply a chip. Integrated circuits include a combination of active electronic devices with passive components onto a single semiconductor crystal. The examples of active electronic devices include, but are not limited to, transistors, diodes etc. The examples of passive components include, but are not limited to, resistors, capacitors, inductor etc. The processes involved in the fabrication of integrated circuits can include, but are not limited to, vapor-phase deposition of semiconductors and insulators, oxidation, solid-state diffusion, ion implantation, vacuum deposition and sputtering etc.

Electronic Integrated Circuits (ICs) have demonstrated a combination of low cost, high reliability, low power requirements, and high processing speeds compared to the previously existing techniques of vacuum tubes and discrete transistors. Applications of Integrated circuits include, but are not limited to, computing, communications, manufacturing and transport systems, the Internet, computers, cellular phones, and other digital appliances.

A Photonic Integrated Circuit (PIC) is a device that integrates multiple photonic functions. The difference between the PIC and an IC is that the PIC process signals are imposed on optical beams while IC process signals are imposed on electrical currents or voltages. These optical beams typically have wavelengths ranging from the UV/visible spectrum (200-750 nm) to near Infrared spectrum (750 nm-1650 nm). The Photonic Integrated Circuit can also be interchangeably referred to as an Integrated Optical Circuit. The materials used for the fabrication of PICs include, but are not limited to, silica ($SiO_2$) on silicon, silicon on insulator (SOI), various polymers and compound semiconductor materials such as GaAs, InP, and GaN. Integrated photonic devices can also be classified into "passive photonic devices" that do not consume or exchange energy; "emissive/absorptive photonic devices" that involve light emission, optical gain, and absorption, or electronic energy level transitions that give rise to the spontaneous emission, stimulated emission, or absorption of photons; "electro-optic devices" that require an applied electrical voltage or current but do not require optical emission/absorption for their main functionalities; and nonlinear optical devices that involve nonlinear-optical properties of materials. Passive devices include, but are not limited to, optical beam splitters, optical wavelength filters, optical resonators, optical waveguides, optical wavelength multiplexers, optical couplers, optical polarizers, optical isolators, polarization rotators etc. Emissive devices include, but are not limited to, optical amplifiers, lasers, and light-emitting devices. Absorptive devices include photodetectors etc. Electro-optic devices include, but are not limited to, electro-optic modulators, electro-optic phase shifters, electro-optic switches, etc. Nonlinear-optical devices include second harmonic generators, photonic transistor, and all-optical switches etc. Emissive/absorptive, electro-optic, and nonlinear optical devices together are part of "active devices" that are devices that consume or exchange energy. Beside the above, there are other active devices such as opto-mechanical devices that involve mechanical power but the above are the main classes of active photonic devices of interest here. These active devices of interest are sometimes classified into optoelectronic devices (those that involve applied electrical power) and all optical devices that do not involve applied electrical power. All optical devices are typically devices that involve direct interaction of light with light. These nomenclatures are not always precise in usage and are defined above specifically for their application here.

The fabrication techniques for PIC are typically similar to the fabrication techniques used in ICs. In the fabrication process, the PIC devices that can be mounted on a PIC chip include, but are not limited to, the above mentioned passive, active, and electro-optic devices, with applications ranging from the field of fiber-optic communication, computing, sensing, to biomedical.

Typically photonic integrations are of two types; namely, Hybrid and Monolithic integrations. Monolithic integration involves "wafer-level" processes that result in many devices on a single substrate. Hybrid integration involves fabrication of individual devices separately before placing them together to form a subsystem in a packaged module. Monolithic integration can take advantage of the economy of scale much better than hybrid integration, as the production cost per wafer in monolithic integration does not vary too much with wafer size. However, larger wafer size provides integration of many devices on the wafer, resulting in much lower cost of manufacturing per device. The production of monolithic photonic integrated circuits involves construction of the PIC devices on a common substrate using wafer-level processes.

The most common function of the PIC device is to optically transmit data. Optical Data Transmission requires various steps such as sending light by using lasers, splitting the light into different wavelengths by using wavelength multiplexers or optical filters or optical resonators, encoding data by using modulators or direct current modulation of semiconductor lasers, and receiving data by using photo detectors, as are known to those skilled in the art. Further, the optical data transmission also requires low loss interconnect waveguides. As is known to those skilled in the art, the Optical Data Transmission using photonic circuit typically is capable of substantially higher data transfer rates than Electrical Data Transmission using electronic circuit, and at the same time eliminates problems resulting from electromagnetic interference. PICs can allow optical systems to be more compact and perform higher functionally as compared to discrete optical components.

A main challenge in photonic device integration is that photonic devices are typically large in size as compared to the electronic devices. They have typical sizes of hundreds of micrometers to millimeters or centimeters. As known to those skilled in the art, to address the challenge, photonic devices that are much smaller in size have been realized recently by utilizing photonic device waveguide structures that have high refractive index contrast between the waveguide core and waveguide cladding. These photonic devices are referred to as dielectric 'nanophotonic devices'. As is known to those skilled in the art, dielectric nanophotonic devices include, but are not limited to, photonic bandgap devices, photonic crystal devices, microring resonators, microdisk resonators, super-prisms, photonic crystal based slow or fast wave devices, photonic-wire waveguides, and nano-lasers. There are also small photonic devices realized with photonic device structures that involve electron plasma in metals, which are referred to as plasmonic nanophotonic devices. The dielectric and plasmonic nanophotonic devices below will be referred to as nanophotonic devices. As is known to those skilled in the art, plasmonic nanophotonic devices include, but are not limited to, plasmonic waveguides, plasmonic lasers, plasmonic ring and disk resonators, plasmonic photonic crystals, surface plasmon devices, plasmonic slow-wave devices, plasmonic fast-wave devices, and negative dielectric or negative refractive index devices. The optoelectronic or all-optical versions of such devices will be referred to as nano-optoelectronic devices and nano all-optical devices, respectively. Nanophotonic devices have typical device sizes of nanometers to hundreds of micrometers at the optical wavelength of about one micrometer and are substantially smaller than conventional photonic devices. As is known to those skilled in the art, the physical size of the device scales somewhat proportionally to the electromagnetic wavelength of operation. Hence, the physical size examples given here are not absolute but shall scale somewhat proportionally to the electromagnetic wavelength of operation.

Photonic integrated circuits and electronic integrated circuits complement each other in fulfilling the demanding performance requirements of high-speed communications and high-performance computing etc. However, at present photonics and electronics are still handled by different materials platforms and technologies. While ultra-large-scale integration of electronics has become a reality, the large-scale monolithic integration of high-performance photonic circuits on a chip is still largely unaccomplished. It is expected that if photonic devices and electronic devices can be integrated in large scale on a same chip, new functionalities can be brought that will combine the high data transport rate of photonics with the high data processing speed of electronics, resulting in an integrated Electronic-Photonic Integrated Circuit (EPIC) that will be much faster than IC or PIC alone.

In light of the foregoing, there exists a need for a technology that could realize integration of photonic devices on a chip in a way that is compatible with electronic device integration.

At present, majority of the large-scale electronic integrated circuits are fabricated with silicon material and majority of the active photonic or nanophotonic devices are fabricated with compound semiconductor materials such as InP, GaAs, or GaN. The fabrication process of electronic devices for silicon electronics such as those used in fabricating CMOS (Complementary Metal Oxide Semiconductor) transistors involve temperatures around 1000° C. Most compound semiconductors cannot withstand such high temperatures without suffering from chemical decomposition. A method that will address such incompatibility and enable the fabrication of photonic or nanophotonic devices in a way that will be compatible with electronic devices will be of interest.

Furthermore, current photonic integrated circuit technology is not favorable due to various issues, including the difficulty in achieving low-loss and cost-effective coupling of light from optical fiber into the photonic chip, the cost of integration of compatible optoelectronic and all-optical devices on the chip, the integration of optoelectronic devices on the chip, the integration of the newer generation of nanophotonic and nano-optoelectronic devices on the chip, and the integration of passive photonic devices on the chip.

In light of the foregoing, there exists a need for a technology that could achieve large scale integration of photonic devices on a chip with efficient and cost-effective optical coupling to optical fiber, and that could achieve low fabrication cost in the integration of compatible optoelectronic and all optical devices on the chip, the integration of optoelectronic devices on the chip, the integration of the newer generation of nanophotonic and nano-optoelectronic devices on the chip, and the integration of passive photonic devices on the chip, and preferably do so in a way that is compatible with electronic device integration.

SUMMARY

An object of the present invention is to provide a method and system for monolithic integration of active and/or passive photonic and/or nanophotonic devices in a way that is compatible with electronic integration, resulting in an electronic-integration-compatible photonic-integrated circuit (EIC-PIC).

Another object of the invention is to provide a system for integration of photonic and/or nanophotonic and electronic devices on a single substrate.

Yet another object of the present invention is to provide a method and system for monolithic integration of active and/or passive photonic and/or nanophotonic devices in a way that is compatible with electronic integration resulting in an electronic-integration-compatible photonic-integrated circuit (EIC-PIC) with a single optical waveguiding layer known as Single-Optical-Layer EIC-PIC.

Yet another object of the present invention is to provide a method and system for monolithic integration of active and/or passive photonic and/or nanophotonic devices in a way that is compatible with electronic integration resulting in an electronic-integration-compatible photonic-integrated circuit (EIC-PIC) with an optical waveguiding core layer and another active optical layer put on the waveguiding core layer known as Direct Double-Optical-Layer EIC-PIC (DDOL-EIC-PIC).

Yet another object of the present invention is to provide a method and system for monolithic integration of active and/or passive photonic and/or nanophotonic devices in a way that is compatible with electronic integration resulting in an electronic-integration-compatible photonic-integrated circuit (EIC-PIC) with an optical waveguiding core layer and another active optical layer put on the waveguiding core layer inter-spaced with a dielectric layer known as Indirect Double-Optical-Layer EIC-PIC (IDDOL-EIC-PIC).

Yet another object of the present invention are to couple light beam up and down between the waveguiding core layer and the active optical layer in Indirect Double-Optical-Layer EIC-PIC (IDDOL-EIC-PIC) using an optical tapered waveguide.

Yet another object of the present invention is to provide a method and system for monolithic integration of active and/or passive photonic and/or nanophotonic devices and their process insertion into the electronic device fabrication process (e.g. CMOS process).

Yet another object of the present invention is to provide a method and system for the monolithic integration of semiconductor or compound semiconductor active/passive devices and their process insertion into the electronic device fabrication process (e.g. CMOS process).

Yet another object of the invention is to provide a method and system for integration of photonic and/or nanophotonic integrated circuits on a single substrate with a means to couple light from one or more optical fibers into the photonic integrated circuits and/or from the photonic integrated circuits into one or more optical fibers. The means of coupling light involves an integrated Super-high-numerical-aperture GRIN lens (Super lens).

Yet another object of the invention is to provide a method and system for integration of photonic and/or nanophotonic and electronic integrated circuits on a single substrate with electronic device fabrication compatible process (e.g. CMOS compatible process) based on local-area wafer bonding.

Yet another object of the invention is to provide an electronic device fabrication compatible process (e.g. CMOS compatible process) that requires local-area wafer bonding be done after the high-temperature processes for fabricating transistors.

Yet another object of the invention is to provide an electronic device fabrication compatible process (e.g. CMOS compatible process) that involves local-area wafer bonding process bonding small areas of photonic gain and/or absorptive materials on different areas of the substrate.

Yet another object of the invention is to provide a method and system for integration of active/passive photonic and/or nanophotonic integrated circuits on a single substrate using Quantum-Well Intermixing.

Yet another object of the invention is to provide an EIC-PIC chip with high-data-rate signal input-output provided by one or more optical fibers to the chip. Each optical fiber carries one or more optical beams. Each optical beam is lightwave at an optical wavelength carrying a wavelength channel. The optical beam for each wavelength channel is modulated in amplitude and/or phase to transmit signals.

Yet another object of the invention is to provide an EIC-PIC chip with integrated photonic devices on the chip to enable separation of beams carrying different wavelength channels to different photodectectors. A device that separates the wavelength channels is referred to as wavelength demultiplexing device.

Yet another object of the invention is to provide an EIC-PIC chip with integrated photonic devices on the chip to enable combining of beams from different on-chip lasers emitting different wavelength channels to a single waveguide and then coupled out to a single optical fiber. A device that combines the wavelength channels is referred to as wavelength multiplexing device.

Yet another object of the invention is to provide an EIC-PIC chip with the wavelength multiplexing and/or demultiplexing device realized by a curved grating with high spectral resolution and compact physical size known as compact curved grating (CCG) or super-compact grating (SCG).

Yet another object of the invention is to provide an EIC-PIC chip with one or more all-optical devices on the chip.

Yet another object of the invention is to provide an EIC-PIC chip with the all optical device being an efficient all-optical device known as photon transistor based on Gain and Absorption Manipulation of Coupler Interference (GAMCI).

Yet another object of the invention is to provide an EIC-PIC chip with the active photonic devices whose electrodes for n and/or p contact is made up of transparent conducting oxide (TCO) to enable effective electrical contact to the active photonic and/or nanophotonic devices without inducing too much optical loss like a metal contact will. This facilitates the integration of compact active photonic devices on the electronic-photonic chip.

Yet another object of the invention is to provide the active photonic devices with TCO as the contact electrodes that are optical modulators.

Yet another object of the present invention is to provide a method and system for fabricating a photonic integrated circuit capable of high-speed communications, control, RF photonics, high-performance computing, bio-sensing, gas-sensing, and high bandwidth signal processing.

The various embodiments of the invention provide a method for monolithic integration of a plurality of electronic circuit structures and a plurality of photonic circuit structures on a single substrate. Each electronic circuit structure includes one or more electronic devices. Each photonic circuit structure includes one or more photonic devices. The method includes inserting integration steps of the photonic devices into electronic device fabrication process (e.g. CMOS process). The method further includes integrating the photonic devices by monolithic integration process. Further, the method includes inserting integration steps of the electronic devices into electronic device fabrication process (e.g. CMOS process). The method further includes integrating the electronic devices by using a monolithic integration process.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF EMBODIMENTS

Overview of EIC-PIC:

The present invention provides a method for the realization of Photonic/Nanophotonic Integrated Circuits that are compatible with electronic integration, referred to as electronic-integration compatible Photonic/Nanophotonic integrated circuit that will be referred to as EIC-PIC. An EIC-PIC shall have photonic devices integrated on a substrate using fabrication processes that are compatible with electronic integration processes.

Electronic Device Materials:

Electronic devices are typically fabricated on a layer of semiconductor material made up of silicon, GaAs, InP, or GaN substrate. The most commonly used material is Silicon. For illustration but not limitation, we will focus our discussion on the case of Silicon electronics integrated with photonic devices. Generalization to the utilization of other materials for electronics other than Silicon will be obvious to those skilled in the art.

Photonic Device Materials and Optical Wavelength:

For illustration but not limitation, the photonic/nanophotonic devices are illustrated for operations at $\lambda_{opt}$=1550 nm wavelength range. Generalization of the photonic devices for operation at other wavelength range will be obvious to those skilled in the art by scaling the device dimensions somewhat proportional to the wavelength of operation, by utilizing passive optical materials transparent at the wavelength of operation, and by utilizing active optical material that can provide optical gain at the wavelength of operation.

Figure 1:
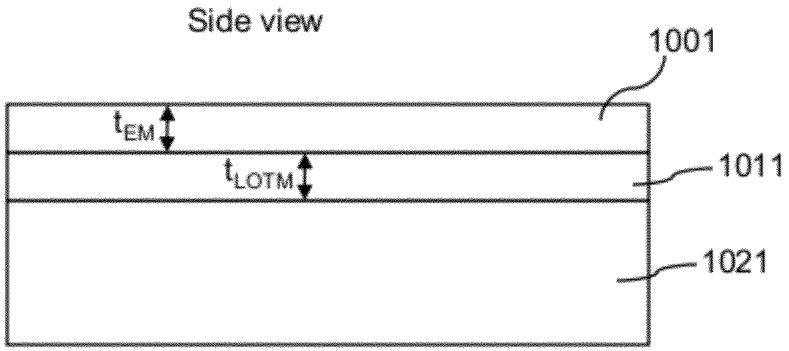
FIG. 1 illustrates a basic wafer structure for an Electronic-Integration Compatible Photonic/Nanophotonic Integrated Circuit in accordance with an embodiment of the invention.

Basic EIC-PIC Structure:

A basic wafer structure for an EIC-PIC provided by the present invention is illustrated in FIG. 1 showing its cross-sectional view. A thin layer of electronic material 1001 with thickness $t_{EM}$ is placed on top of a thin layer of (lower) optically transparent dielectric material 1011 with thickness $t_{LOTM}$. The thin layer of dielectric material 1011 is placed on top of a substrate 1021. For illustration but not limitation, common dielectric materials for layer 1011 are silicon dioxide, silicon nitrides, titanium dioxide, zinc oxide, tantalum pentaoxide, and various polymer materials with optical transparency at the optical wavelength of operation $\lambda_{opt}$. In an exemplary embodiment of the invention, 1001 and 1021 are Silicon, and 1011 is silicon dioxide, forming a wafer structure commonly referred to as Silicon-On-Insulator (SOI). In another embodiment of the invention, $\lambda_{opt}$ is 1550 nm, $t_{EM}$ is 300 nm thick silicon, and $t_{LOTM}$ is 1 μm thick silicon dioxide.

Figure 2:
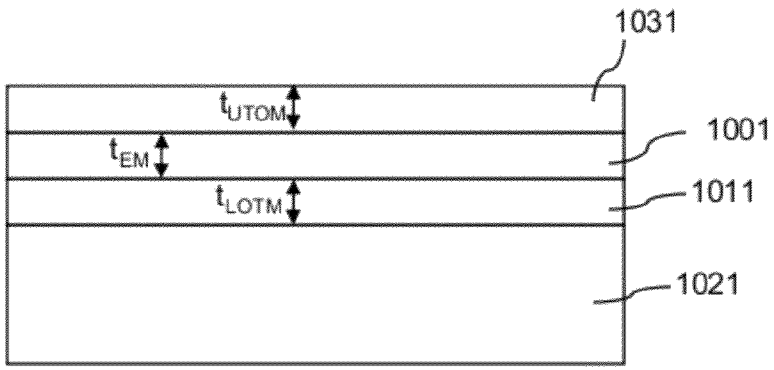
FIG. 2 illustrates a basic wafer structure for an Electronic-Integration Compatible Photonic/Nanophotonic Integrated Circuit in accordance with an embodiment of the invention.

In an exemplary embodiment, the thin layer of electronic material 1001 is also transparent to the optical wavelength of operation $\lambda_{opt}$ forming the first optical core layer and the dielectric layer 1011 has a refractive index that is lower than the refractive index of first optical core layer 1001, enabling layer 1001 to be used as a transparent optical waveguide core surrounded below by lower waveguide cladding 1011 and above by air as the upper waveguide "cladding", both the upper and lower waveguide claddings have lower refractive index than waveguide core layer 1001. As shown in FIG. 2, in another exemplary embodiment, at least another thin layer of (upper) dielectric material layer 1031 with thickness $t_{UTOM}$ is placed on top of layer 1001. Layer 1031 has a refractive index lower than that of layer 1001 and forms an upper waveguide cladding for waveguide core 1001. For illustration but not limitation, common dielectric material for layer 1031 is silicon dioxide, or silicon nitrides, or titanium dioxide, or zinc oxide, or tantalum pentaoxide, or air, or various metal oxide or polymer materials with optical transparency at the optical wavelength of operation $\lambda_{opt}$. In an exemplary embodiment of the invention, 1031 is silicon dioxide with thickness $t_{UTOM}$=300 nm.

Figure 3:
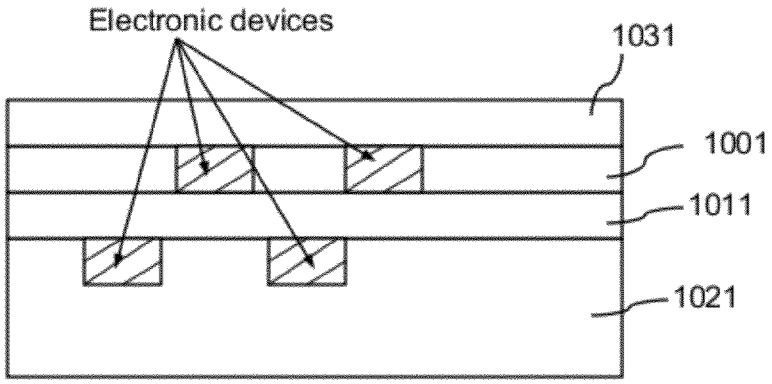
FIG. 3 illustrates a basic wafer structure for an Electronic-Integration Compatible Photonic/Nanophotonic Integrated Circuit in accordance with an embodiment of the invention.

Single-Optical-Layer EIC-PIC:

For the purpose of illustration but not limitation, as shown in FIG. 3, in an exemplary embodiment, electronic devices are fabricated in a first optical core layer 1001 and/or on a first substrate 1021. An EIC-PIC can be realized with this structure by fabricating photonic/nanophotonic devices utilizing first optical core layer 1001 to propagate optical beam. The first optical core layer 1001 with thickness $t_{EM}$ is on top of a first lower optical cladding layer 1011 with thickness $t_{LOTM}$. The first lower optical cladding layer 1011 is on top of the first substrate 1021. The refractive index $n_{EM}$ of the first optical core layer is higher than the refractive index $n_{LCL}$ of the first lower optical cladding layer. In the case of Silicon, layer 1001 cannot provide optical gain but can be used to fabricate various passive photonic devices and active electro-optic devices or active all-optical devices. In another exemplary embodiment, at least one dielectric layer (first upper optical cladding layer) 1031 with thickness $t_{UOTM}$ and refractive index $n_{UCL}$ is further placed on top of layer 1001. EIC-PIC based on this embodiment will be referred to as Single-Optical-Layer EIC-PIC (SOL-EIC-PIC).

In an exemplary embodiment, the first substrate layer 1021 is the silicon substrate of a silicon-on-insulator (SOI) wafer, the first lower optical cladding layer 1011 is the silicon dioxide layer on top of the silicon substrate in the SOI wafer, the first optical core layer 1001 is the top silicon layer of the SOI wafer, and the first upper optical cladding layer 1031 is a silicon dioxide layer.

Input and Output Lens:

In an exemplary embodiment of the invention, the SOL-EIC-PIC consists of at least one input or output optical-fiber coupling optics (i.e. it can have only one or more input coupling optics without any output coupling optics or only one or more output coupling optics without any input coupling optics. It can also have both input coupling optics and output coupling optics)

Figure 4:
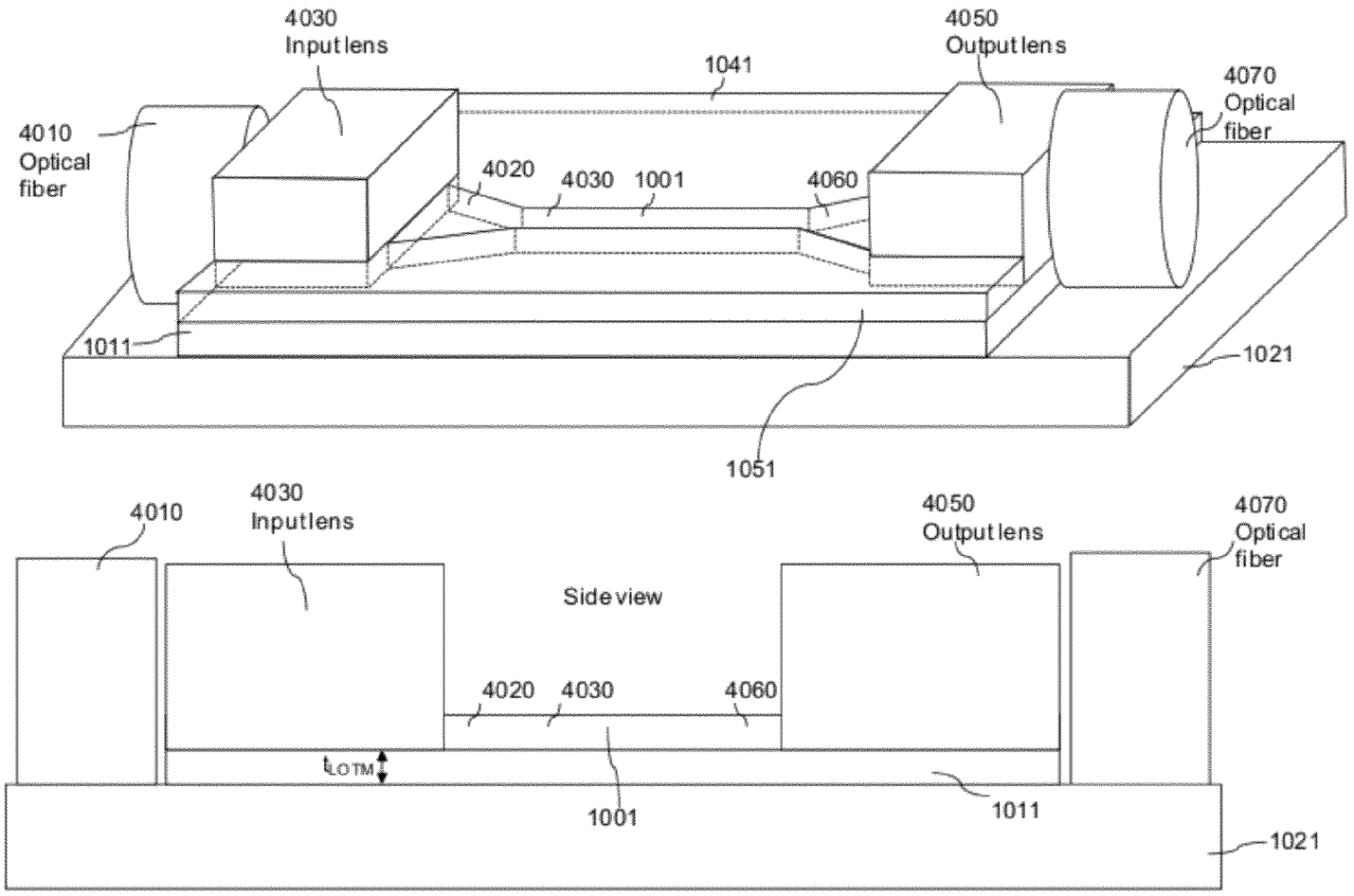
FIG. 4 illustrates a Single-Optical-Layer an Electronic-Integration Compatible Photonic/Nanophotonic Integrated Circuit (SOL-EIC-PIC) in accordance with an embodiment of the invention.

FIG. 4 illustrates the case with one input optical-fiber coupling optics and one output optical-fiber coupling optics, in accordance with an embodiment of the invention. At the input end, FIG. 4 shows the Single-Optical-Layer EIC-PIC consists of one input optical-fiber coupling optics 4030 coupling light from the optical fiber 4010 into first optical layer 1001 forming an optical waveguide 4020 utilizing an integrated lens 4030 on layer 1011. In an exemplary embodiment of the invention, the input optical-fiber coupling optics 4030 is a Superlens. At the output end, FIG. 4 shows that the Single-Optical-Layer EIC-PIC includes one output optical-fiber coupling optics; coupling light from first optical core layer 1001 of an output waveguide 4060 to an output optical fiber 4070 utilizing an integrated lens 4050 on layer 1011. In an exemplary embodiment of the invention, the output coupling optics 4050 is a Superlens 4050. In an exemplary embodiment, the Superlens 4030 and 4050 are made up of two alternating thin dielectric layers that have different refractive indices. In another exemplary embodiment, the alternating layer is made up of silicon and silicon dioxide. (The general design of superlens is disclosed in US patents "Varying refractive index optical medium using at least two materials with thickness less than a wavelength, U.S. Pat. No. 7,426,328" and "Superlens and a method for making the same, U.S. Pat. No. 7,643,719", the contents of which are herein incorporated by reference.)

Figure 5:
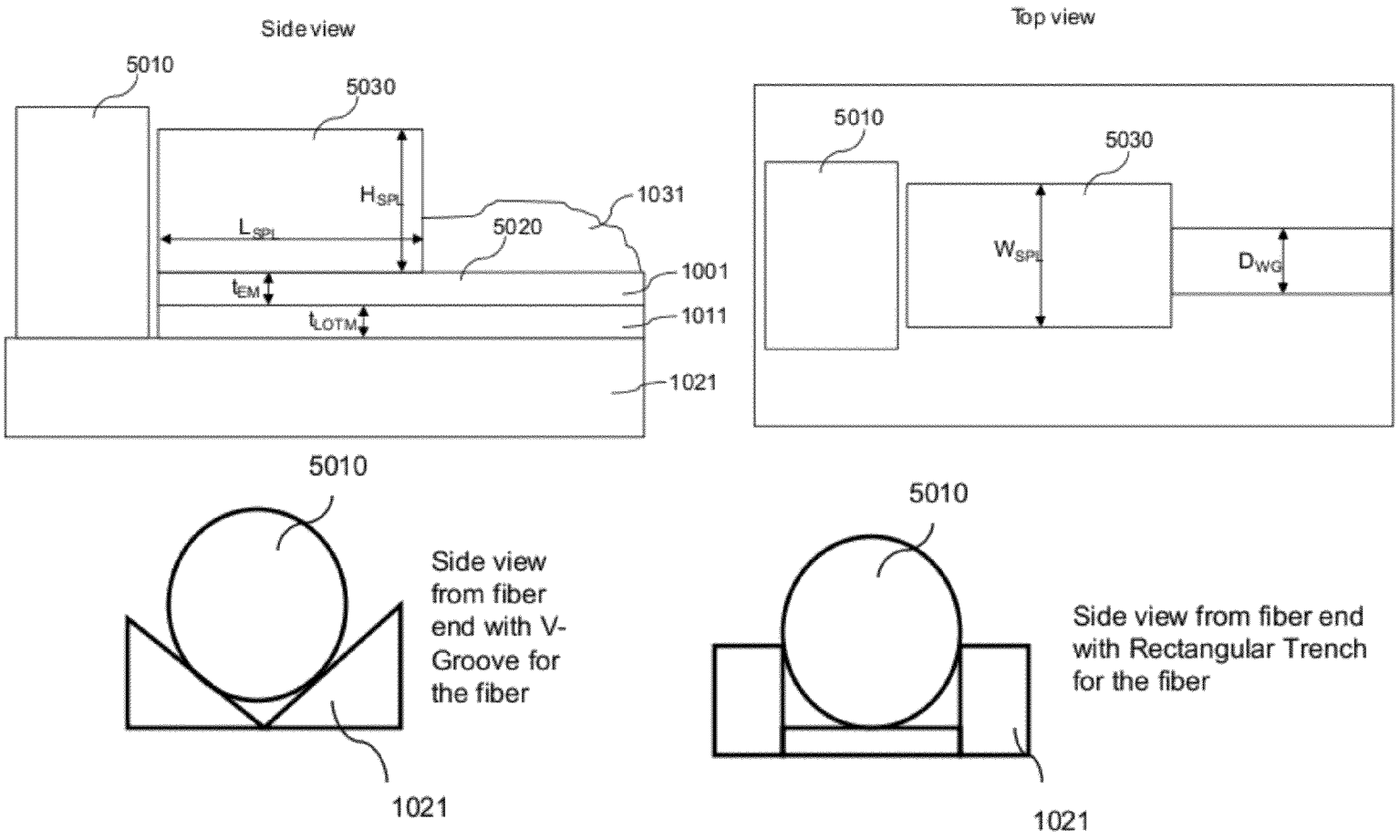
FIG. 5 illustrates a Superlens coupling optics, integrated on an Electronic-Integration Compatible Photonic/Nanophotonic Integrated Circuit chip, in accordance with an embodiment of the invention.

The superlens 4030 or 4050 is further shown in FIG. 5 as lens 5030. The side and top view of a superlens 5030 coupling between an optical fiber 5010 and a nano waveguide 5020 are shown in FIG. 5. In an exemplary embodiment, the input waveguide 5020 may be an optical waveguide with a step refractive index with Silicon as the waveguiding core 1001 with refractive index $n_{Si}$=3.5 and thickness $t_{EM}$, air as the upper cladding 1031 with refractive index $n_{Air}$=1, and silicon dioxide as the lower cladding 1021 with refractive index $n_{SiO2}$=1.5 and thickness $t_{LOTM}$. The waveguide 5020 has a width $D_{WG}$ fabricated by vertically etching down the silicon material to the bottom of the waveguide core 1001 using etching technique well known to those skilled in the art. An example of such etching technique is dry etching using Inductively Coupled Plasma (ICP) etcher with Chlorine or Fluorine chemistry. In an exemplary embodiment, the width $D_{WG}$ is 10 μm, and the thickness $t_{EM}$ is 300 nm. The thickness of lower cladding $t_{LOTM}$ is 1 μm. The superlens 5030 has a width $W_{SPL}$, height $H_{SPL}$ and length $L_{SPL}$ fabricated on top of the waveguide 5020 by depositing multi-layers of alternating dual materials.

In an exemplary embodiment, the dual materials are Silicon (Si) and Silicon Dioxide ($SiO_2$). The superlens 5030 dimensions are $W_{SPL}$=20 μm, $H_{SPL}$=15 μm, and length $L_{SPL}$=20 μm. The thickness ratio of Silicon and Silicon Dioxide is varied such that the effective index of the superlens is close to n=3.5 at the bottom of the lens near the surface of waveguide 5020 and will be mainly of silicon (i.e. it will have thicker layers of silicon versus silicon dioxide). The effective index of the superlens is close to n=1.5 near the top of the superlens and will be mainly of silicon dioxide (i.e. it will have thicker layers of silicon dioxide versus silicon). The optical fiber 5010 is an optical fiber with a full-width-half maximum (FWHM) mode size diameter of about 8 μm. The optical wavelength of operation $\lambda_{OPT}$ is 1550 nm. The index variation of the superlens 5030 with the design algorithm shown in U.S. Pat. No. 7,643,719 will be such that the mode from the nano waveguide 5020 will expand in the lens such that the strong lensing effect in the superlens results in an output beam of about 8 μm in diameter over less the 20 μm of propagation through the superlens, and the wavefront is a flat wavefront at the output surface of the superlens. The 8 μm optical beam diameter at the output surface of the superlens with flat beam wavefront matches the fiber beam diameter of 8 μm. Thus, the superlens 5030 enables efficient coupling of the light from the nano waveguide 5020 to the optical fiber 5010 or from the optical fiber 5010 to nano waveguide 5020 due to the reciprocity of light propagation as is known to those skilled in the art.

In an exemplary embodiment, the input or output optical fiber is held from below by a V-groove or a trench structure fabricated on the substrate 1021 to match the size of the fiber and hold it at the right height with respect to the lens optical center to achieve maximum coupling of light beam energy between the optical fiber and the waveguide on chip. This is illustrated in FIG. 5 showing optical fiber 5010 held from below by substrate 1021. The trench can be of rectangular shape or arbitrary shape designed to hold the fiber in steady position. There can be additional materials between substrate 1021 and fiber 5010 to help hold the fiber. Such variations are contemplated and are within the scope of the present invention.

Photonic or Nanophotonic Device:

In an exemplary embodiment of the invention, as shown in FIG. 4, the Single-Optical-Layer EIC-PIC consists of at least one photonic/nanophotonic device 4030, that can be an optical waveguide, an optical wavelength multiplexer, an optical wavelength demultiplexer, an optical grating, an optical beam splitter, a polarization beam splitter, an optical isolator, a polarization rotator, an optical interferometer, an optical modulator, an optical ring resonator, an optical disk resonator, an optical curved reflector or an optical mirror, an optical amplifier, a laser, a light-emitting device, an optical detector, a nonlinear-optical device, a photonic transistor, an optical harmonic frequency generator, an all-optical device, or other photonic/nanophotonic devices well known to those skilled in the art. Each of these devices has at least an input or output waveguide port for an optical beam. When there is more than one device, light propagates from one device to another by connecting the output port of an earlier device to the input port of a latter device.

The vertical optical mode confinement of photonic/nanophotonic device is due to the high refractive index core layer 1001 that confines the light energy to propagate mainly in core layer 1001. The horizontal confinement and propagation geometry of the optical beam or beams will depend on the device as described below. The horizontal geometry is defined by lithography (photolithography or E-Beam lithography etc) and by vertically etching down the core layer 1001, as is well know to those skilled in the art.

Figure 6:
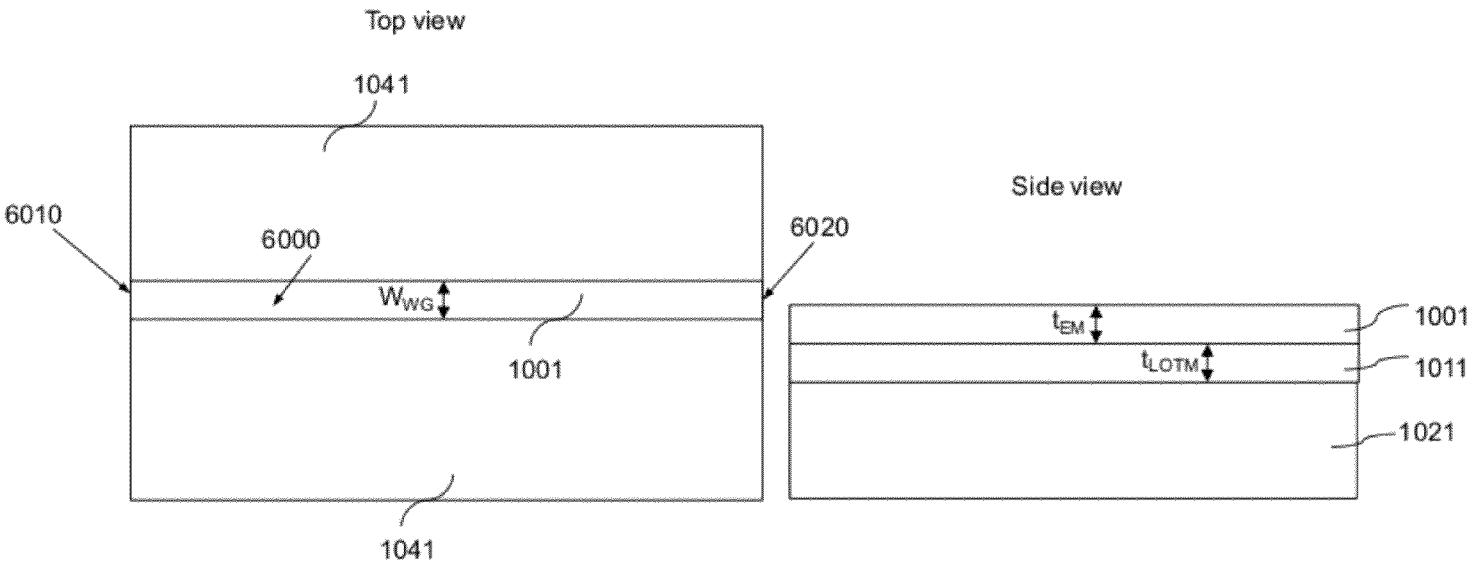
FIG. 6 illustrates an optical waveguide, integrated on an Electronic-Integration Compatible Photonic/Nanophotonic Integrated Circuit chip.

An exemplary embodiment of an optical waveguide is a straight or curved waveguide 6000 shown in FIG. 6, guiding optical beam confined vertically by the high-refractive index core 1001. This waveguide is fabricated by horizontally patterning the planar pattern of the waveguide by using lithography (e.g. photolithography or E-Beam lithography) and then etching down the silicon layer 1001 to form the waveguide of a certain width $W_{WG}$ to provide the horizontal optical confinement surrounded by air or by low refractive index material 1041 and 1051 on both side of the waveguide as shown in FIG. 6, The waveguide has an optical beam input port 6010 and an output port 6020 as shown in FIG. 6. In an exemplary embodiment, waveguide 6000 has width $W_{WG}$=400 nm for an optical operation wavelength $\lambda_{OPT}$ of 1550 nm.

Figure 7:
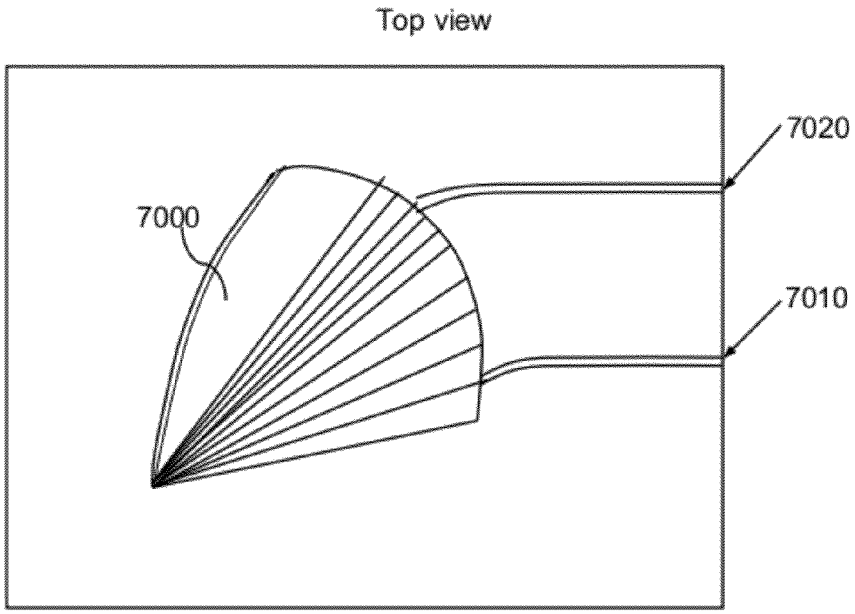
FIG. 7 illustrates an ultra-compact wavelength multiplexer/demultiplexer, also called Super-Compact Grating or Compact Curved Grating integrated on an EIC-PIC chip, in accordance with an embodiment of the invention.

An exemplary embodiment of an optical wavelength multiplexer or an optical grating is an ultra-compact wavelength multiplexer/demultiplexer, also called the Super-Compact Grating or the Compact Curved Grating (hereinafter referred to as UCλDeMux 7000 as shown in FIG. 7. The general design of ultra-compact wavelength multiplexer/demultiplexer is given in patents "Curved grating spectrometer, U.S. Pat. No. 7,283,233" and "Integrated signal manipulator for manipulating optical signals, application Ser. No. 11/451,797," contents of which are herein incorporated by reference. UCλDeMux 7000 could also be referred to as Ultra-Compact Wavelength Multiplexer/De-Multiplexer, based on Ultra-Large-Angle-Grating for High Bandwidth Data Communications through WDM. The wavelength multiplexer 7000 has an optical beam input port 7010 and an output port 7020 as shown in FIG. 7.

Figure 8A:
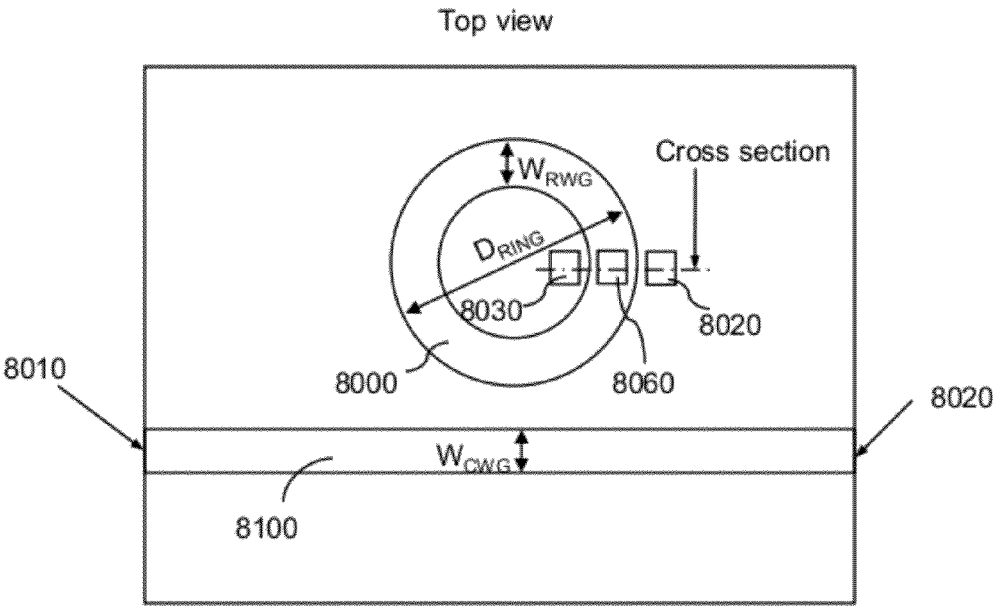
FIG. 8A illustrates a tunable optical ring resonator integrated on an Electronic-Integration Compatible Photonic/Nanophotonic Integrated Circuit chip, in accordance with an embodiment of the invention.

FIG. 8A illustrates a Ring-Resonator 8000 that can be used as Tunable Wavelength Filter (R-TWF), in accordance with an embodiment of the invention. The Tunable Ring Resonator 8000 is coupled to an adjacent waveguide 8100. The Tunable Ring Resonator 8000 has an optical beam input port 8010 and an output port 8020 operated with an optical beam at optical wavelength $\lambda_{OPT}$ as shown in FIG. 8A. The waveguide 8100 has a width $W_{CWG}$. The ring resonator is made up of a waveguide of width $W_{RWG}$ formed into a ring with a ring diameter of $D_{RING}$. The resonance frequency of the ring resonator is tuned by capacitative effect that brings the electrical charges across a thin layer of gate oxide. The electrical charges cause a change in the refractive index at the gate region and hence the propagating refractive index of the waveguiding ring. This change in the propagating index then shifts the resonance frequency of the ring as is known to those skilled in the art. In an exemplary embodiment, $W_{CWG}$=$W_{RWG}$=400 nm, $D_{RING}$=20 μm.

Figure 8B:
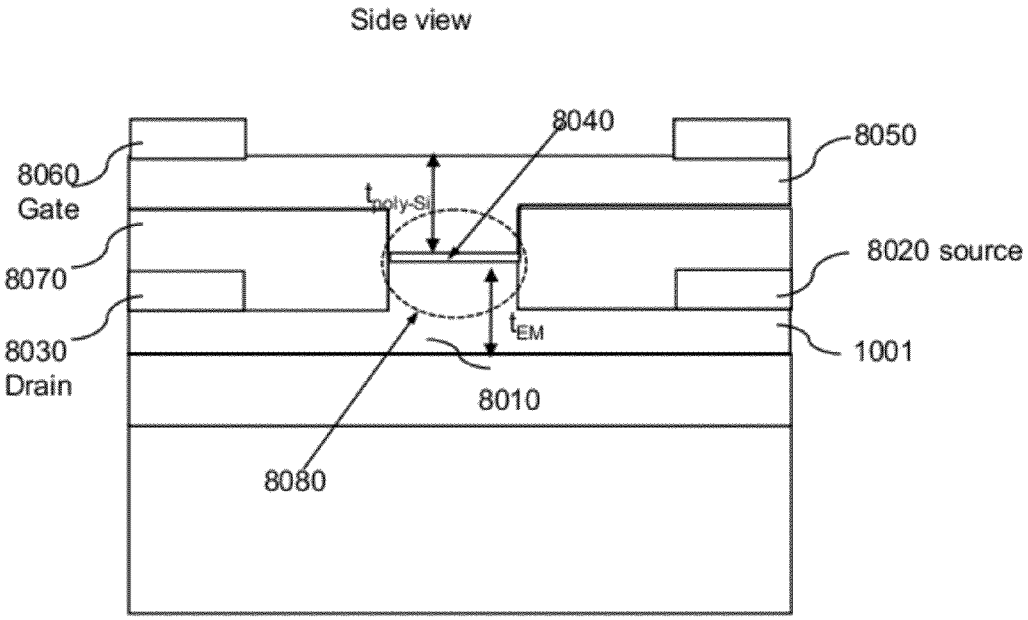
FIG. 8B illustrates the cross-sectional view of a tunable optical ring reonstor with poly-silicon as the top electrode integrated on an Electronic-Integration Compatible Photonic/Nanophotonic Integrated Circuit chip, in accordance with an embodiment of the invention.

In one exemplary embodiment based on poly-silicon gate, the vertical cross section of Tunable Ring Resonator 8000 is shown in FIG. 8B in which the Silicon waveguide core layer 1001 with thickness $t_{EM}$ is doped by ion implantation at spatial region 8010. A source electrode 8020 and a drain electrode 8030 are deposited on two ends of 8010, each on an n+ well or p+ well region. A gate oxide 8040 with thickness of tens of nanometers or thinner is deposited on the central region of 8010. A doped poly-silicon 8050 with thickness $t_{POLY\text{-}Si}$ is deposited on top of the gate oxide 8040. A gate electrode 8060 is deposited on the side of poly-silicon structure 8050 that is placed on a low refractive index oxide layer 8070. The waveguiding region 8080 is shown in the figure. The optical mode goes across from the lower silicon layer 8010 to the top poly-silicon layer 8050. Applying a voltage across the gate and the source electrode will drive charges to reside just across the gate oxide layer 8040, resulting in a refractive index change at the center of the optical beam mode 8080. In an exemplary embodiment $t_{POLY\text{-}Si}$=200 nm and $t_{EM}$=300 nm.

Figure 8C:
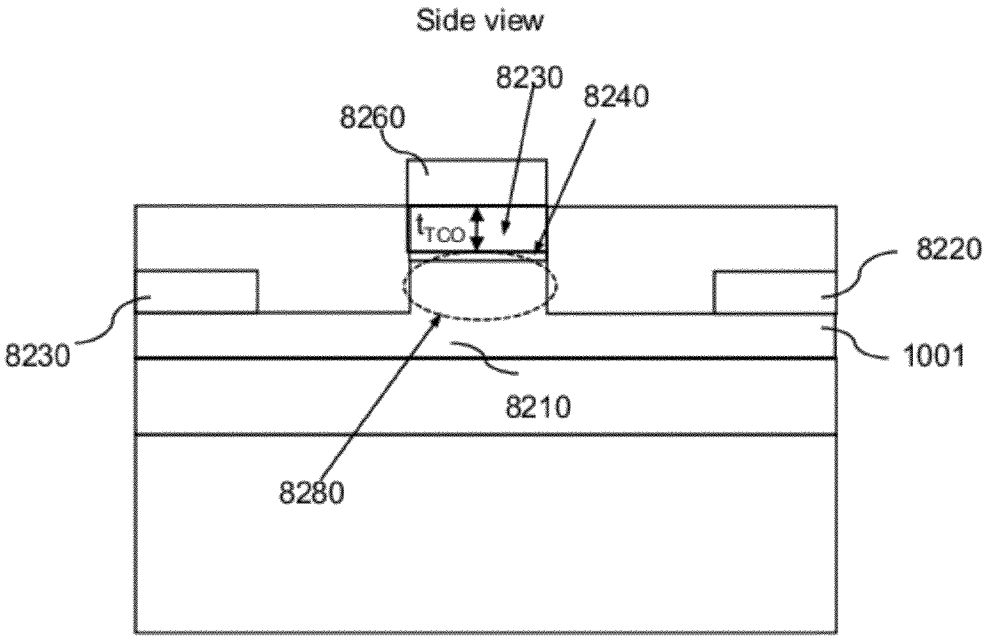
FIG. 8C illustrates the cross-sectional view of a tunable optical ring reonstor with transparent conducting oxide (TCO) as the top electrode integrated on an EIC-PIC chip, in accordance with an embodiment of the invention.

In another exemplary embodiment based on transparent conducting oxide (TCO) gate, the vertical cross section of Tunable Ring Resonator 8000 is shown in FIG. 8C in which the Silicon waveguide core layer 1001 is doped by ion implantation at spatial region 8210. A source electrode 8220 and a drain electrode 8230 are deposited on two ends of 8210. A gate oxide 8240 with thickness of tens of nanometers or thinner is deposited on the central region of 8210. A transparent conducting oxide (TCO) layer 8230 with thickness $t_{TCO}$ is deposited on top of the gate oxide 8240. A gate electrode 8260 is deposited on top of the TCO layer structure 8230. The waveguiding region 8280 is shown in the figure. The TCO has low refractive index of typically $n_{TCO}$=1.7 to 2. This enables the optical mode to reside mainly in the lower silicon layer 8210 with much higher refractive index of $n_{Si}$=3.5, which provides a tighter optical mode confinement than the poly-silicon case described above in FIG. 8B. Applying a voltage across the gate and the source electrode will drive charges to reside just across the gate oxide layer, resulting in a refractive index change. The tighter optical mode confinement to within the bottom Silicon layer and the higher conductivity of TCO enables lower switching voltage and higher switching speed.

Optical beam splitter, optical polarization beam splitter, optical isolator, polarization rotator, optical interferometer, optical phase shifter, optical modulator, optical ring resonator, optical disk resonator, optical curved reflector, optical mirror, nonlinear-optical device, photonic transistor, optical harmonic frequency generator, all-optical device, are some of the examples of common integrated optical devices that are well known to those skilled in the art. For example, an optical interferometer can be a Mach Zehnder interferometer with an input beam splitter splitting the wave into two waveguiding arms and recombine them at another beam splitter. They can be fabricated in a way similar to the case of the optical waveguide by patterning the planar pattern of the two beam splitters/combiners and two waveguide arms using lithography and then etch down the silicon layer 1001 to form the required pattern on the chip. Optical phase shifting or modulation can make use of the refractive index change of silicon with temperature by fabricating a heating element to shift the refractive index of the waveguide in the device involved. Optical phase shifting or modulation can also make use of the refractive index change of silicon with electron or hole carrier density by fabricating an electrical structure as is known to those skilled in the art to inject electrons or holes into the silicon to shift the refractive index of the waveguide in the device involved. All-optical device can be realized utilizing the nonlinear optical absorption in silicon to change the phase or absorption of an optical beam by another optical beam as is known to those skilled in the art.

Optical amplifier, laser, light-emitting device, and Optical detector are more specialized devices. In the case of silicon as layer 1001, optical amplifier and optical detector cannot be easily realized on layer 1001 and will require the Double-Optical-Layer EIC-PIC (DOL-EIC-PIC) technique to be described below. In the case of GaAs, GaN, InP, as layer 1001, these materials can provide optical gain and absorption and can be used to realize detectors or amplifiers in layer 1001.

Fabrication:

The Single-Optical-Layer EIC-PIC can be fabricated by using an electronic device fabrication compatible process (e.g. CMOS compatible process) to be described below to realize at least one coupling lens and at least one optical device on the chip.

Figure 10A:
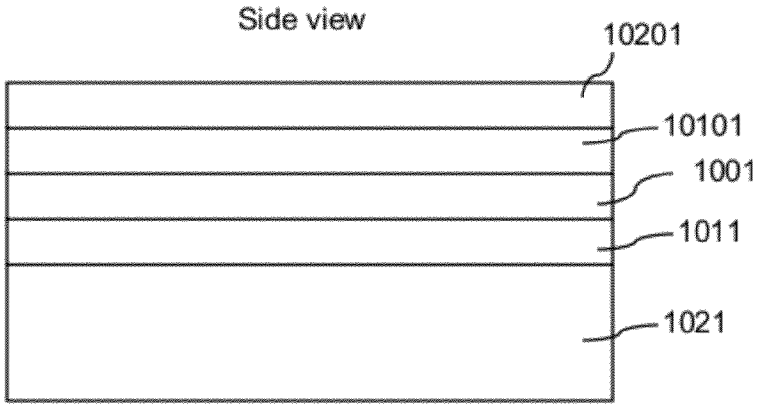
FIG. 10A illustrates a Direct Double-Optical-Layer EIC-PIC (DDOL-EIC-PIC), in accordance with an embodiment of the invention.

Direct Double-Optical-Layer EIC-PIC:

For the purpose of illustration but not limitation, as shown in FIG. 10A, in an exemplary embodiment, an adjacent optical layer 10101 is further put directly on top of first optical core layer 1001 resulting in Direct Double-Optical-Layer EIC-PIC (DDOL-EIC-PIC). The first optical core layer 1001 with thickness $t_{EM}$ is on top of a first lower optical cladding layer 1011 with thickness $t_{LOTM}$. The first lower optical cladding layer 1011 is on top of the first substrate 1021. The refractive index $n_{EM}$ of the first optical core layer is higher than the refractive index $n_{LCL}$ of the first lower optical cladding layer. In one embodiment, the refractive index $n_{AOL}$ of the adjacent optical layer 10101 with thickness $tt_{Pl}$ is near the refractive index $n_{EM}$ of the first optical core layer. In one embodiment, the adjacent optical layer 10101 is an optical gain or absorptive material. In one embodiment, the adjacent optical layer 10101 is InGaAs quantum well structure with one or more InGaAs quantum wells inter-spaced with InGaAsP barrier material to provide optical gain for the wave propagating in layer 1001 with optical field penetrating into the adjacent optical layer 10101. As is well known to those skilled in the art, there are other gain material structures one can use to achieve optical gain. In another exemplary embodiment, at least one dielectric layer (first upper optical cladding layer) 10201 with thickness $t_{UOTM}$ and refractive index $n_{UCL}$ is further placed on top of layer 10101.

In an exemplary embodiment, the first substrate layer 1021 is the silicon substrate of a silicon-on-insulator (SOI) wafer, the first lower optical cladding layer 1011 is the silicon dioxide layer on top of the silicon substrate in the SOI wafer, the first optical core layer 1001 is the top silicon layer of the SOI wafer, the adjacent optical layer 10101 is made of III-V semiconductor materials (e.g. InGaAs/InGaAsP/InP or GaAs/AlGaAs material systems), and the first upper optical cladding layer 10201 is a silicon dioxide layer.

Figure 10B:
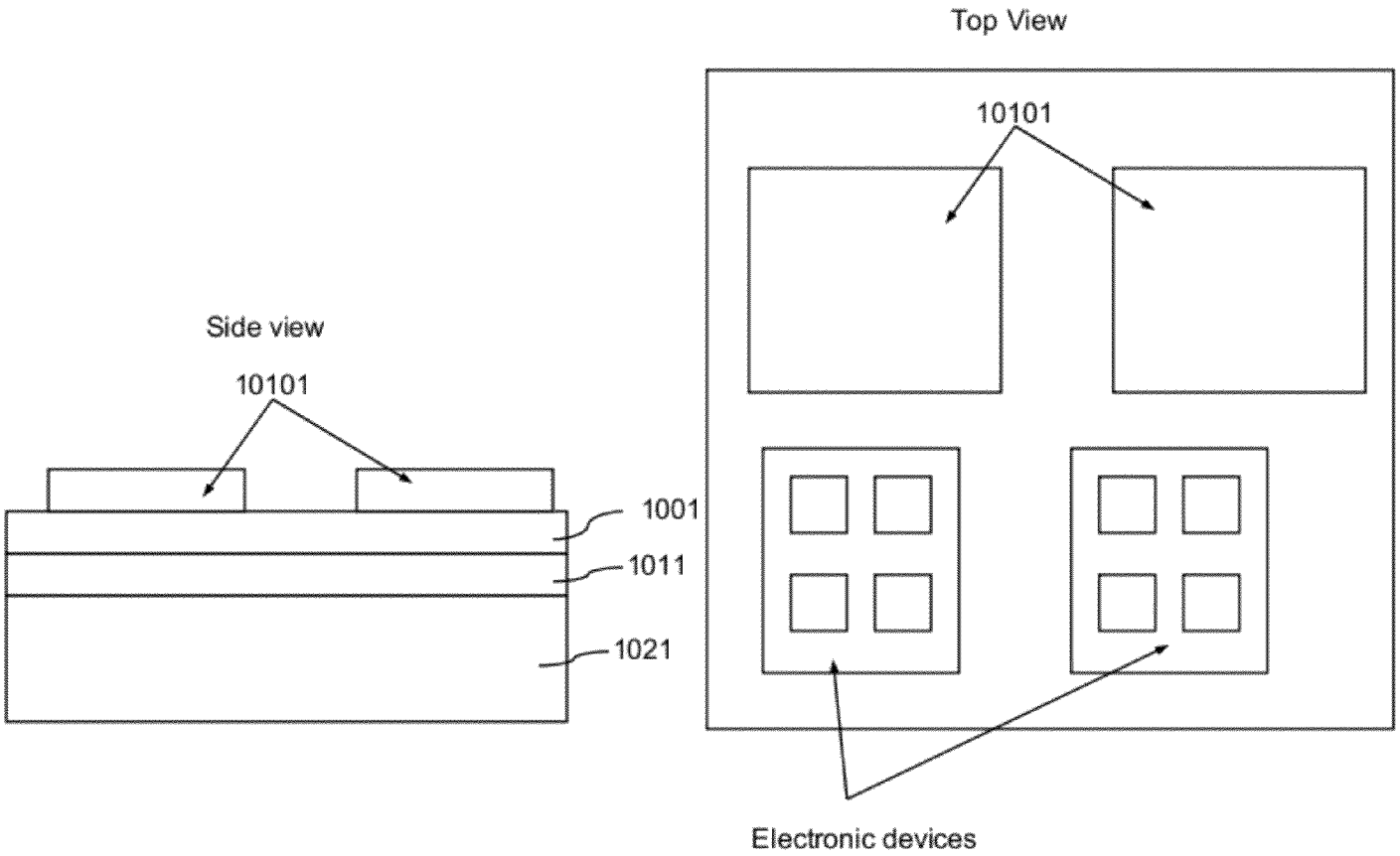
FIG. 10B illustrates a Direct Double-Optical-Layer EIC-PIC (DDOL-EIC-PIC) with multiple active photonic areas, in accordance with an embodiment of the invention.

Multiple Active Areas:

In one embodiment, the adjacent optical layer 10101 is placed on multiple sub-areas on the chip as illustrated by the side and top views in FIG. 10B In one embodiment, these gain-material areas are placed using local-area-bonding technique to be described below.

Figure 10C:
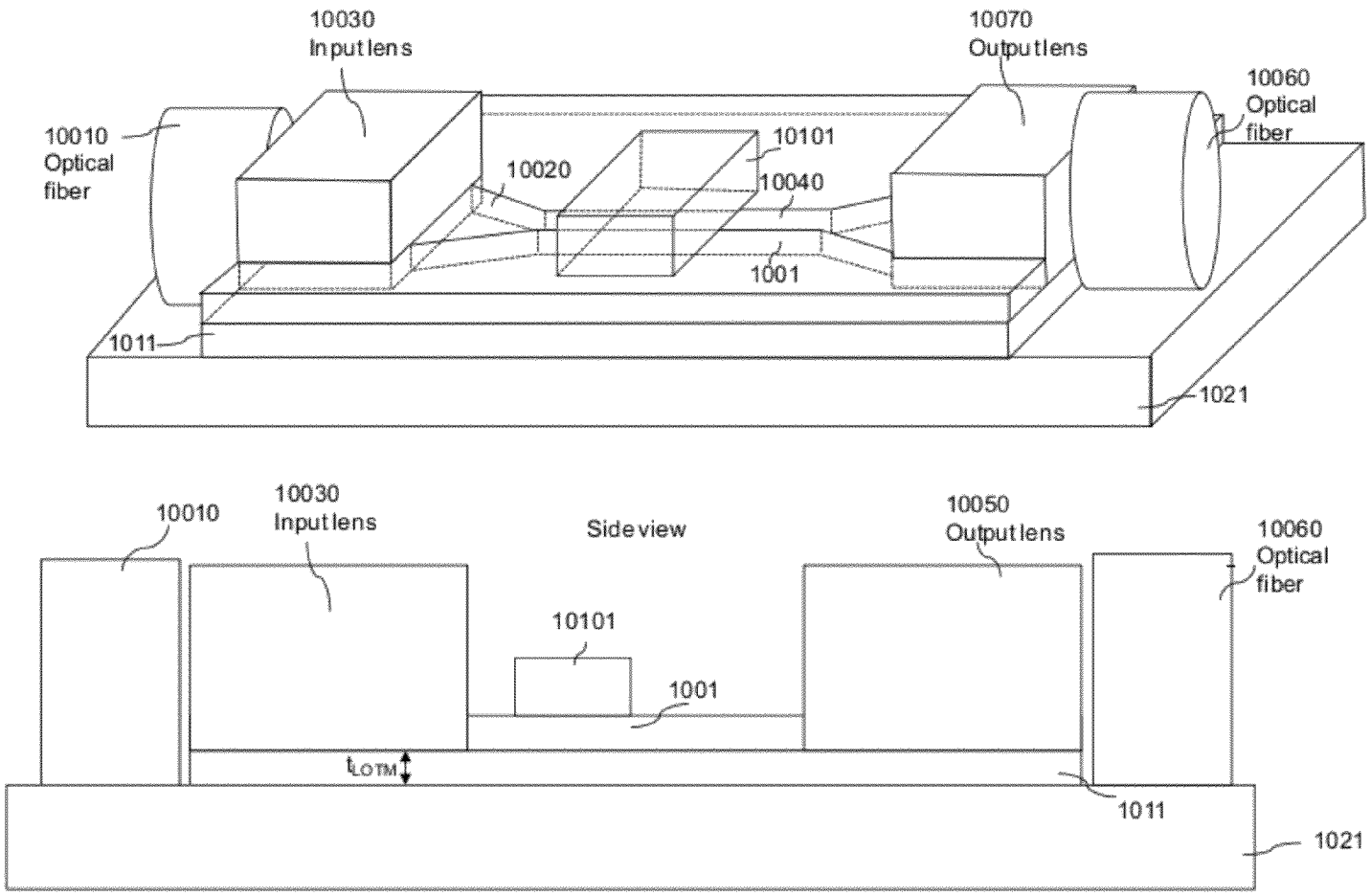
FIG. 10C illustrates a Direct Double-Optical-Layer EIC-PIC (DDOL-EIC-PIC), in accordance with an embodiment of the invention.

Input or Output Lens:

In an exemplary embodiment of the invention, the DDOL-EIC-PIC consists of at least one input or output optical-fiber coupling optics (i.e. it can have only one or more input coupling optics without any output coupling optics or only one or more output coupling optics without any input coupling optics. It can also have both input coupling optics and output coupling optics). FIG. 10C illustrates the case with one input optical-fiber coupling optics and one output optical-fiber coupling optics. At the input end, FIG. 10C shows the input optical-fiber coupling optics couples light from the optical fiber 10010 into layer 1001 that formed a channel waveguide 10020 utilizing an integrated lens on layer 10030. In an exemplary embodiment of the invention, the input coupling optics 10030 is a Superlens. At the output end, FIG. 10C shows the output optical-fiber coupling optics 10070 couples light from layer 1001 formed into a channel waveguide 10050 to an output optical fiber 10060 utilizing an integrated lens 10070 on layer 1001. In an exemplary embodiment of the invention, the output coupling optics is a Superlens 10070. In an exemplary embodiment, the Superlens 10030 and Superlens 10070 are made up of two alternating thin dielectric layers that have different refractive indices. In an exemplary embodiment, the alternating layer is made up of silicon and silicon dioxide with a structure similar to the superlens 5030 illustrated in FIG. 5. In another exemplary embodiment, the input optical fiber 10010 or output optical fiber 10060 is held from below by a V-groove or a trench structure fabricated on the substrate 1021 to match the size of the fiber and hold it at the right height with respect to the lens optical center to achieve maximum coupling of light beam energy between the optical fiber and the waveguide on chip.

Photonic or Nanophotonic Device:

In an exemplary embodiment of the invention, as shown in FIG. 10C, the DDOL-EIC-PIC consists of at least one photonic/nanophotonic device 10040, that can be an optical waveguide, an optical wavelength multiplexer, an optical wavelength demultiplxer, an optical grating, an optical beam splitter, a polarization beam splitter, an optical isolator, a polarization rotator, an optical interferometer, an optical modulator, an optical ring resonator, an optical disk resonator, an optical curved reflector, an optical mirror, an optical amplifier, an optical detector, a laser, a light-emitting device, a nonlinear-optical device, a photonic transistor, an optical harmonic frequency generator, an all-optical device, or other photonic/nanophotonic device well known to those skilled in the art.

In an embodiment of the invention, the first optical core layer 1001 is silicon which silicon cannot provide optical gain. Thus in the case of active optical devices such as optical amplifiers, lasers, or light-emitting devices, the adjacent optical layer 10101 can then be made of an optical material with gain such as compound semiconductor material. Thus the direct Double-Optical-Layer structure can be used to achieve a wide range of active integrated optical devices that involve optical gain.

Figure 10D:
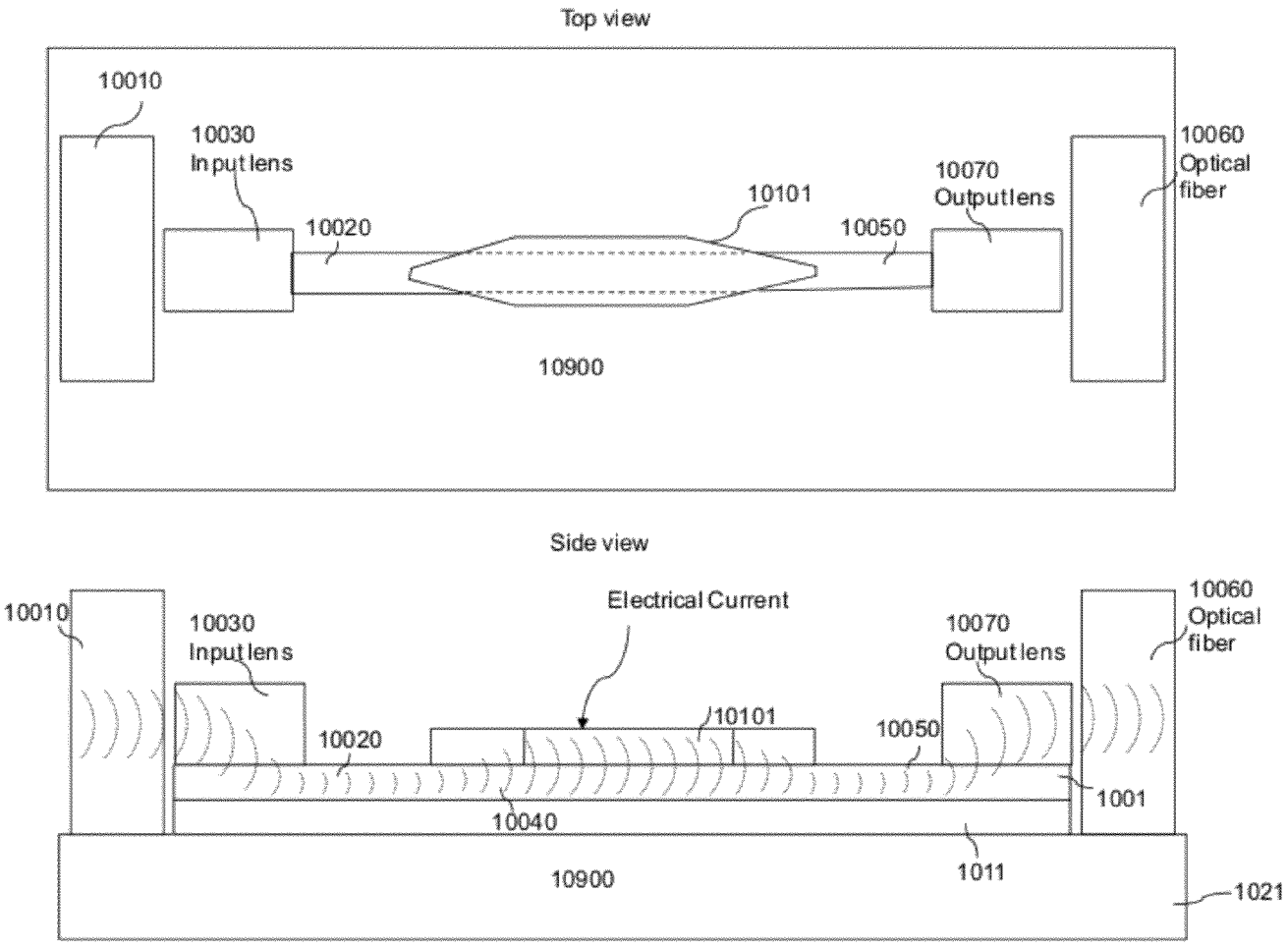
FIG. 10D illustrates a Direct Double-Optical-Layer EIC-PIC (DDOL-EIC-PIC) with a tapered waveguide structure to squeeze the mode in and out of the region with active photonic material, in accordance with an embodiment of the invention.

In an exemplary embodiment of device 10900 shown in FIG. 10D, layer 1001 is silicon and the adjacent optical layer 10101 contains InGaAs quantum well structure with one or more InGaAs quantum wells inter-spaced with InGaAsP barrier material. Silicon cannot provide optical power gain. However, as is well known to those skilled in the art, InGaAs quantum wells can provide optical gain under current injection. Optical beam at a wavelength of $\lambda_{OPT}$=1550 nm propagating in layer 1001 enters the waveguiding section that is bonded with layer 10101 and propagates through the waveguiding section with optical gain layer 10101 to achieve optical power gain. In this exemplary embodiment, device 10900 acts as an optical amplifier.

Fabrication:

The DDOL-EIC-PIC can be fabricated using an electronic device fabrication compatible process (e.g. CMOS compatible process) to be described below to realize at least one coupling lens and at least one optical device on the chip.

Tapered Waveguide Structure:

FIG. 10D illustrates a tapered waveguide structure that can be used for the Direct Double-Optical-Layer EIC-PIC to push energy from the bottom waveguiding core layer 1001 to the top thin film layer 10101 with optical gain or vice versa, in accordance with an embodiment of the invention. The taper helps to squeeze the energy up to the adjacent optical layer 10101 or down to layer 1001 more gradually. Such gradual process reduces optical reflection at the edges or end regions where the adjacent optical layer 10101 is introduced, and increases optical power propagating through the device region with the adjacent optical layer 10101. The actual dimensional variation for the waveguide tapers is not be very important as long as the tapered waveguide width goes from a width large compared to half the wavelength in the waveguiding core 1001 to a width small compared to half the wavelength in the waveguiding core 1001. In an exemplary embodiment, device region with the adjacent optical layer 10101 shown in FIG. 10D is electrically excited via an injection current and acts as an optical power amplifier.

Figure 10E:
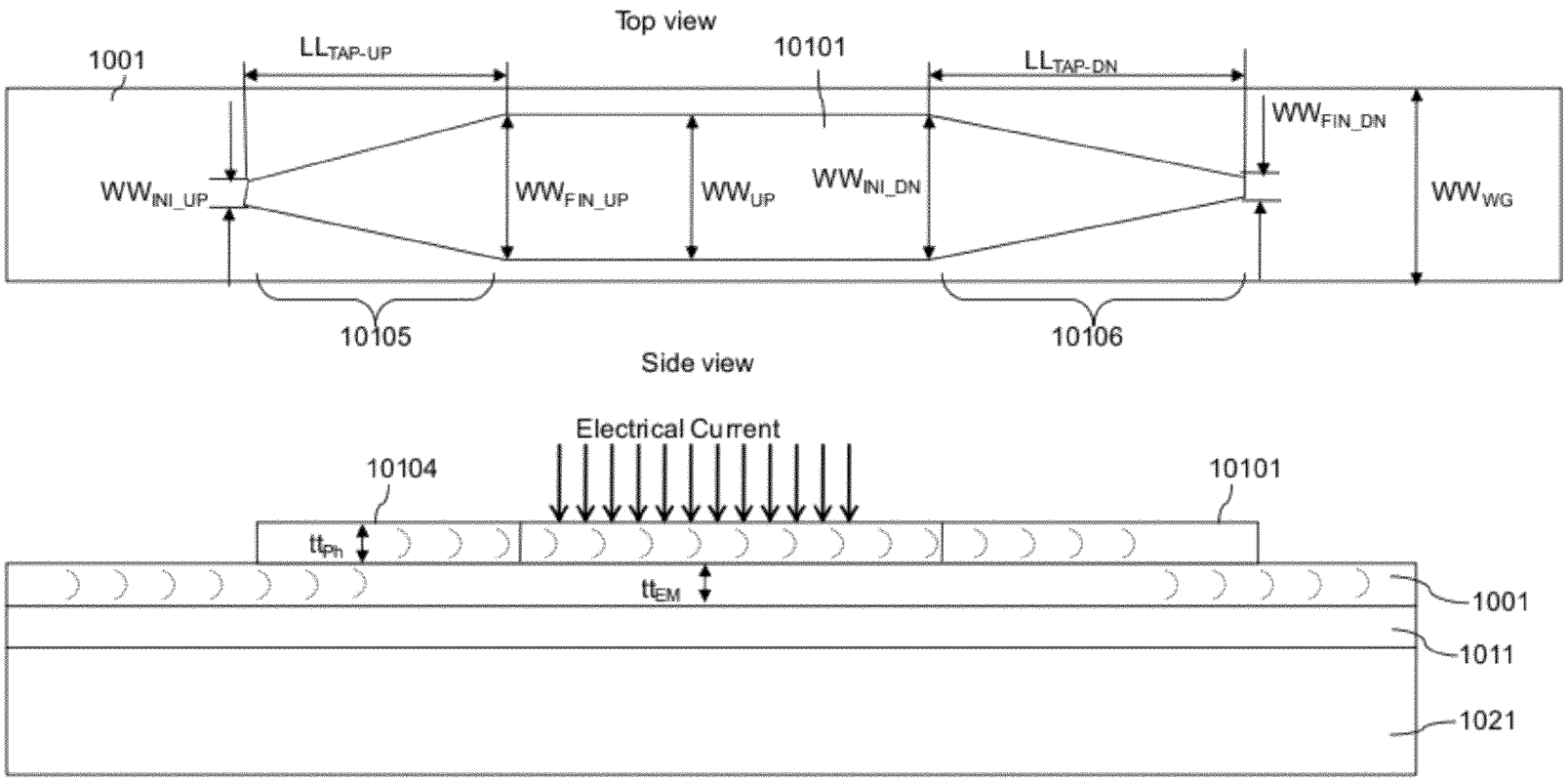
FIG. 10E illustrates a Direct Double-Optical-Layer EIC-PIC (DDOL-EIC-PIC) with a tapered waveguide structure to squeeze the mode in and out of the region with active photonic material, in accordance with an embodiment of the invention.

In an embodiment of the invention, as shown in FIG. 10E, the beam from the first waveguide core layer 1001 enters the adjacent optical layer 10101 region with a tapered waveguide 10105. 10105 is a tapering waveguide section in layer 10101 tapering from an initial width $WW_{INI-UP}$ to a final width $WW_{FIN-UP}$ in a taper length $LL_{TAP-UP}$. The width of layer 10101 $WW_{UP}$ and waveguide width of layer 1001 $WW_{WG}$ can be equal or different.

In another embodiment of the invention, as shown in FIG. 10E, the beam from the waveguide with the adjacent optical layer 10101 enters the first waveguide core layer 1001 region with a tapered waveguide 10106. 10106 is a tapering waveguide section in layer 10101 tapering from an initial width $WW_{INI-DN}$ to a final width $WW_{FIN-DN}$ in a taper length $LL_{TAP-DN}$. The width of layer 10101 $WW_{UP}$ and waveguide width of layer 1001 $WW_{WG}$ can be equal or different.

The height of layer 1001 is $t_{EM}$, and the height of layer 10101 is $tt_{Ph}$.

In an exemplary embodiment, waveguide core 1001 is silicon with thickness $t_{EM}$=300 nm, and top waveguide layer 10101 is InGaAs quantum well structure with three InGaAs quantum wells interspaced with InGaAsP barrier layers and adjacent optical layer 10101 has a refractive index around $n_{AOL}$=3.4 and a total thickness $tt_{Ph}$=150 nm. The taper dimensions are $WW_{INI-UP}$=$WW_{FIN-DN}$=100 nm, $WW_{INI-DN}$=$WW_{FIN-UP}$=400 nm, $LL_{TAP-UP}$=$LL_{TAP-DN}$=30 μm, $W_{UP}$=400 nm, $W_{WG}$=400 nm.

The various methods and systems described above for monolithic integration of active and/or passive photonic (and/or nanophotonic) devices in a way that is compatible with electronic integration will become clear with detailed descriptions of the methods and systems for the various exemplary EIC-PICs described below.

Figure 11A:
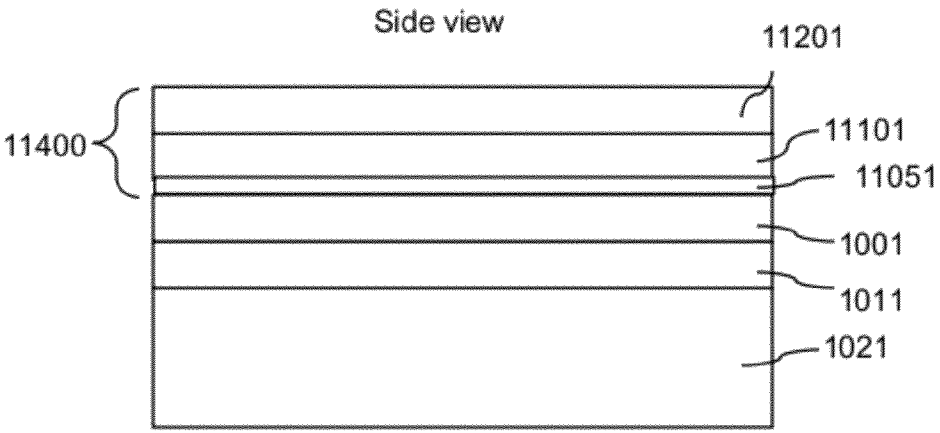
FIG. 11A illustrates an Indirect Double-Optical-Layer EIC-PIC (IDDOL-EIC-PIC), in accordance with an embodiment of the invention.

Indirect Double-Optical-Layer EIC-PIC:

For the purpose of illustration but not limitation, as shown in FIG. 11A, in an exemplary embodiment, a thin first interspaced dielectric structure layer 11051 with thickness $t_{DIE}$ and refractive index $n_{DIE}$ is placed on the first optical core layer 1001 and a second optical core layer 11101 is further put directly on top of layer 11051 resulting in Indirect Double-Optical-Layer EIC-PIC (IDDOL-EIC-PIC). The first optical core layer 1001 with thickness $t_{EM}$ is on top of a first lower optical cladding layer 1011 with thickness $t_{LOTM}$. The first lower optical cladding layer 1011 with thickness is on top of the first substrate 1021. The refractive index $n_{EM}$ of the first optical core layer is higher than the refractive index $n_{LCL}$ of the first lower optical cladding layer. The first interspaced dielectric structure layer 11051 may be made up of one or more further-divided layers of different dielectric materials. The refractive index $n_{2OC}$ of the second optical core layer 11101 and the refractive index $n_{EM}$ of the first optical core layer 1001 are both higher than the refractive index of the first interspaced dielectric structure layer 11051, In one embodiment, the second optical core layer 11101 is an optical gain or absorptive material layer.

In another exemplary embodiment, at least one dielectric layer (first upper optical cladding layer) 11201 with thickness $t_{UOTM}$ and refractive index $n_{UCL}$ is further placed on top of layer 11101. Layer 11051 and layer 11101 with optional layer 11201 together is referred to as "active-layer structure" 11400. In one embodiment, layer 11051 is Silicon Nitride and layer 11101 is InGaAs quantum well structure with one or more InGaAs quantum wells inter-spaced with InGaAsP barrier material to provide optical gain for the wave coupling from layer 1001 to layer 11101. As is well known to those skilled in the art, there are other gain material structures one can use to achieve optical gain.

In an exemplary embodiment, the first substrate 1021 layer is the silicon substrate of a silicon-on-insulator (SOI) wafer, the first lower optical cladding layer 1011 is the silicon dioxide layer on top of the silicon substrate in the SOI wafer, the first optical core layer 1001 is the top silicon layer of the SOI wafer, the first interspaced dielectric structure layer 11051 is a silicon nitride layer, the second optical core layer 11101 is made of III-V semiconductor materials (e.g. InGaAs/InGaAsP/InP or GaAs/AlGaAs material systems), and the first upper optical cladding layer 11201 is a silicon dioxide layer.

Up/Down Coupling Tapered Waveguide in Indirect Double-Optical-Layer EIC-PIC:

In an embodiment of the invention, the coupling between optical beam propagating in the second waveguide core layer 11101 and optical beam propagating in the first waveguide core layer 1001 is achieved using tapered waveguide vertical coupling structure as discussed below.

Figure 11B:
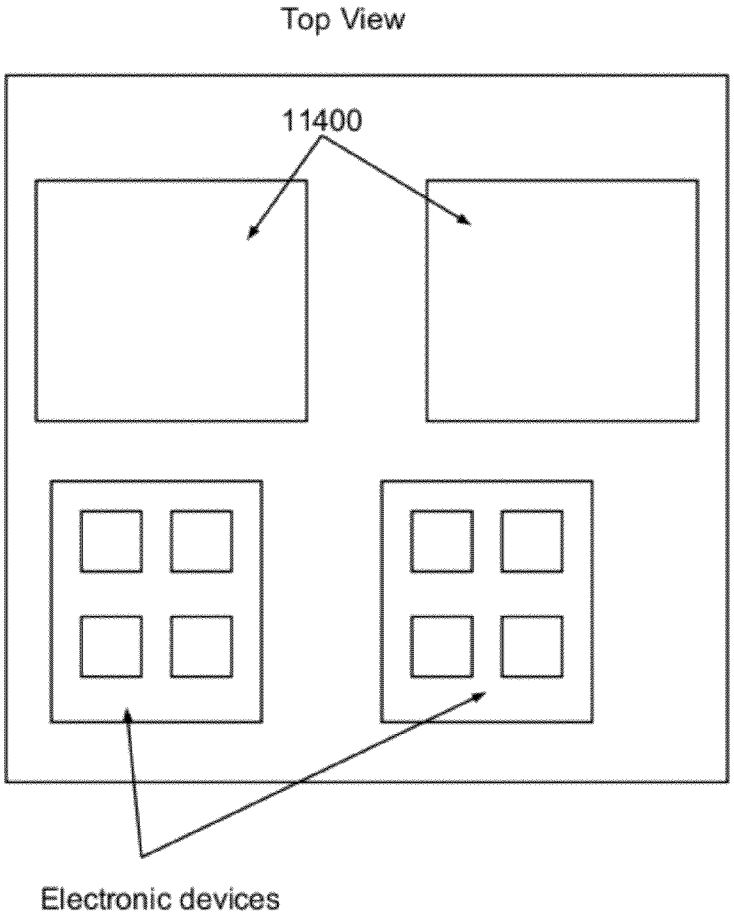
FIG. 11B illustrates an Indirect Double-Optical-Layer EIC-PIC (IDDOL-EIC-PIC) with multiple active photonic areas, in accordance with an embodiment of the invention.
Figure 11B:
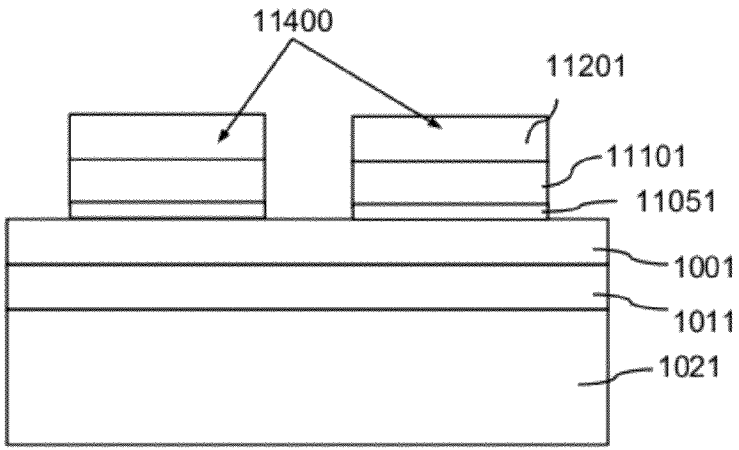
Figure 11C:
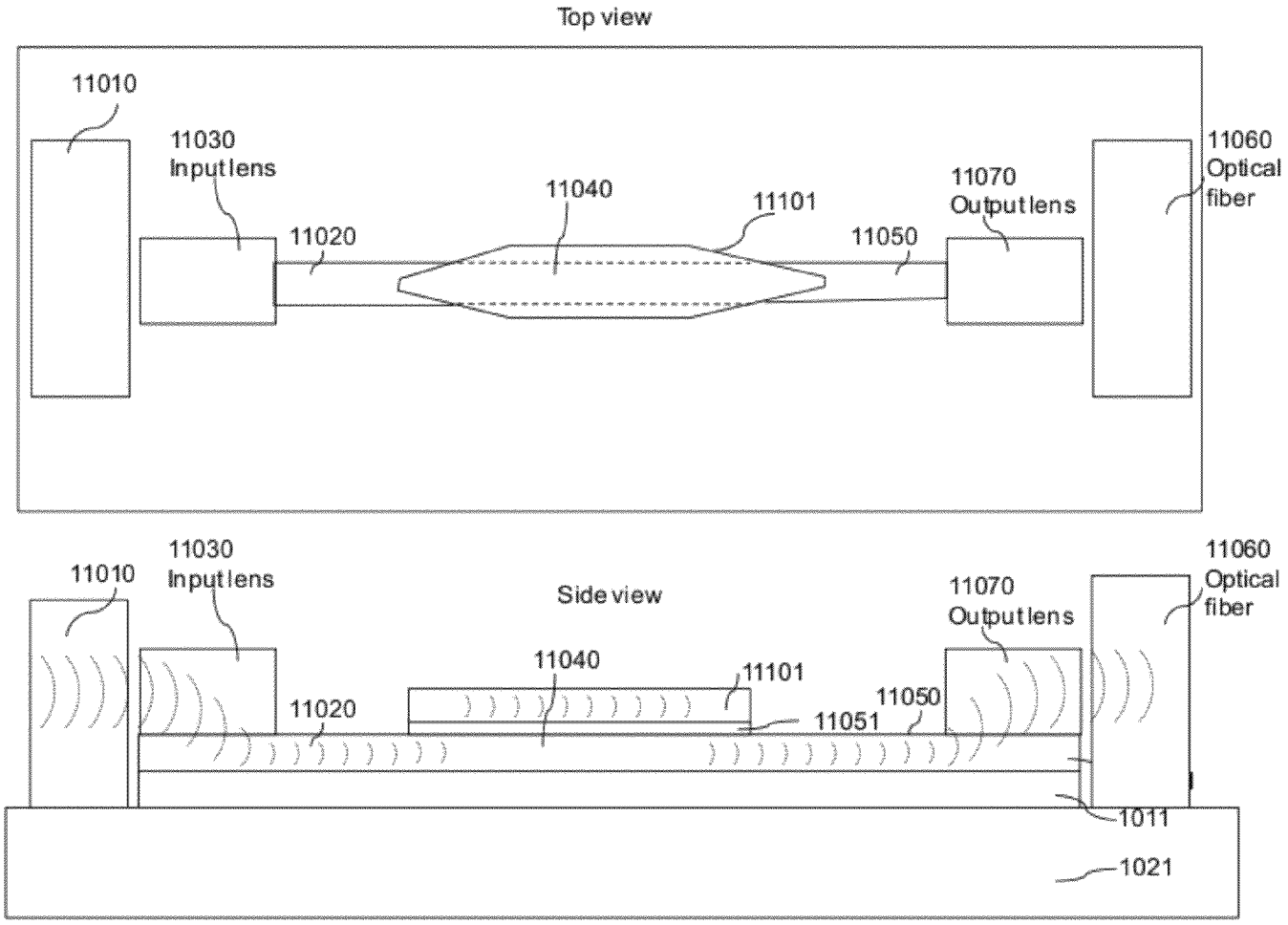
FIG. 11C illustrates an Indirect Double-Optical-Layer EIC-PIC (IDDOL-EIC-PIC) with tapered waveguide vertical coupling structures to couple light beam energy between a bottom waveguide core and a top waveguide core, in accordance with an embodiment of the invention.
Figure 11D:
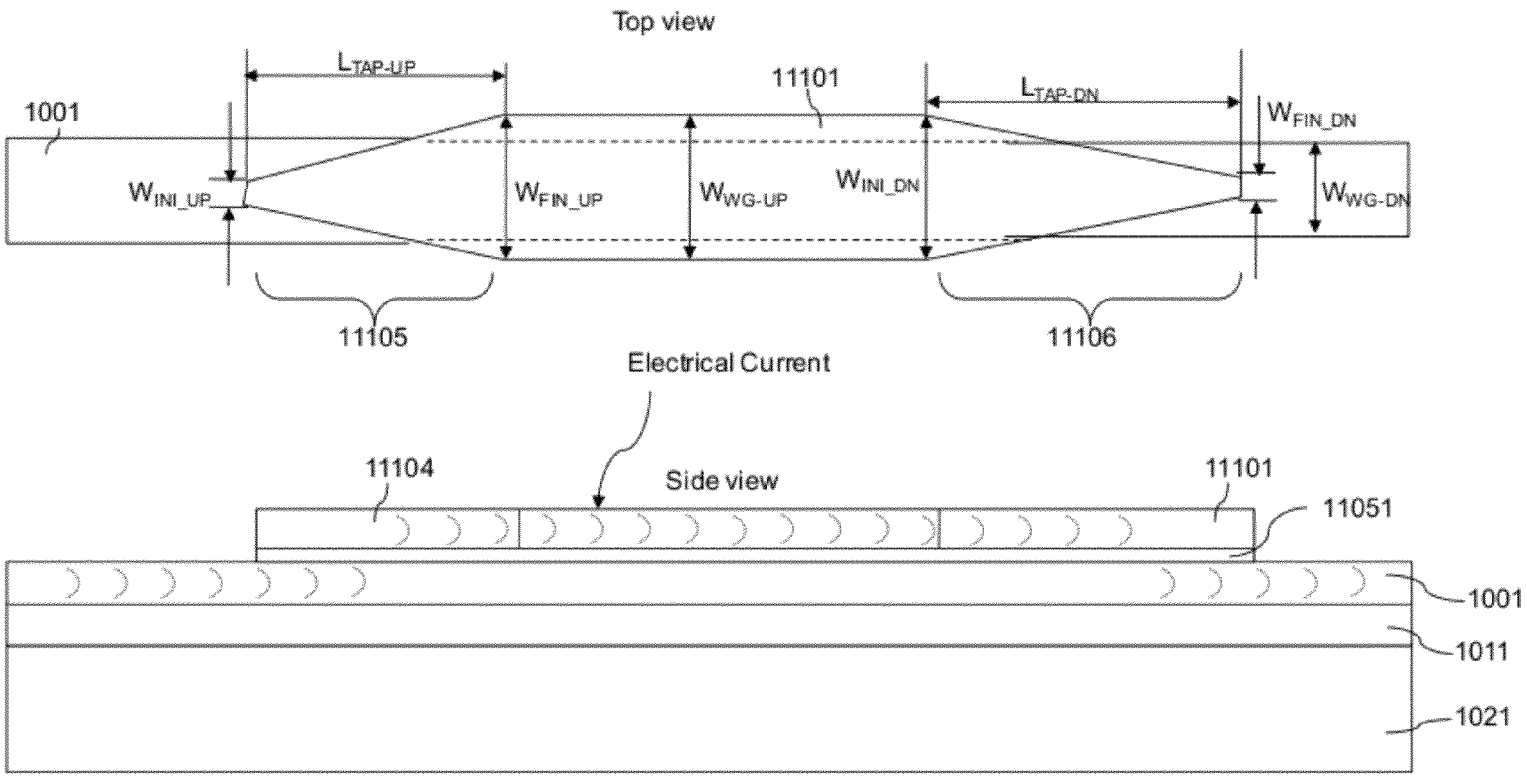
FIG. 11D illustrates a tapered waveguide vertical coupling structured to couple light beam energy between a bottom waveguide core and a top waveguide core, in accordance with an embodiment of the invention.

FIG. 11D illustrates the coupling of optical beam from propagating in layer 1001 up to propagating in layer 11101 which is achieved by using a tapered waveguide vertical up-coupling structure 11105. 11105 is a tapering waveguide section in layer 11101 tapering from an initial with $W_{INI-UP}$ to a final width $W_{FIN-UP}$ in a taper length $L_{TAP-UP}$. The waveguide width of layer 1101 $W_{WG-UP}$ and waveguide width of layer 1001 $W_{WG-DN}$ can be equal or different.

In another embodiment, the coupling of optical beam from propagating in layer 11101 down to propagating in layer 1001 is achieved by using an optical vertical down-coupling tapered waveguide structure 11106. 11106 is a tapering waveguide section in layer 11101 tapering from an initial with $W_{INI-DN}$ to a final width $W_{FIN-DN}$ in a taper length $L_{TAP-DN}$. The waveguide width of layer 1101 $W_{WG-UP}$ and waveguide width of layer 1001 $W_{WG-DN}$ can be equal or different.

The height of layer 1001 is $t_{EM}$, the height of layer 11101 is $t_{Ph}$, and the height of layer 11105 is $t_{DIE}$.

Tapered Waveguide Coupling Structure Design:

As is well known to those skilled in the art, if the first waveguide core layer 1001 has a propagating refractive index $n_E$, lower than the propagating refractive index $n_{Ph}$ of the second waveguiding core layer 11101 with width W=W (Z) at location Z, where Z is spatial displacement along the direction of propagation as shown in FIG. 11D. The propagating refractive index $n_{Ph}$ is a function of W and hence Z so that $n_{Ph}=n_{Ph}(W)=n_{Ph}(W(Z))$. A person skilled in the art will appreciate that the wider the W, the higher the $n_{Ph}$.

By tapering the waveguide 11105 so that W(Z) changes with Z in layer 11101, one can change the propagating index $n_{Ph}$ so that it matches the value of $n_{EI}$. At the region 11104 in FIG. 11D when $n_{Ph}$ is approximately equal to $n_{EI}$, there will be resonant waveguide coupling so that the wave will couple from the bottom waveguiding core 1001 to the top waveguiding core 11101. Similarly for the tapered waveguide coupler 11106, by tapering 11106, again at the region when $n_{Ph}=n_{EI}$, there will be resonant waveguide coupling so that the wave will couple from the top waveguiding core 11101 to the bottom waveguiding core 1001.

As is well known to those skilled in the art, the exact shape of the taper is not so important as to have one substantial length of the tapering section where $n_{Ph}=n_{EI}$. Hence the taper can have arbitrary curvilinear shape the way it changes its horizontal width W(Z) as a function of spatial coordinate distance Z along the direction of wave propagation. As is well known to those skilled in the art, when this substantial length is equal about one coupling length, there will be efficient transfer of light energy between the top and the bottom waveguiding core layers 11101 and 1001 (typically >90%). Thus, the taper's width typically will go from a width approximately equal to or larger than half the wavelength in the top waveguiding core 11101 to a width smaller than half the wavelength in the top waveguiding core 11101. The tapering length $L_{TAP-UP}$ or $L_{TAP-DN}$ is chosen so that a substantial length of the taper achieves near-resonant waveguide energy coupling as described above.

Once the optical beam energy is transferred from the lower waveguide core 1001 to the upper waveguide core 11101 and propagates into a straight waveguiding section with constant width, the energy will stay in 11101. This is because $n_{Ph}(W)$ will become higher than $n_{EI}$ (due to the increased width at the taper end connecting to the straight waveguiding section of 11101) so light energy will only guide in the upper waveguiding core 11101 until it meet with the down-coupling tapered waveguide.

Figure 11E:
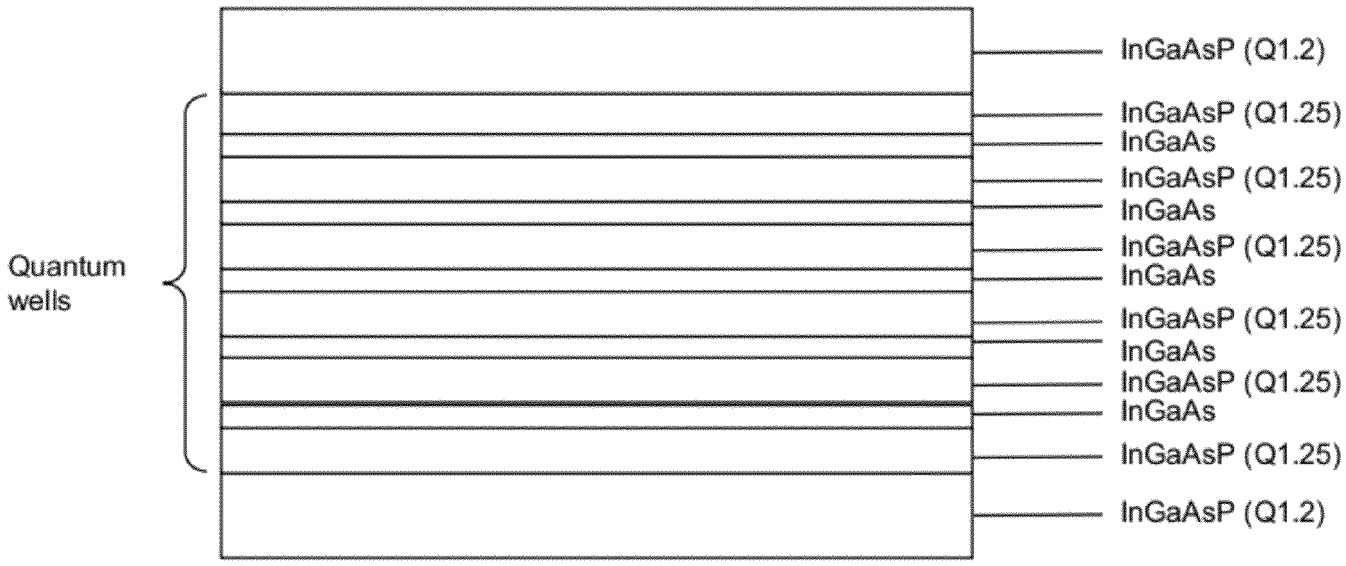
FIG. 11E illustrates the layer structure of a tapered waveguide vertical coupling in accordance with an embodiment of the invention.

In one exemplary embodiment, lower waveguide core layer 1001 is silicon with thickness $t_{EM}$=200 nm, upper waveguide core layer 11101 is InGaAs quantum well structure with five InGaAs quantum wells interspaced with InGaAsP barrier layers with the respective material bandgap energies and thicknesses shown in FIG. 11E and layer 11101 has a refractive index around $n_{2OL}=n_{InGaAsP}$=3.3 and a total thickness $t_{Ph}$=350 nm, layer 1001 has a refractive index around $n_{EM}=n_{Si}$=3.5, and dielectric layer 11051 is Silicon Nitride with a refractive index around $n_{SiN}$=2.0 and a thickness $t_{DIE}$=200 nm. The taper dimensions are $W_{INI-UP}=W_{FIN-DN}$=100 nm, $W_{INI-DN}=W_{FIN-UP}$=400 nm, $L_{TAP-UP}=L_{TAP-DN}$=30 μm, $W_{WG-UP}$=400 nm, $W_{WG-DN}$=400 nm. $n_{EI}$=2.2, $n_{Ph}$(400 nm)=2.383.

Figure 9:
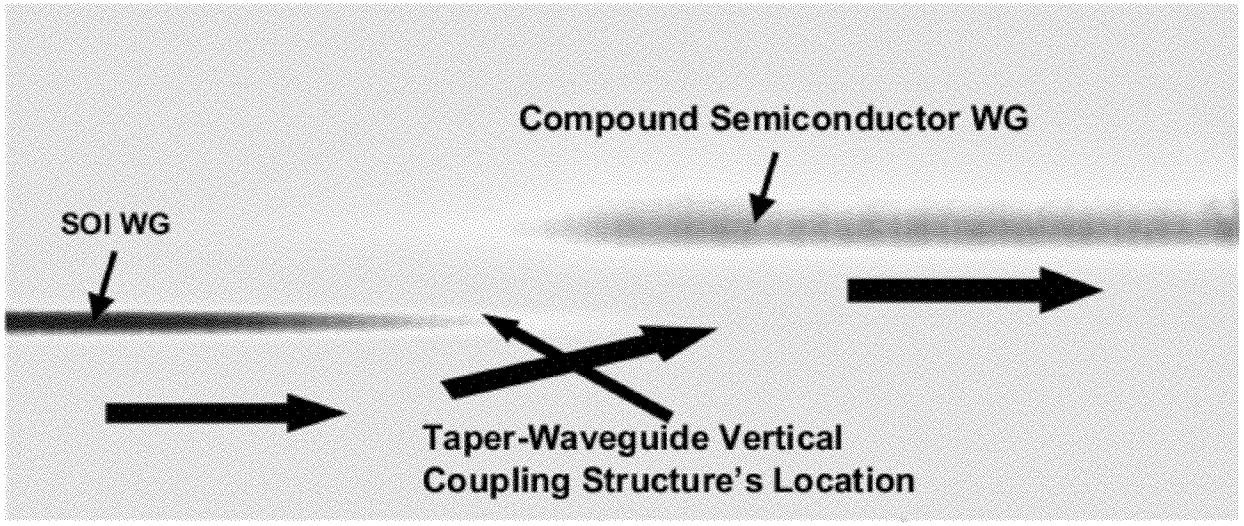
FIG. 9 illustrates electromagnetic simulation of light energy coupling from a lower silicon waveguide on SOI wafer to an upper compound semiconductor waveguide through a taper-waveguide vertical coupling structure, in accordance with an embodiment of the invention.

FIG. 9 shows an electromagnetic simulation of energy coupling from the bottom waveguiding core 1001 to the top waveguiding core 11101 through a taper-waveguide vertical coupling structure, in accordance with an embodiment of the invention.

Multiple Active Areas:

In one embodiment, the "active-layer structure" 11400 is placed on multiple sub-areas on the chip as illustrated by the top view and cross-sectional view in FIG. 11B. In one embodiment, these active-layer structure areas are placed using local-area-bonding technique to be described below.

Input or Output Lens:

In an exemplary embodiment of the invention, the IDDOL-EIC-PIC consists of at least one input or output optical-fiber coupling optics (i.e. it can have only one or more input coupling optics without any output coupling optics or only one or more output coupling optics without any input coupling optics. It can also have both input coupling optics and output coupling optics) FIG. 11C illustrates the case with one input optical-fiber coupling optics and one output optical-fiber coupling optics. At the input end, FIG. 11C shows the input optical-fiber coupling optics coupling light from the optical fiber 11010 into layer 1001 that forms a channel waveguide 11020 utilizing an integrated lens on layer 11030. In an exemplary embodiment of the invention, the input coupling optics 11030 is a Superlens. FIG. 11C shows the output optical-fiber coupling optics 11070 coupling light from layer 1001 formed into a channel waveguide 11050 to an output optical fiber 10060 utilizing an integrated lens 11070 on layer 1001. In an exemplary embodiment of the invention, the output coupling optics is a Superlens 11070. In an exemplary embodiment, the Superlens 11030 and Superlens 11070 are made up of two alternating thin dielectric layers that have different refractive indices. In an exemplary embodiment, the alternating layer is made up of silicon and silicon dioxide with a structure similar to the superlens 5030 illustrated in FIG. 5. In another exemplary embodiment, the input optical fiber 11010 or output optical fiber 11060 is held from below by a V-groove or a trench structure fabricated on the substrate 1021 to match the size of the fiber and hold it at the right height with respect to the lens optical center to achieve maximum coupling of light beam energy between the optical fiber and the waveguide on chip.

Photonic/Nanophotonic Device:

In an exemplary embodiment of the invention, the IDDOL-EIC-PIC consists of at least one photonic/nanophotonic device 11040, that can be an optical waveguide, an optical wavelength multiplexer, an optical wavelength demultiplxer, an optical grating, an optical beam splitter, a polarization beam splitter, an optical isolator, a polarization rotator, an optical interferometer, an optical modulator, an optical ring resonator, an optical disk resonator, an optical curved reflector, an optical mirror, an optical amplifier, a laser, a light-emitting device, an optical detector, a nonlinear-optical device, a photonic transistor, an optical harmonic frequency generator, an all-optical device, or other photonic/nanophotonic devices well known to those skilled in the art.

In an embodiment, layer 1001 is silicon which silicon cannot provide optical gain. Thus in the case of active optical devices such as optical amplifier, laser, or light-emitting device, up-down vertical coupling structure is used to transport beam from layer 1001 to layer 11101. Layer 11101 can then be made of an optical material with gain such as compound semiconductor material. Thus the Indirect Double-Optical-Layer structure can be used to achieve a wide range of active integrated optical devices that involve optical gain.

In an exemplary embodiment of device 11900 shown in FIG. 11D, layer 1001 is silicon and layer 11101 contains InGaAs quantum well structure with one or more InGaAs quantum wells inter-spaced with InGaAsP barrier material.

Silicon cannot provide optical power gain. However, as is well known to those skilled in the art, InGaAs quantum wells can provide optical gain under current injection. Optical beam at a wavelength of $\lambda_{OPT}$=1550 nm propagating in layer 1001 is coupled up to layer 11101 using vertical up-coupling tapered waveguide 11105 and propagates through the optical gain layer 11101 to achieve optical power gain. The beam is then coupled from layer 11101 down to layer 1001 using vertical down-coupling tapered waveguide 11106. In this exemplary embodiment, device 11900 acts as an optical amplifier.

Fabrication:

The IDDOL-EIC-PIC can be fabricated using an electronic device fabrication compatible process (e.g. CMOS compatible process) to realize at least one coupling lens and at least one optical device on the chip to be described below.

The various methods and systems described above for monolithic integration of active and/or passive photonic (and/or nanophotonic) devices in a way that is compatible with electronic integration will become clear with detailed descriptions of the methods and systems for the various exemplary EIC-PICs described below.

Figure 11F:
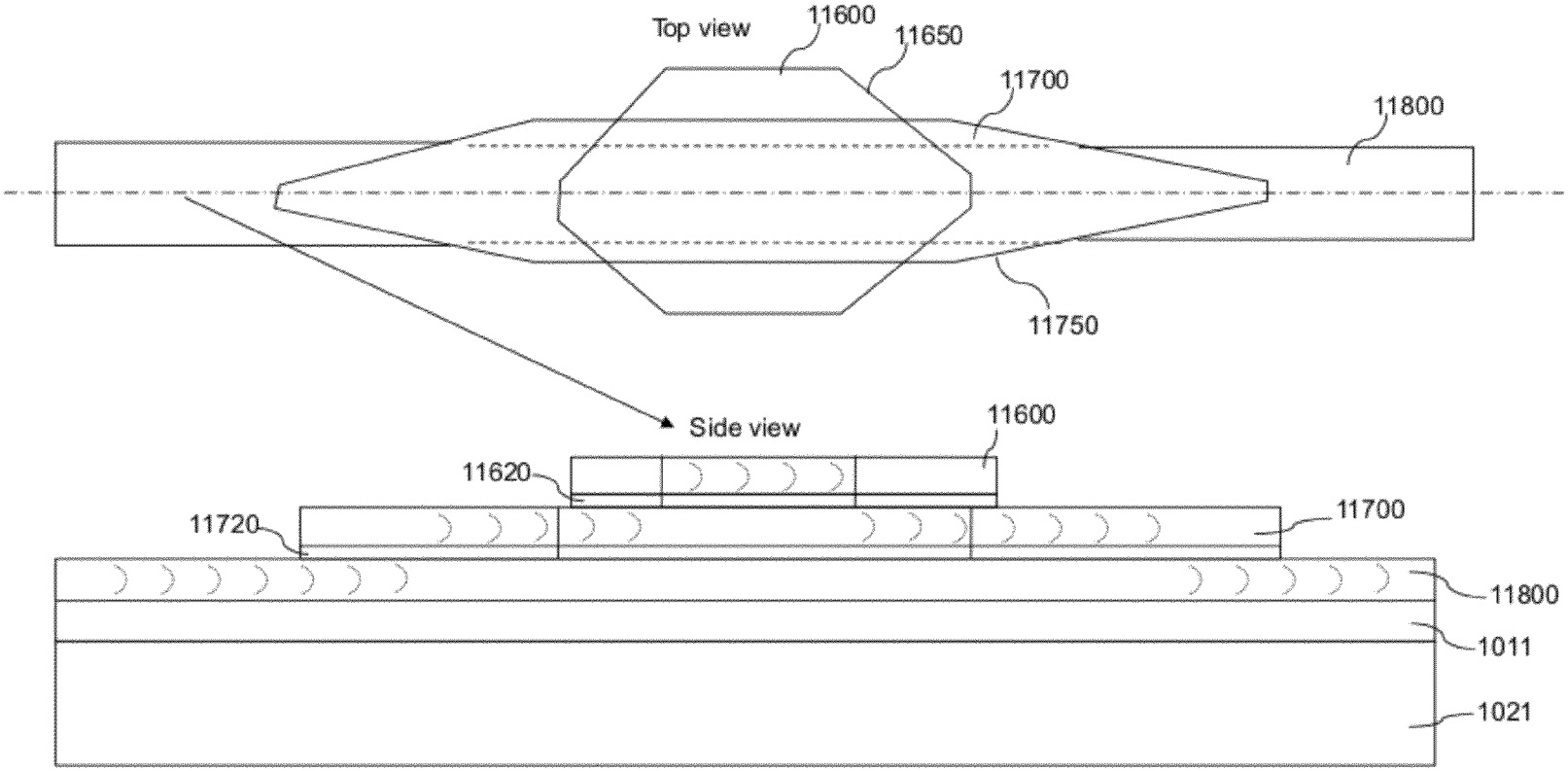
FIG. 11F illustrates a tapered waveguide vertical coupling structured to couple light beam energy between a bottom waveguide core and a top waveguide core, in accordance with an embodiment of the invention.

Indirect Triple-Optical-Layer EIC-PIC:

For the purpose of illustration but not limitation, as shown in FIG. 11F, the structure can be extended from double-optical layer to triple optical layer via the use of tapered waveguide coupler 11650 to vertically couple light from the top optical layer 11600 to the middle optical layer 11700 and similar tapered waveguide coupler to couple light from the middle optical layer 11700 to the top optical layer 11600, and the use of tapered waveguide coupler 11750 to vertically couple light from the middle optical layer 11700 to the bottom optical layer 11800 and similar tapered waveguide coupler to couple light from the bottom optical layer 11800 to the middle optical layer 11700. In FIG. 11D, the top optical layer 11600 is compound semiconductor (e.g. III-V semiconductor) layer with active or passive compound semiconductor based photonic devices. The middle optical layer 11700 is also compound semiconductor (e.g. III-V semiconductor) layer with active or passive compound semiconductor based photonic devices. The bottom optical layer 11800 is silicon semiconductor layer with active or passive silicon based photonic devices. The bottom layer is the top silicon layer of a SOI substrate wafer. In-between the optical layers is filled with low-refractive index dielectric material. Layer 11620 is a dielectric layer between the top optical layer 11600 and the middle optical layer 11700 and layer 11720 is a dielectric layer between the middle optical layer 11700 and the bottom optical layer 11800. Those skilled in the art will know how to generalize from three optical layers to more than three optical layers by stacking more optical layer inter-spaced with dielectric layers and the use of more tapered waveguide couplers for vertical coupling of light between two optical layers.

Exemplary CMOS Process:

In order to describe an exemplary electronic device and integrated circuit fabrication process, we will use the example of a CMOS process. Other electronic device fabrication methods have substantial similarity with a CMOS fabrication process. For example, the process always involve some steps of ion implantation and annealing at high temperature (1000° C.), and some steps of oxide growth at high temperature (1000° C.) Thus, the CMOS process is chosen for the purpose of illustration and not limitation. The purpose of illustration is to show how the photonic device integration process steps can be inserted to be made compatible with the high-temperature steps in an electronic device fabrication process. The details of the electronic device fabrication process are not essential and those skilled in the art will know how to adopt the exemplary embodiments to apply to different electronic device fabrication process accordingly.

As is known to those skilled in the art, a CMOS process for fabricating electronic devices can deviate somewhat from the exemplary typical CMOS process shown here. Such deviations typically will not affect the insertion of the photonic device processes described that are to be done at certain main process points in the CMOS process or an electronic device and integrated circuit fabrication process. The main process points are well illustrated by the exemplary typical CMOS process shown.

A typical CMOS process involves the following main steps:

Step 1: Start with SOI wafer with undoped or lightly doped top silicon layer for the SOI wafer.

Step 2  Insertion point H1** (Covering of the photonic-device area with protective material layer).

Step 3: P implant on most of the substrate area except the area of the SOI wafer intended to form low-loss silicon optical waveguide.

Step 4: Grow $SiO_2$ on Si (1000° C.).

Step 5: N-well ion implant

Step 6: Wafer annealing (1000° C., 15-30 mins)

Step 7:  Insertion point H2**

Step 8: Grow $SiO_2$ and $Si_3N_4$ for field oxide mask. (at around 1000° C.)

Step 9: Channel-stop implant, grow field oxide (FOX) (at around 1000° C.)

Step 10: Insertion point H3**

Step 11: Grow gate oxide (TOX)

Step 12: Threshold adjust implant

Step 13: Polysilicon deposition on TOX

Step 14: Insertion point H4**

Step 15: CVD oxide on Polysilicon

Step 16:  Insertion point H5**

Step 17: N+ source and drain implant

Step 18:  Insertion point H6**

Step 19: P+ source and drain implant

Step 20: Annealing 900-1100° C.

Step 21: Oxide spacer creation around gate

Step 22: Silicidation (conductive metal silicide on gate/drain/source)

Step 23:  Insertion point L1**

Step 24:  Insertion point L2**

Step 25:  Insertion point L3**

Step 26:  Insertion point L4**

Step 27:  Insertion point L5**

Step 28: Thick 500 nm oxide for metal masking

Step 29: Drain, gate, source and photonic device metal contact via multilevel metals More specifically, the steps are described in detail below. These steps include:

Step 1: Start with an SOI wafer with undoped or lightly doped top silicon layer for the SOI wafer.

Step 2:  Insertion point H1**. Will be used for depositing protective materials to cover of the photonic-device area.

Step 3: An optional step involving implanting P dopants on most of the substrate area except the area of the SOI wafer intended to form low-loss silicon optical waveguide.

Step 4: A thin film of $SiO_2$ dielectric layer is placed on a silicon (Si) wafer by heat treatment process involving a temperature of 1000° C. (Initial Oxidation). The wafer is patterned and the oxide is etched to form oxide mask with open window for N-Well oxidation.

Step 5: N-type dopants are implanted on the silicon wafer layer to form N-wells (N-Well implant).

Step 6: A process of Wafer Annealing is carried out to activate the implanted dopants. The process requires heat treatment involving a temperature of 1000° C. (N-Well drive-in). The oxide mask is then etched away. The structure formed after wafer annealing process is considered as a first substrate layer.

Step 7:  Insertion point H2** for fabrication of photonic device.

Step 8: A first dielectric layer of $SiO_2$ and a second dielectric layer of $Si_3N_4$ are deposited (at around 1000° C.) over the structure to form a mask for the growth of field oxide.

Step 9: A process of channel-stop ion implantation is carried out. The process involves creating a photo resist layer over the $SiO_2$ and $Si_3N_4$ layers that are then etched to form a mask. After performing channel stop field implant, the photo resist layer is removed and $Si_3N_4$ mask is also removed. and a thick oxide layer is grown (field oxidation) on the exposed portions of the silicon at 1000° C., thus producing thick Field Oxide (FOX). FOX grows in the area where $Si_3N_4$ layer is absent.

Step 10:  Insertion point H3** for fabrication of photonic device.

Step 11: Gate Oxide is grown on the areas where FOX is absent (gate oxidation). The growth of Gate Oxide acts as a gate dielectric (TOX).

Step 12: The process of growing TOX is followed by a threshold-adjust implantation to adjust native threshold voltage (threshold implant). The native threshold voltage is adjusted by implanting a thin layer of dopants near the surface of the structure.

Step 13: A polysilicon layer is deposited as a deposition layer on top of the gate dielectric (TOX) (polysilicon deposition).

Step 14: Insertion point H4**.

Step 15: A process of Chemical Vapor Deposition (CVD) is performed to place a CVD oxide layer on the polysilicon deposition layer. In CVD, the structure formed is exposed to one or more volatile precursors, which react and/or decompose on the surface to produce a desired deposit.

Step 16: Insertion point H5**.

Step 17: The patterning process is followed by N+ ion implantation to form N+ source region and N+ drain region (N+ Source/Drain).

Step 18:  Insertion point H6**.

Step 19: P+ dopants are implanted over source and drain terminals to form P+ source region and P+ drain region (P+ Source/Drain).

Step 20: A process of annealing is performed at 900-1100° C. to activate the implanted dopants.

Step 21: An oxide space is created around gate terminal, such that the deposition of the silicide during silicidation process will not short the gate region with source region or drain region.

Step 22: A process of silicidation is performed. The silicidation process involves depositing conductive material on gate region or source region or drain region through Chemical Vapor Deposition (CVD) process. The structure formed after the process of silicidation is considered as an integrated structure.

Step 23:  Insertion point L1**.

Step 24:  Insertion point L2**.

Step 25:  Insertion point L3**.

Step 26:  Insertion point L4**.

Step 27:  Insertion point L5**.

Step 28: Metal masking process is performed after the etching of superlens. A 500 nm thick oxide layer is used for the process of metal masking.

Step 29: The last step involves creation of metal contacts for drain region, source region, gate region and metal contacts for photonic devices using multi-level metals.

The steps labeled as H1 to H6 are insertion points for the fabrication steps of the photonic devices that are compatible with high temperature of 1000° C. used in the electronic device or integrated circuit fabrication process typified by the CMOS process illustrated. The steps labeled as L1 to L5 are insertion points for the fabrication steps of the photonic devices that are not compatible with high temperature of 1000° C. used in the electronic fabrication or CMOS process and have to be done after all those high-temperature process steps used in the electronic fabrication or CMOS process.

We will illustrate more specifically how the fabrication steps of EIC-PIC are compatible with the abovementioned CMOS process. To do so, we will illustrate them with the fabrication of EIC-PIC on SOI (Silicon on Insulator) wafer. It is done for the purpose of illustration and not limitation. We will illustrate the process steps for the cases of Single-Optical-Layer EIC-PIC (SOL-EIC-PIC), Direct Double-Optical-Layer EIC-PIC (DDOL-EIC-PIC), and Indirect Double-Optical-Layer EIC-PIC (IDDOL-EIC-PIC), respectively.

Figure 12A:
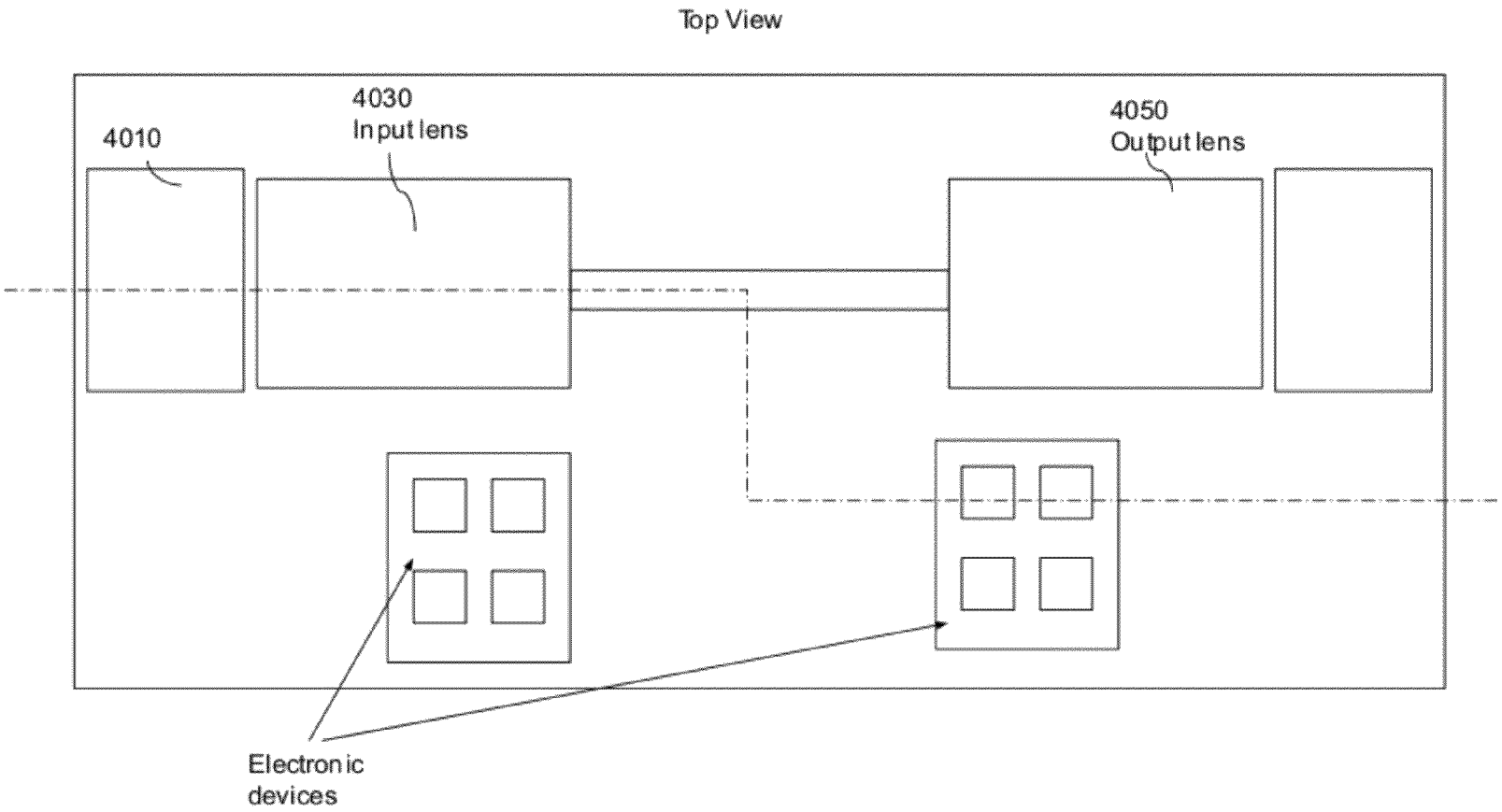
FIG. 12A illustrates the top view of a Single-Optical-Layer EIC-PIC (SOL-EIC-PIC) with multiple electronic device areas integrated with a photonic device area with a passive photonic device, in accordance with an embodiment of the invention.
Figure 12B:
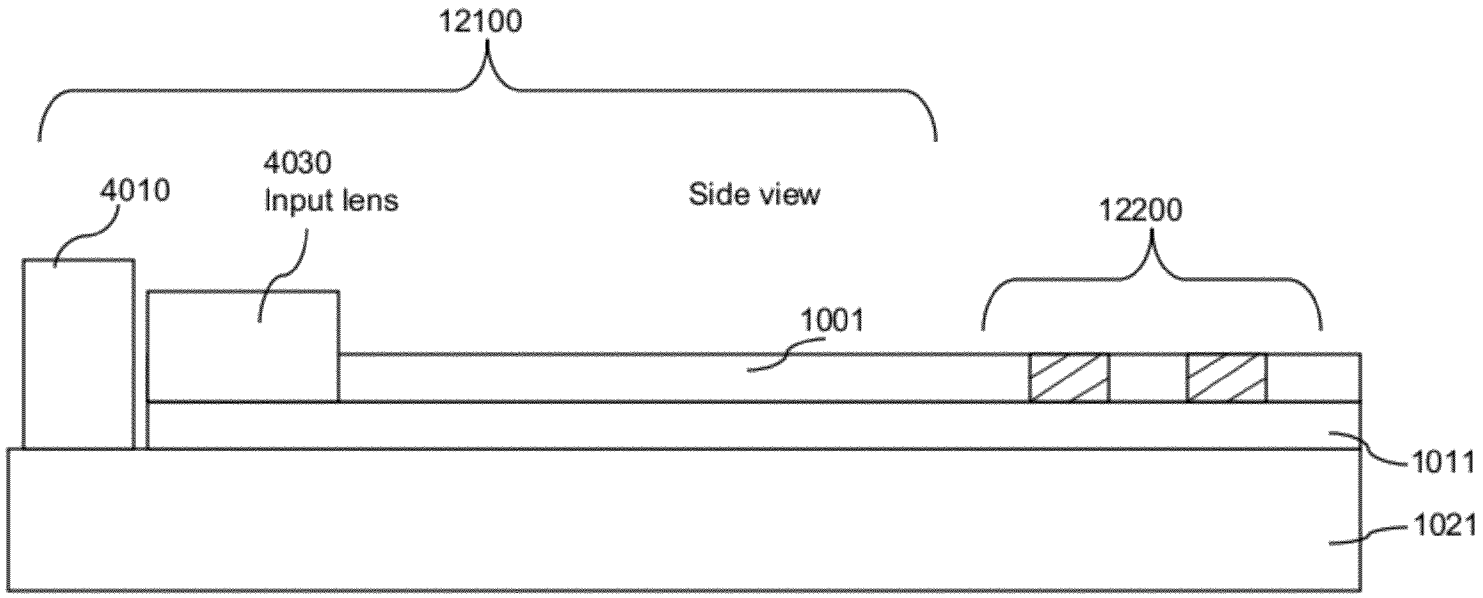
FIG. 12B illustrates the cross-sectional view of a Single-Optical-Layer EIC-PIC (SOL-EIC-PIC) with multiple electronic device areas integrated with a photonic device area with a passive photonic device, in accordance with an embodiment of the invention.

Exemplary CMOS Compatible Fabrication Steps for SOL-EIC-PIC Chip with Passive Photonic Device on Silicon:

The top view of an exemplary Single-Optical-Layer EIC-PIC (SOL-EIC-PIC) chip fabricated on SOI wafer is shown in FIG. 12A. The photonic devices on the chip is consisted of an input Superlens, optical waveguides and one or more passive photonic devices on Silicon, and an output Superlens. For the purpose of illustration, the passive device is an optical waveguide. The cross sectional view of the EIC-PIC chip is shown in FIG. 12B. It has one or more photonic areas and one or more electronic areas. In FIG. 12B, we illustrate the case of one photonic area 12100 and the case of one electronic area 12200. The photonic area shown is similar to that illustrated in FIG. 4. A typical CMOS-compatible process for fabricating a SOL-EIC-PIC with only passive photonic devices involves the following main steps:

Step 1: Start with SOI wafer with undoped or lightly doped top silicon layer for the SOI wafer.

Step 2  Insertion point H1** is used. It involves depositing thick layer of photonic-area protective material such as a few micron-thick silicon oxide or other materials (e.g. $In_2O_3$ etc) to cover the silicon area that photonic devices will be fabricated. The actual material and thickness to be used is depending on the later ion-implantation process. The material must have a thickness thick enough to stop most of the high-energy implanting ions to reach into the silicon layer in this area. This is to prevent crystal damage or optical loss caused by the potential implanting ions.

Step 3: P implant on most of the substrate area except the area of the SOI wafer intended to form low-loss silicon optical waveguide.

Step 4: Grow $SiO_2$ on Si (1000° C.)

Step 5: N-well ion implant

Step 6: Wafer annealing (1000° C., 15-30 mins)

Step 7:  Insertion point H2** (unused)

Step 8: Grow $SiO_2$ and $Si_3N_4$ for field oxide mask (at around 1000° C.).

Step 9: Channel-stop implant, grow field oxide (FOX) (at around 1000° C.)

Step 10: Insertion point H3** (unused)

Figure 13A:
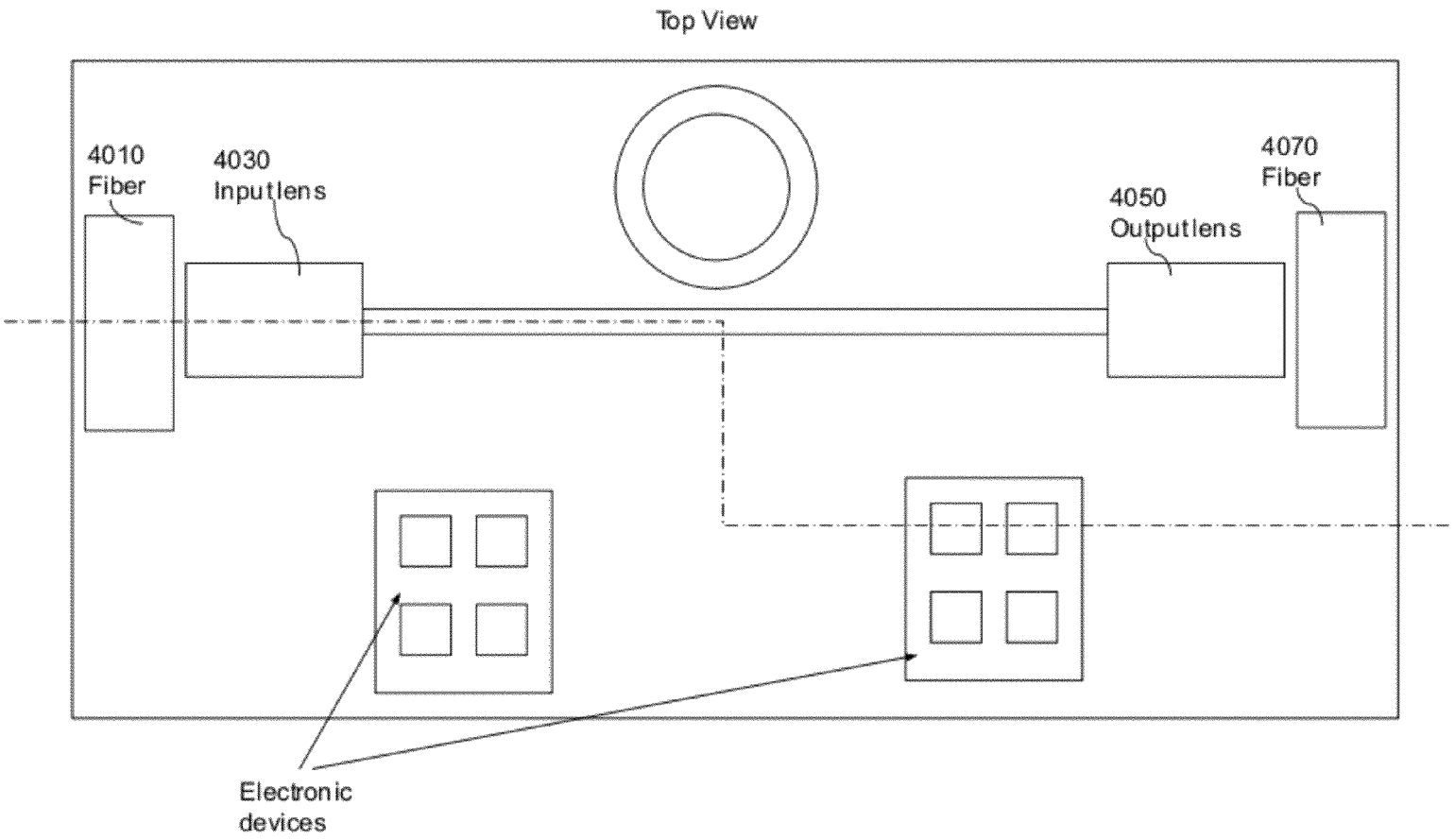
FIG. 13A illustrates the top view of a Single-Optical-Layer EIC-PIC (SOL-EIC-PIC) with multiple electronic device areas integrated with a photonic device area with an active and a passive photonic device, in accordance with an embodiment of the invention.
Figure 13B:
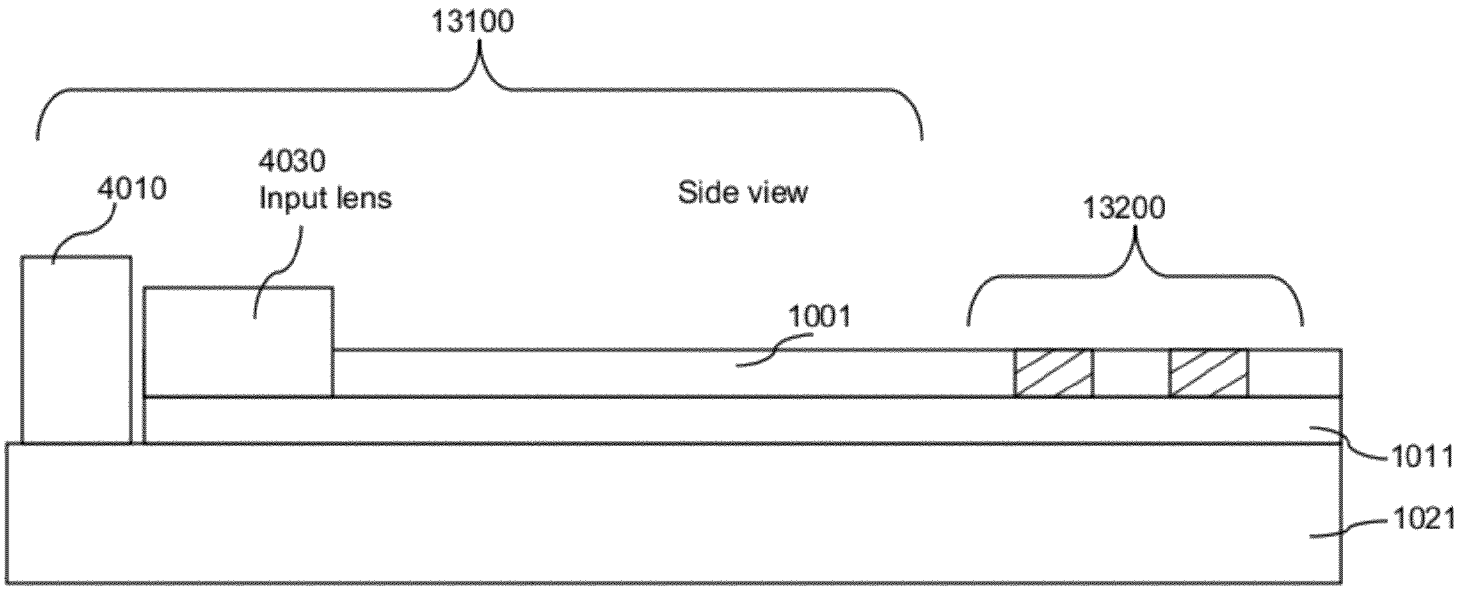
FIG. 13B illustrates the cross-sectional view of a Single-Optical-Layer EIC-PIC (SOL-EIC-PIC) with multiple electronic device areas integrated with a photonic device area with an active and a passive photonic device, in accordance with an embodiment of the invention.

Step 11: Grow gate oxide (TOX)
Step 12: Threshold adjust implant
Step 13: Polysilicon deposition on TOX
Step 14: Insertion point H4** (unused)
Step 15: CVD oxide on Polysilicon
Step 16:  Insertion point H5** (unused)
Step 17: N+ source and drain implant
Step 18:  Insertion point H6** (unused)
Step 19: P+ source and drain implant
Step 20: Annealing 900-1100° C.
Step 21: Oxide spacer creation around gate
Step 22: Silicidation (conductive metal silicide on gate/drain/source)
Step 23:  Insertion point L1** is used: The photonic-area protective material is removed. Lithographically pattern the silicon waveguides and passive silicon devices using typical lithography processes known to those skilled in the art such as photolithography or ebeam lithography. The silicon is then etched down to form the waveguide and device pattern using typical dry or wet etching technique known to those skilled in the art.
Step 24:  Insertion point L2** is not used.
Step 25:  Insertion point L3** is not used.
Step 26:  Insertion point L4** is used for depositing the multi-layer materials for the superlens structure.
Step 27:  Insertion point L5** is used for etching of the superlens, which is performed after the superlens deposition. During the process of deposition and etching of superlens, a protective cover material is maintained over the rest of the structure.
Step 28: Thick 500 nm oxide for metal masking.
Step 29: Drain, gate, source and photonic device metal contact via multilevel metals.
Step 30: Mounting an optical fiber on the substrate to facilitate a coupling of light beam energy between the optical fiber and an optical waveguide on the substrate through a coupling optics (e.g. the superlens);

This is not the only possible process, as an alternative, the passive photonic device and waveguides can also be fabricated during H1 as it will be compatible with the subsequent high-temperature process steps as shown by the steps below.
Step 1: Start with SOI wafer with undoped or lightly doped top silicon layer for the SOI wafer.
Step 2  Insertion point H1** is used. First, it involves lithographically pattern the silicon waveguides and passive silicon devices using typical lithography processes known to those skilled in the art such as photolithography or ebeam lithography. The silicon is then etched down to form the waveguide and device pattern using typical dry or wet etching technique known to those skilled in the art. It ends with depositing thick layer of photonic-area protective material such as a few micron-thick silicon oxide or other materials (e.g. $In_2O_3$ etc) to cover the silicon area that photonic devices have been or will be fabricated. The actual material and thickness to be used is depending on the later ion-implantation process. The material must have a thickness thick enough to stop most of the high-energy implanting ions to reach into the silicon layer in this area. This is to prevent crystal damage or optical loss caused by the potential implanting ions.
Step 3: P implant on most of the substrate area except the area of the SOI wafer intended to form low-loss silicon optical waveguide.
Step 4: Grow $SiO_2$ on Si (1000° C.)
Step 5: N-well ion implant
Step 6: Wafer annealing (1000° C., 15-30 mins)
Step 7:  Insertion point H2** (unused)
Step 8: Grow $SiO_2$ and $Si3N_4$ for field oxide mask (at around 1000° C.).
Step 9: Channel-stop implant, grow field oxide (FOX) (at around 1000° C.).
Step 10: Insertion point H3** (unused)
Step 11: Grow gate oxide (TOX)
Step 12: Threshold adjust implant
Step 13: Polysilicon deposition on TOX
Step 14: Insertion point H4** (unused)
Step 15: CVD oxide on Polysilicon
Step 16:  Insertion point H5** (unused)
Step 17: N+ source and drain implant
Step 18:  Insertion point H6** (unused)
Step 19: P+ source and drain implant
Step 20: Annealing 900-1100° C.
Step 21: Oxide spacer creation around gate
Step 22: Silicidation (conductive metal silicide on gate/drain/source)
Step 23:  Insertion point L1** is not used.
Step 24:  Insertion point L2** is not used.
Step 25:  Insertion point L3** is not used.
Step 26:  Insertion point L4** is used. The photonic-area protective material is removed. Multi-layer materials for the superlens structure is deposited.
Step 27:  Insertion point L5** is used for etching of the superlens is performed after deposition. During the process of deposition and etching of superlens, a protective cover material is maintained over the rest of the structure.
Step 28: Thick 500 nm oxide for metal masking.
Step 29: Drain, gate, source and photonic device metal contact via multilevel metals.
Step 30: Mounting an optical fiber on the substrate to facilitate a coupling of light beam energy between the optical fiber and an optical waveguide on the substrate through a coupling optics (e.g. the superlens);

Exemplary CMOS Compatible Fabrication Steps for SOL-EIC-PIC Chip with Passive and Active Photonic Device on Silicon:

The top view of an exemplary Single-Optical-Layer EIC-PIC (SOL-EIC-PIC) chip with passive and active photonic devices fabricated on SOI wafer is shown in FIG. 13A. The photonic device on the chip includes an input Superlens, optical waveguides and one passive and one active photonic device on Silicon, and an output Superlens. The exemplary active photonic device is silicon based optical ring or disk modulator requiring carrier injection using a capacitive gate and source structure. The exemplary passive photonic device is an optical waveguide. The cross sectional view of the EIC-PIC chip is shown in FIG. 13B. It has one or more photonic areas and one or more electronic areas. FIG. 13B illustrates the case of one photonic area 13100 and the case of one electronic area 13200. The photonic area shown is similar to that illustrated in FIG. 4. A typical CMOS-compatible process for fabricating a SOL-EIC-PIC with passive and active photonic devices involves the following main steps:
Step 1: Start with SOI wafer with undoped or lightly doped top silicon layer for the SOI wafer.
Step 2  Insertion point H1** is used. First, it involves lithographically patterning the silicon waveguides and passive silicon devices using typical lithography processes known to those skilled in the art such as photolithography or ebeam lithography. The silicon is then etched down to form the waveguide and ring or disk modulator device pattern using typical dry or wet etching technique known to those skilled in the art. It ends with depositing thick layer of photonic-area protective material such as a few micron-thick silicon oxide or other materials (e.g. $In_2O_3$ etc) to cover the silicon area that photonic devices have been or will be fabricated. The actual material and thickness to be used is depending on the later ion-implantation process. The material much have a thickness thick enough to stop most of the high-energy implanting ions to reach into the silicon layer in this area. This is to prevent crystal damage or optical loss caused by the potential implanting ions.

Step 3: P implant on most of the substrate area except the area of the SOI wafer intended to form low-loss silicon optical waveguide.

Step 4: Grow $SiO_2$ on Si (1000° C.)

Step 5: N-well ion implant

Step 6: Wafer annealing (1000° C., 15-30 mins)

Step 7: Insertion point H2** (not used).

Step 8: Grow $SiO_2$ and $Si_3N_4$ for field oxide mask (at around 1000° C.).

Step 9: Channel-stop implant, grow field oxide (FOX) (at around 1000° C.).

Step 10: Insertion point H3**. Open optical modulator top from the protective materials deposited in Step 2, P adjustment implant into modulator Step 11: Grow gate oxide (TOX)

Step 12: Threshold adjust implant

Step 13: Polysilicon deposition on TOX

Step 14: Insertion point H4**. A polysilicon or n-Transparent Conducting Oxide (n-TCO) or a combination of n-TCO and polysilicon layer is deposited as a deposition layer on top of the gate dielectric (TOX) (unused). Certain part of the deposition layer is subsequently removed by etching, in a way such that only portions of the deposition layer over the edges of the modulator are maintained and rest of the deposition layer is removed.

Step 15: CVD oxide on Polysilicon

Step 16:  Insertion point H5**. A pattern for N+ implant is created over the silicon based modulator. As an exemplary process, the process of patterning involves a process of depositing a negative photo resist and a process of photolithography. After photolithography all portions to receive n-F implants are exposed. N+ implant is then performed to achieve N+ dopant for the modulator. The area is covered by resist again to block it from the next implant step for transistor device.

Step 17: N+ source and drain implant for transistors.

Step 18:  Insertion point H6**. The N+ source region and the N+ drain region are protected by placing a resist cover over the implanted N+ source region and N+ drain region and then opening the silicon based modulator for implanting P+ dopants. P+ implant is then performed to achieve P+ dopant for the modulator. The area is covered by resist again to block it from the next implant step for transistor device.

Step 19: P+ source and drain implant for transistors.

Step 20: Annealing 900-1100° C.

Step 21: Oxide spacer creation around gate

Step 22: Silicidation (conductive metal silicide on gate/drain/source)

Step 23:  Insertion point L1** is not used.

Step 24:  Insertion point L2** is not used.

Step 25:  Insertion point L3** is not used.

Step 26:  Insertion point L4** is used. The photonic-area protective material is removed. Multi-layer materials for the superlens structure is deposited.

Step 27:  Insertion point L5** is used for etching of the superlens is performed after deposition. During the process of deposition and etching of superlens, a protective cover material is maintained over the rest of the structure.

Step 28: Thick 500 nm oxide for metal masking.

Step 29: Drain, gate, source and photonic device metal contact via multilevel metals.

Figure 14A:
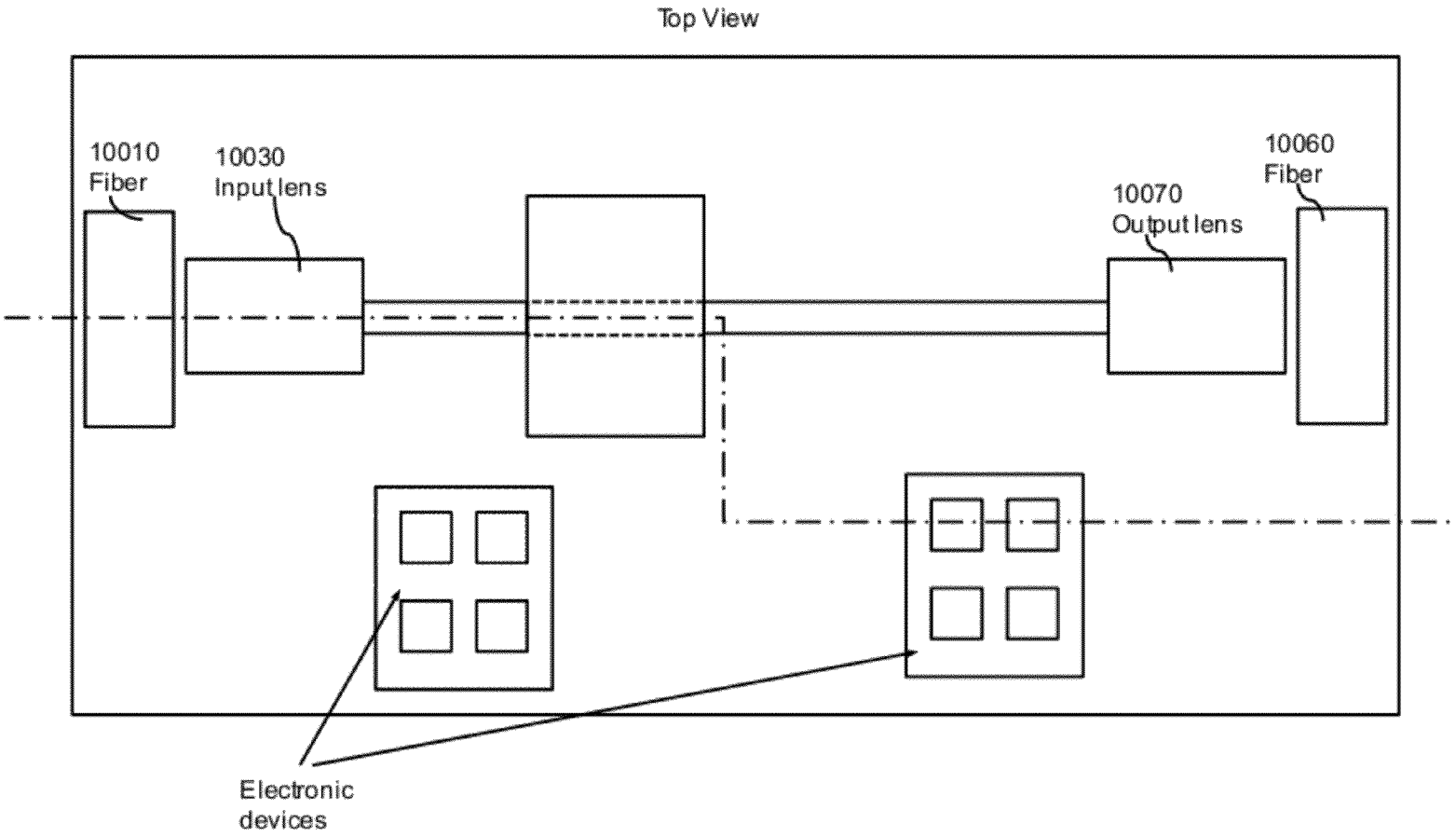
FIG. 14A illustrates the top view of a Direct Double-Optical-Layer EIC-PIC (DDOL-EIC-PIC) with multiple electronic device areas integrated with a photonic device area with an active and a passive photonic device, in accordance with an embodiment of the invention.
Figure 14B:
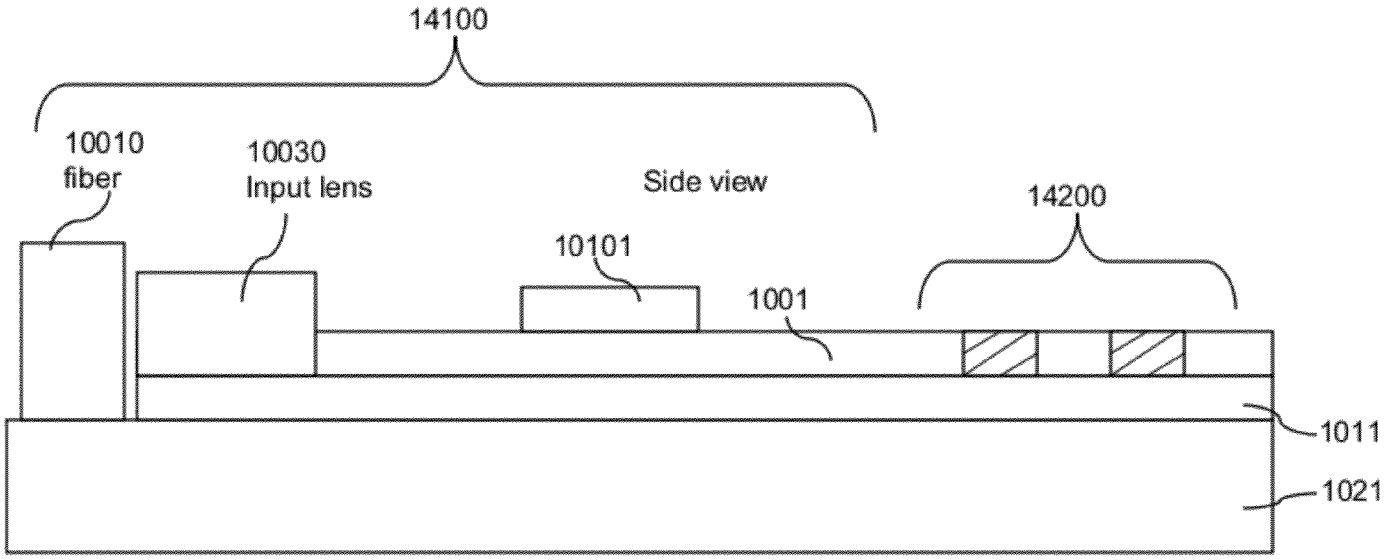
FIG. 14B illustrates the cross-sectional view of a Direct Double-Optical-Layer EIC-PIC (DDOL-EIC-PIC) with multiple electronic device areas integrated with a photonic device area with an active and a passive photonic device, in accordance with an embodiment of the invention.

Step 30: Mounting an optical fiber on the substrate to facilitate a coupling of light beam energy between the optical fiber and an optical waveguide on the substrate through a coupling optics (e.g. the superlens);

Exemplary CMOS Compatible Fabrication Steps for DDOL-EIC-PIC Chip with Passive Photonic Device on Silicon and Active Photonic Device on Compound Semiconductor:

The top view of an exemplary Direct Double-Optical-Layer EIC-PIC (DDOL-EIC-PIC) chip with passive and active photonic devices fabricated on SOI wafer is shown in FIG. 14A. The photonic devices on the chip include an input Superlens, optical waveguides and one passive photonic device on silicon and one active photonic device on compound semiconductor (e.g. InP/InGaAsP material system), and an output Superlens. The exemplary active photonic device is an optical amplifier requiring carrier injection. The cross sectional view of the EIC-PIC chip is shown in FIG. 14B. It has one or more photonic areas and one or more electronic areas. FIG. 14B illustrates the case of one photonic area 14100 and the case of one electronic area 14200. The photonic area shown is similar to that illustrated in FIGS. 10C and 10D. A typical CMOS-compatible process for fabricating a DDOL-EIC-PIC with passive and active photonic devices involves the following main steps:

Step 1: Start with SOI wafer with undoped or lightly doped top silicon layer for the SOI wafer.

Step 2  Insertion point H1** is used. First, it involves lithographically pattern the silicon waveguides and passive silicon devices using typical lithography processes known to those skilled in the art such as photolithography or ebeam lithography. The silicon is then etched down to form the waveguide and device pattern using typical dry or wet etching technique known to those skilled in the art. It ends with depositing thick layer of photonic-area protective material such as a few micron-thick silicon oxide or other materials (e.g. $In_2O_3$ etc) to cover the silicon area that photonic devices have been or will be fabricated. The actual material and thickness to be used is depending on the later ion-implantation process. The material much have a thickness thick enough to stop most of the high-energy implanting ions to reach into the silicon layer in this area. This is to prevent crystal damage or optical loss caused by the potential implanting ions.

Step 3: P implant on most of the substrate area except the area of the SOI wafer intended to form low-loss silicon optical waveguide.

Step 4: Grow $SiO_2$ on Si (1000° C.)

Step 5: N-well ion implant

Step 6: Wafer annealing (1000° C., 15-30 mins)

Step 7:  Insertion point H2** (unused)

Step 8: Grow $SiO_2$ and $Si_3N_4$ for field oxide mask (at around 1000° C.).

Step 9: Channel-stop implant, grow field oxide (FOX) (at around 1000° C.).

Step 10: Insertion point H3** (unused)

Step 11: Grow gate oxide (TOX)

Step 12: Threshold adjust implant

Step 13: Polysilicon deposition on TOX

Step 14: Insertion point H4** (unused)

Step 15: CVD oxide on Polysilicon

Step 16:  Insertion point H5** (unused)

Step 17: N+ source and drain implant

Step 18:  Insertion point H6** (unused)

Step 19: P+ source and drain implant

Figure 15A:
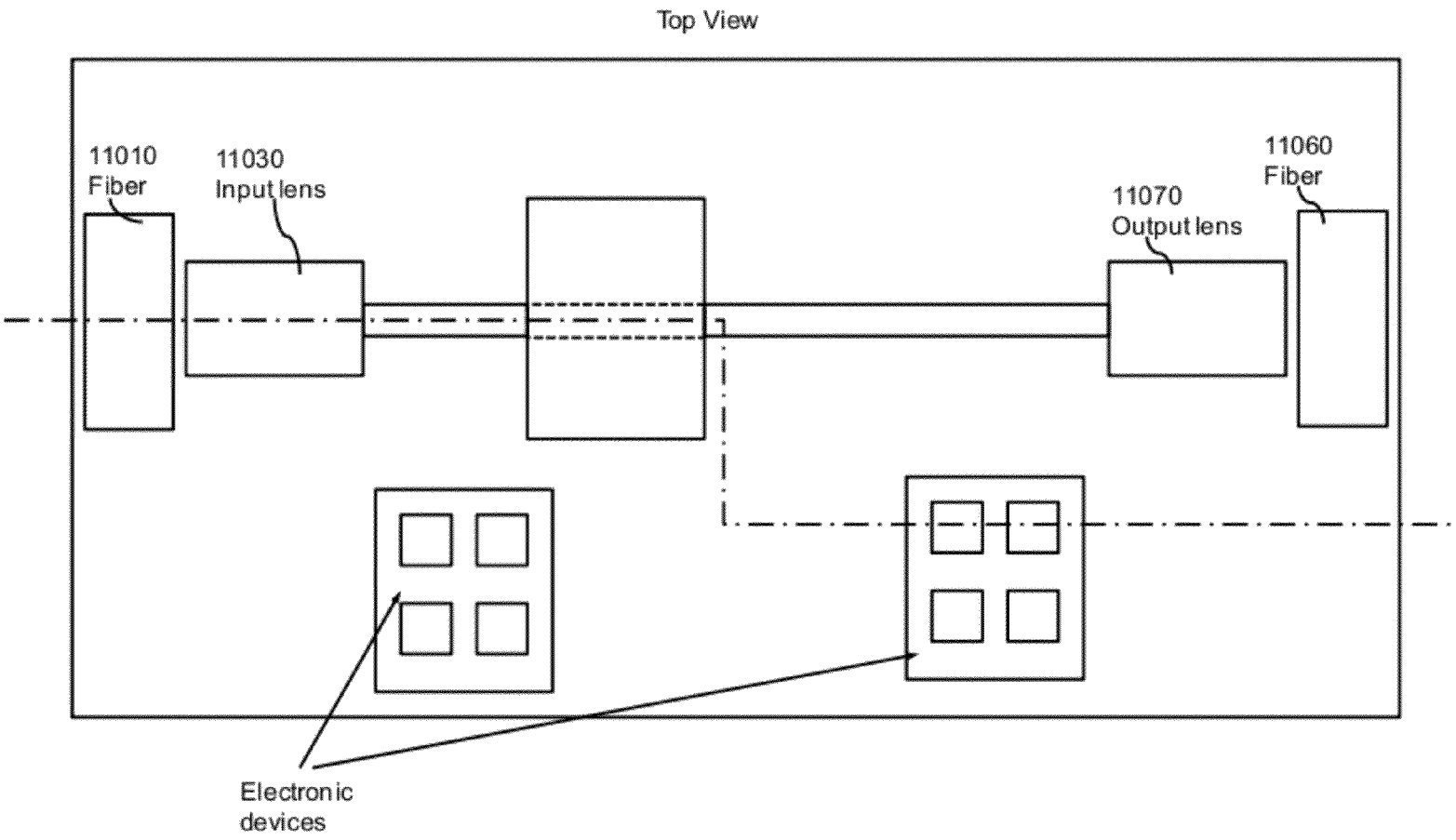
FIG. 15A illustrates the top view of an Indirect Double-Optical-Layer EIC-PIC (IDDOL-EIC-PIC) with multiple electronic device areas integrated with a photonic device area with an active and a passive photonic device, in accordance with an embodiment of the invention.
Figure 15B:
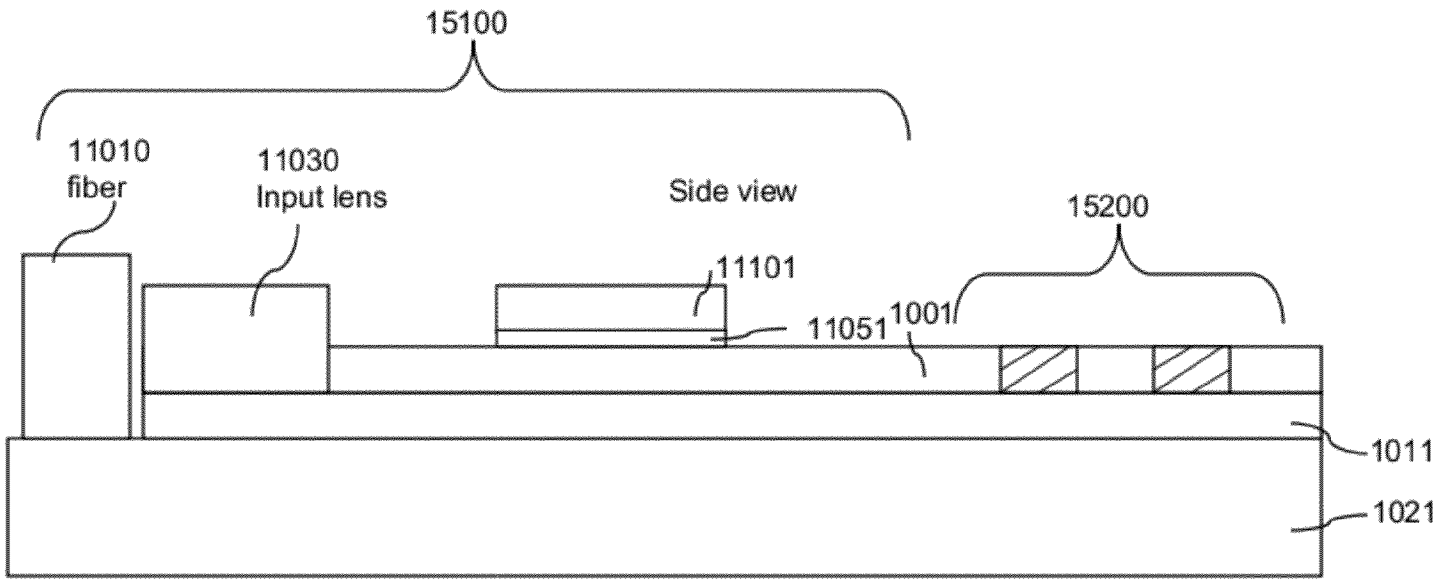
FIG. 15B illustrates the cross-sectional view of an Indirect Double-Optical-Layer EIC-PIC (IDDOL-EIC-PIC) with multiple electronic device areas integrated with a photonic device area with an active and a passive photonic device, in accordance with an embodiment of the invention.
Figure 16A:
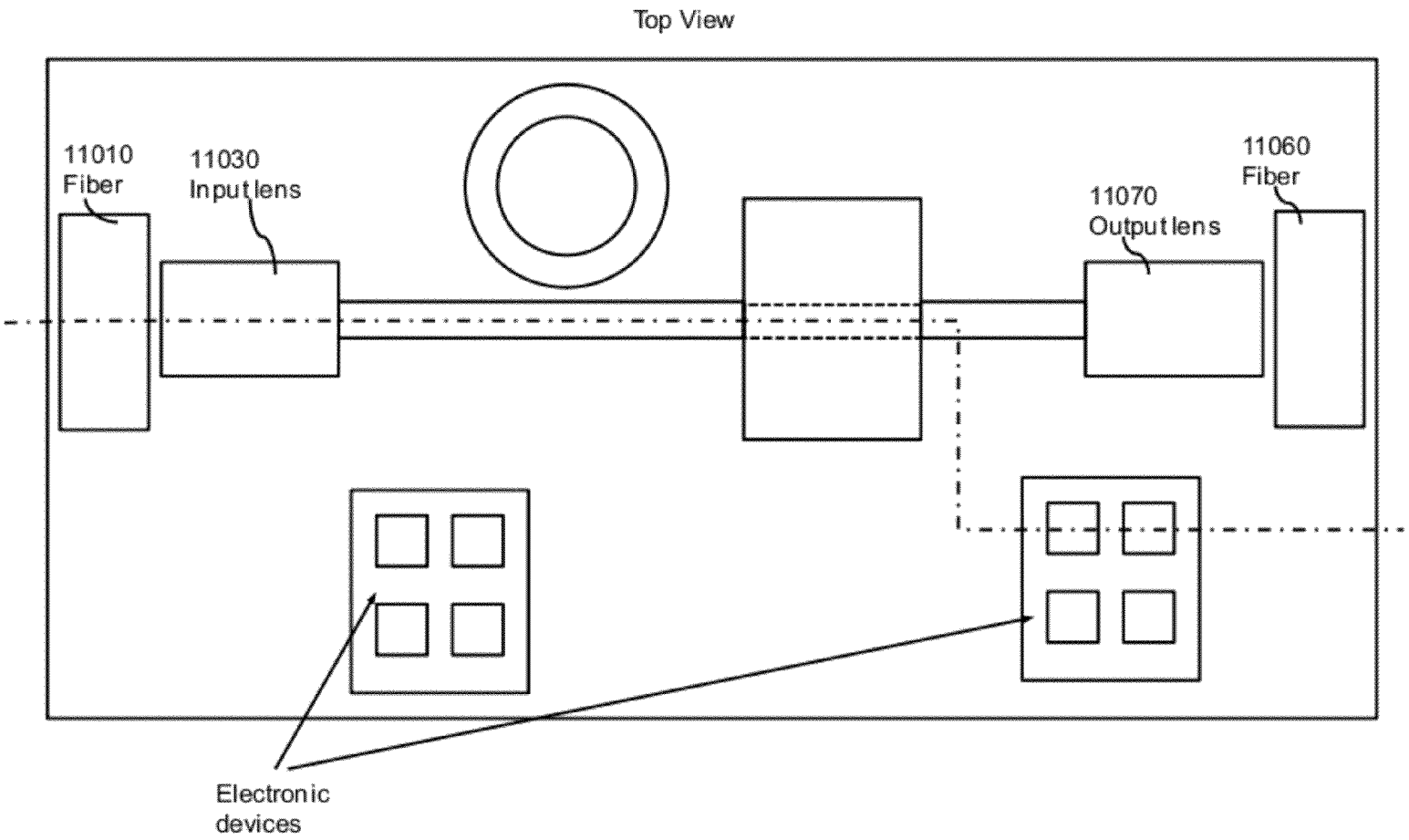
FIG. 16A illustrate the top view of an Indirect Double-Optical-Layer EIC-PIC (IDDOL-EIC-PIC) with multiple electronic device areas integrated with a photonic device area with multiple active and passive photonic devices, in accordance with an embodiment of the invention.
Figure 16B:
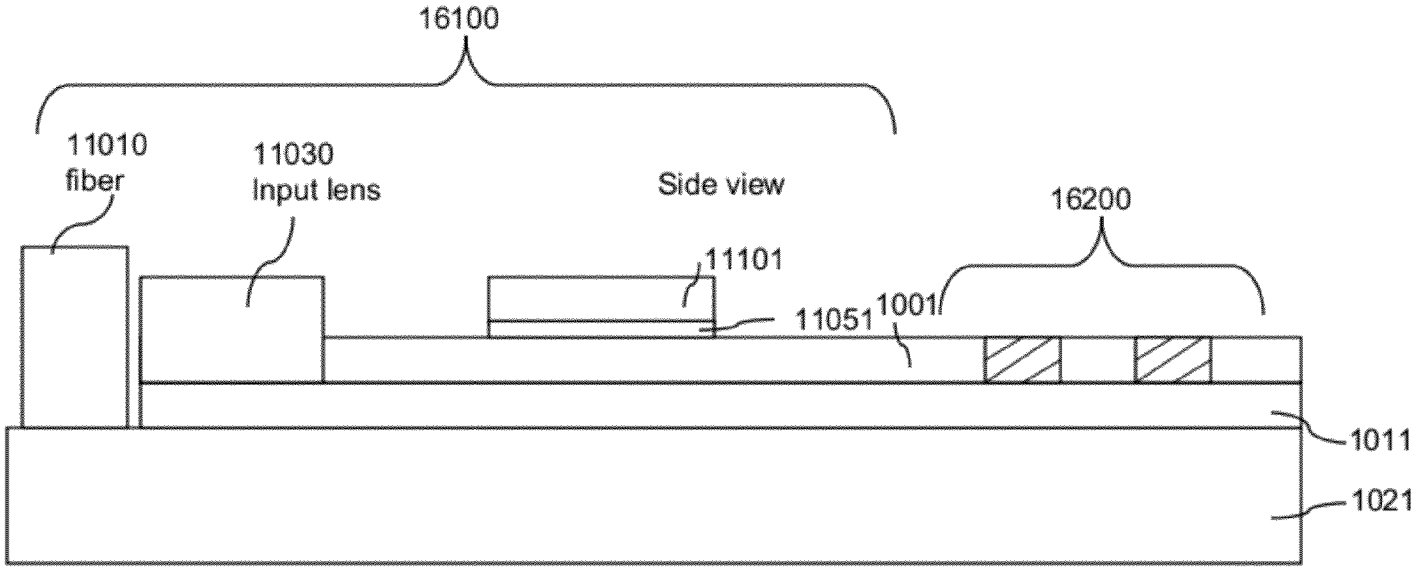
FIG. 16B illustrates the cross-sectional view of an Indirect Double-Optical-Layer EIC-PIC (IDDOL-EIC-PIC) with multiple electronic device areas integrated with a photonic device area with multiple active and passive photonic devices, in accordance with an embodiment of the invention.

Step 20: Annealing 900-1100° C.
Step 21: Oxide spacer creation around gate
Step 22: Silicidation (conductive metal silicide on gate/drain/source)
Step 23:  Insertion point L1**: The photonic-area protective material is removed. Compound semiconductor wafer bonding with the Silicon surface of the SOI substrate is carried out between the compound semiconductor surface and the silicon surface of the SOI substrate. The process of wafer bonding is further explained in detail.
Step 24:  Insertion point L2**: Quantum Well Intermixing (QWI) process is followed by the wafer-bonding process. The QWI process involves implanting ions into a number of quantum wells using thin layer of oxides as an implant mask. The QWI process can also be performed before the wafer bonding process, depending on situation.
Step 25:  Insertion point L3**: After QWI, during a process of compound semiconductor device (e.g. InP/InGaAsP device) fabrication, a protective cover material is applied over the compound semiconductor device to protect the compound semiconductor device from the superlens processes.
Step 26:  Insertion point L4** is used for depositing the multi-layer materials for the superlens structure.
Step 27:  Insertion point L5** is used for etching of the superlens is performed after deposition. During the process of deposition and etching of superlens, a protective cover material is maintained over the rest of the structure.
Step 28: Thick 500 nm oxide for metal masking.
Step 29: Drain, gate, source and photonic device metal contact via multilevel metals.
Step 30: Mounting an optical fiber on the substrate to facilitate a coupling of light beam energy between the optical fiber and an optical waveguide on the substrate through a coupling optics (e.g. the superlens);

Exemplary CMOS Compatible Fabrication Steps for IDDOL-EIC-PIC Chip with Passive Photonic Device on Silicon and Active Photonic Device on Compound Semiconductor:

The top view of an exemplary Indirect Double-Optical-Layer EIC-PIC (IDDOL-EIC-PIC) chip with passive and active photonic devices fabricated on SOI wafer is shown in FIG. 15A. The photonic devices on the chip includes an input Superlens, optical waveguides and one passive photonic device on silicon and one active photonic device on compound semiconductor (e.g. InP/InGaAsP material system), and an output Superlens. The exemplary active photonic device is an optical amplifier requiring carrier injection. The cross sectional view of the EIC-PIC chip is shown in FIG. 15B. It has one or more photonic areas and one or more electronic areas. FIG. 15B illustrates the case of one photonic area 15100 and the case of one electronic area 15200. The photonic area shown is similar to that illustrated in FIG. 11C. A typical CMOS-compatible process for fabricating a DDOL-EIC-PIC with passive and active photonic devices involves the following main steps:
Step 1: Start with SOI wafer with undoped or lightly doped top silicon layer for the SOI wafer.
Step 2  Insertion point H1** is used. First, it involves lithographically pattern the silicon waveguides and passive silicon devices using typical lithography processes known to those skilled in the art such as photolithography or ebeam lithography. The silicon is then etched down to form the waveguide and device pattern using typical dry or wet etching technique known to those skilled in the art. It ends with depositing thick layer of photonic-area protective material such as a few micron-thick silicon oxide or other materials (e.g. $In_2O_3$ etc) to cover the silicon area that photonic devices have been or will be fabricated. The actual material and thickness to be used is depending on the later ion-implantation process. The material much have a thickness thick enough to stop most of the high-energy implanting ions to reach into the silicon layer in this area. This is to prevent crystal damage or optical loss caused by the potential implanting ions.
Step 3: P implant on most of the substrate area except the area of the SOI wafer intended to form low-loss silicon optical waveguide.
Step 4: Grow $SiO_2$ on Si (1000° C.)
Step 5: N-well ion implant
Step 6: Wafer annealing (1000° C., 15-30 mins)
Step 7:  Insertion point H2** (unused)
Step 8: Grow $SiO_2$ and $Si_3N_4$ for field oxide mask (at around 1000° C.).
Step 9: Channel-stop implant, grow field oxide (FOX) (at around 1000° C.).
Step 10: Insertion point H3** (unused)
Step 11: Grow gate oxide (TOX)
Step 12: Threshold adjust implant
Step 13: Polysilicon deposition on TOX
Step 14: Insertion point H4** (unused)
Step 15: CVD oxide on Polysilicon
Step 16:  Insertion point H5** (unused)
Step 17: N+ source and drain implant
Step 18:  Insertion point H6** (unused)
Step 19: P+ source and drain implant
Step 20: Annealing 900-1100° C.
Step 21: Oxide spacer creation around gate
Step 22: Silicidation (conductive metal silicide on gate/drain/source)
Step 23:  Insertion point L1**: The photonic-area protective material is removed. Compound semiconductor wafer bonding with the Silicon surface of the SOI substrate is carried out between a $Si_3N_4$ layer deposited on the integrated structure and an $Si_3N_4$ layer deposited on the silicon surface of the SOI substrate wafer. The process of wafer bonding is separately explained in detail.
Step 24:  Insertion point L2**: Quantum Well Intermixing (QWI) process is followed by the wafer-bonding process. The QWI process involves implanting ions into a number of quantum wells using thin layer of oxides as an implant mask. The QWI process can also be performed before the wafer bonding process, depending on situation.
Step 25:  Insertion point L3**: After QWI, during a process of an compound semiconductor device fabrication, a protective cover material is applied over the compound semiconductor device to protect the compound semiconductor device from superlens processes.
Step 26:  Insertion point L4** is used for depositing the multi-layer materials for the superlens structure.
Step 27:  Insertion point L5** is used for etching of the superlens is performed after deposition. During the process of deposition and etching of superlens, a protective cover material is maintained over the rest of the structure.
Step 28: Thick 500 nm oxide for metal masking.
Step 29: Drain, gate, source and photonic device metal contact via multilevel metals.
Step 30: Mounting an optical fiber on the substrate to facilitate a coupling of light beam energy between the optical fiber and an optical waveguide on the substrate through a coupling optics (e.g. the superlens);

Exemplary CMOS Compatible Fabrication Steps for IDDOL-EIC-PIC Chip with Passive/Active Photonic Device on Silicon and Passive/Active Photonic Device on Compound Semiconductor:

The top view of an exemplary Indirect Double-Optical-Layer EIC-PIC (IDDOL-EIC-PIC) chip with passive and active photonic devices fabricated on SOI wafer is shown in FIG. 16A. The photonic devices on the chip includes an input Superlens, optical waveguides and one passive and one active photonic device on silicon and one active and one passive photonic device on compound semiconductor (e.g. InP/InGaAsP material system), and an output Superlens. The exemplary active photonic device on compound semiconductor (e.g. InP/InGaAsP material system) is an optical amplifier requiring carrier injection. The exemplary active photonic device on Silicon is a ring or disk resonator modulator. The passive devices on compound semiconductor and Silicon are waveguides. The cross sectional view of the EIC-PIC chip is shown in FIG. 16B. It has one or more photonic areas and one or more electronic areas. FIG. 16B illustrates the case of one photonic area 16100 and the case of one electronic area 16200. The photonic area shown is similar to that illustrated in FIG. 11C. A typical CMOS-compatible process for fabricating a DDOL-EIC-PIC with passive and active photonic devices involves the following main steps:

Step 1: Start with SOI wafer with undoped or lightly doped top silicon layer for the SOI wafer.

Step 2  Insertion point H1** is used. First, it involves lithographically pattern the silicon waveguides and passive silicon devices using typical lithography processes known to those skilled in the art such as photolithography or ebeam lithography. The silicon is then etched down to form the waveguide and device pattern using typical dry or wet etching technique known to those skilled in the art. It ends with depositing thick layer of photonic-area protective material such as a few micron-thick silicon oxide or other materials (e.g. $In_2O_3$ etc) to cover the silicon area that photonic devices have been or will be fabricated. The actual material and thickness to be used is depending on the later ion-implantation process. The material much have a thickness thick enough to stop most of the high-energy implanting ions to reach into the silicon layer in this area. This is to prevent crystal damage or optical loss caused by the potential implanting ions.

Step 3: P implant on most of the substrate area except the area of the SOI wafer intended to form low-loss silicon optical waveguide.

Step 4: Grow $SiO_2$ on Si (1000° C.)

Step 5: N-well ion implant

Step 6: Wafer annealing (1000° C., 15-30 mins)

Step 7: Insertion point H2 is used. A pattern for creating a nano-waveguide and a silicon-based ring or disk modulator is created on the first substrate layer. The nano waveguide is typically 0.3 μm thick.

Step 8: Grow $SiO_2$ and $Si_3N_4$ for field oxide mask (at around 1000° C.).

Step 9: Channel-stop implant, grow field oxide (FOX) (at around 1000° C.).

Step 10: Insertion point H3 is used. Portions of $SiO_2$ and $Si_3N_4$ dielectric layers placed over the modulator are removed to open the modulator for p-type adjustment of dopants.

Step 11: Grow gate oxide (TOX)

Step 12: Threshold adjust implant

Step 13: Polysilicon deposition on TOX

Step 14: Insertion point H4 is used. A polysilicon or n-Transparent Conducting Oxide (n-TCO) or a combination of n-TCO and polysilicon layer is deposited as a deposition layer on top of the gate dielectric (TOX).

Step 15: CVD oxide on Polysilicon

Step 16:  Insertion point H5** (unused)

Step 17: N+ source and drain implant

Step 18:  Insertion point H6** (unused)

Step 19: P+ source and drain implant

Step 20: Annealing 900-1100° C.

Step 21: Oxide spacer creation around gate

Step 22: Silicidation (conductive metal silicide on gate/drain/source)

Step 23:  Insertion point L1**: The photonic-area protective material is removed. Compound semiconductor wafer bonding with the Silicon surface of the SOI substrate is carried out between an $Si_3N_4$ layer deposited on the integrated structure and an $Si_3N_4$ layer deposited on the silicon surface of the SOI substrate wafer. The process of wafer bonding is separately explained in detail.

Step 24:  Insertion point L2**: Quantum Well Intermixing (QWI) process is followed by the wafer-bonding process. The QWI process involves implanting ions into a number of quantum wells using thin layer of oxides as an implant mask. The QWI process can also be performed before the wafer bonding process, depending on situation.

Step 25:  Insertion point L3**: After QWI, during a process of an compound semiconductor device fabrication, a protective cover material is applied over the compound semiconductor device (e.g. InP/InGaAsP device) to protect the compound semiconductor device from superlens processes.

Step 26:  Insertion point L4** is used for depositing the multi-layer materials for the superlens structure.

Step 27:  Insertion point L5** is used for etching of the superlens is performed after deposition. During the process of deposition and etching of superlens, a protective cover material is maintained over the rest of the structure.

Step 28: Thick 500 nm oxide for metal masking.

Step 29: Drain, gate, source and photonic device metal contact via multilevel metals.

Step 30: Mounting an optical fiber on the substrate to facilitate a coupling of light beam energy between the optical fiber and an optical waveguide on the substrate through a coupling optics (e.g. the superlens);

The exemplary embodiments above are for the purpose of illustration and not limitation. For example, while illustrated for compound semiconductor (e.g. InP/InGaAsP system,) based devices, they can be modified for other materials for fabricating active photonic devices. Also, it is well known to those skilled in the art that there are more than one ways for the CMOS process steps. The main idea here is the division of the CMOS process steps into two categories: the steps before the last high-temperature process step (high-temperature steps are steps involving temperature above 400° C.), and the steps after the last high-temperature process step. The insertion points for the fabrication of the photonic devices can also be categorized into two categories: the high-temperature insertion points before the last high-temperature CMOS process step (high-temperature steps are steps involving temperature above 400° C.), and the low-temperature insertion points after the last high-temperature process step. The main idea is that the wafer bonding or local-area wafer bonding of the photonic layer structure shall be done after the last high-temperature CMOS process step at the low-temperature insertion points. This is because the photonic layer structure usually contains compound semiconductor materials that can decompose under temperature higher than approximately 500° C. for a relatively long time period of longer than a few minutes. The V-groove or trench that holds the superlens can be prefabricated on the substrate such as the silicon substrate of the SOI wafer used for the fabrication. It can also be fabricated during one of the processing steps such as while the silicon waveguides or devices are fabricated or just before the optical fiber mounting step. The fabrication of the V-groove usually involves the use of KOH etchant to etch long the crystallographic planes to a predefined depth with high accuracy as is well known to those skilled in the art or by dry etching using ICP (inductively coupled plasma) or RIE (reactive ion etching) to etch down the silicon using metal mask, a process known to those skilled in the art, to form a pre-defined deep trench. The optical fiber can be mounted and held using UV epoxy or solder.

Furthermore, while we assume the photonic layer structures involve certain semiconductor materials, it can be various other types of materials for fabricating active photonic devices including but not limited to: Indium Phosphide (InP), Gallium Arsenide (GaAs), Indium Gallium Arsenide (InGaAs), Indium Gallium Arsenide Phosphide (InGaAsP), Indium Aluminum Gallium Arsenide (InAlGaAs), Aluminum Arsenide (AlAs), Aluminum Gallium Arsenide (AlGaAs), Indium Gallium Aluminum Phosphide (InGaAlP), Indium Gallium Phosphide (InGaP), Gallium Nitride (GaN), Aluminum Nitride (AlN), Gallium Aluminum Nitride (GaAlN), Gallium Phosphide (GaP), Aluminum Phosphide (AlP), Aluminum Antimonide (AlSb), Gallium Antimonide (GaSb), Zinc selenide (ZnSe), Zinc Sulphide (ZnS), Cadmium Sulphide (CdS), Silicon Carbide (SiC), Silicon Germanium (SiGe), Indium Gallium Antimonide (InGaSb), or Indium Antimonide (InSb), Germanium (Ge), Silicon-Germanium (SiGe) with various compositions of the constituent materials and the combinations thereof.

A number of materials may also be used as the dielectric layer(s). They include but are not limited to oxides, nitrides, carbides, such as tantalum pentoxide ($Ta_2O_5$), zirconium oxide ($ZrO_2$), niobium pentoxide ($Nb_2O_5$), hafnium oxide ($HfO_2$), zinc oxide (ZnO), germanium oxide ($GeO_2$), lead oxide (PbO), yttrium oxide ($Y_2O_3$), aluminum oxide ($Al_2O_3$), silicon carbide (SiC), titanium carbide (TiC), titanium nitride (TiN), chromium nitride (CrN), carbon nitride (CN), carbon boride (CB), aluminum nitride (AlN), zinc selenide (ZnSe), barium fluoride ($BaF_2$), magnesium fluoride ($MgF_2$), Diamond like Carbon (DLC). In another embodiment, the dielectric is a polymer or organic material such as Benzocyclobutene (BCB), cyclized transparent optical polymer (CYTOP), and a polymer of imide monomers (Polyimide).

Thus, the process described here is for illustrative purpose only and it does not limit the scope of the invention in any way. Different combinations of these steps and other similar steps are contemplated and are within the scope of the present invention.

The steps discussed are a combination of standard CMOS process and additional CMOS compatible steps that aid in the fabrication of both Si and compound semiconductor (e.g. InP/InGaAsP) based photonic devices. Steps 2, 24, 25, 26, and 27 are the additional CMOS compatible steps according to various embodiments of the invention. Steps 16, 18 listed are potentially reserved to insert additional steps for the fabrication of photonic devices are not used in this example.

Figure 17:
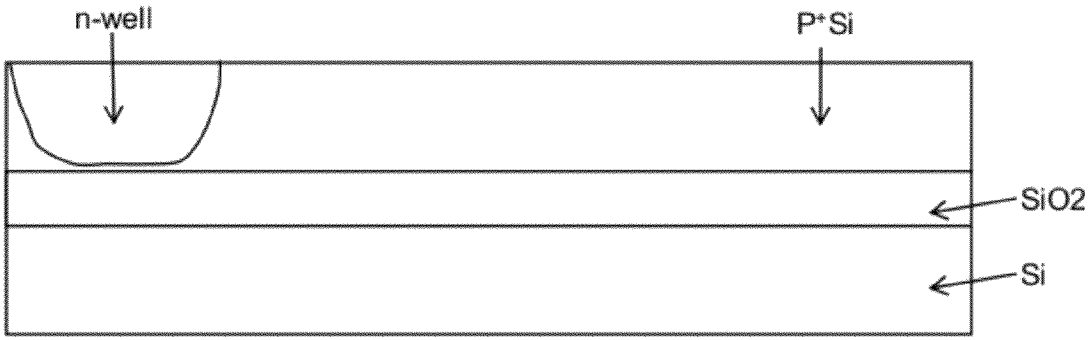
FIGS. 17-26 illustrate the steps involved in the fabrication process of an electronic-photonic device, in accordance with various embodiments of the invention.
Figure 18:
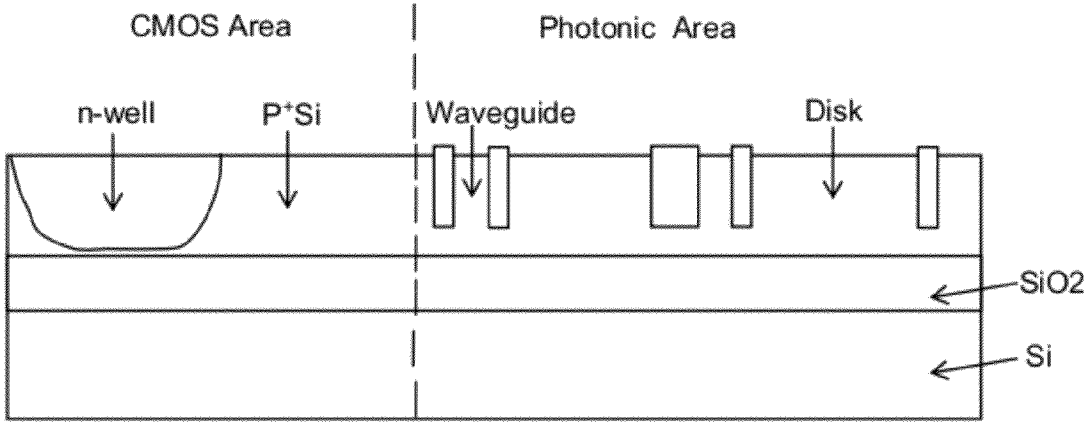
Figure 19:
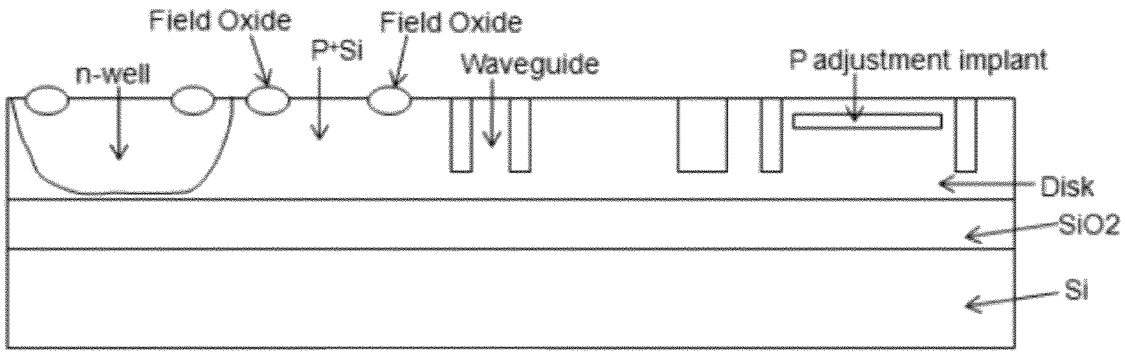
Figure 20:
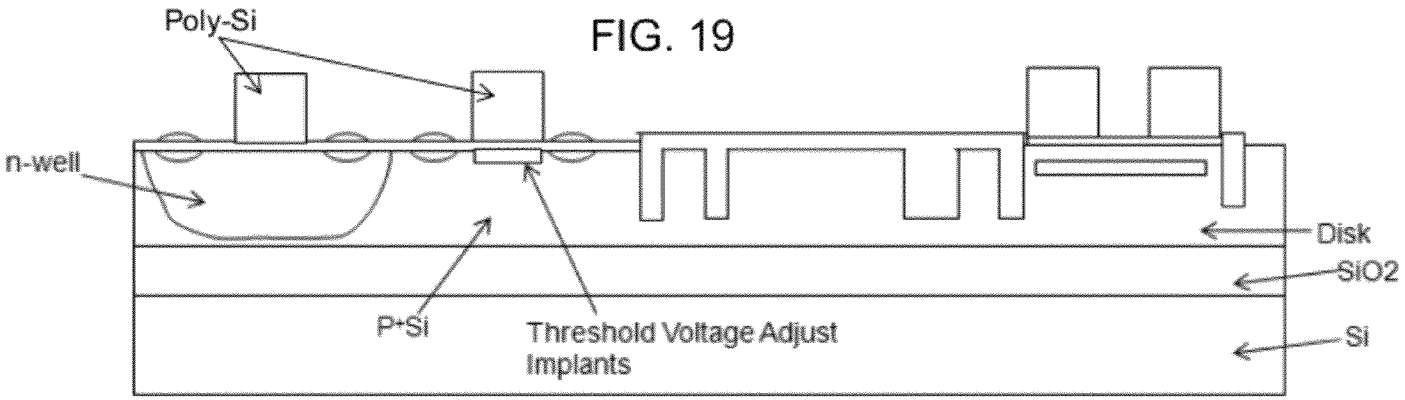
Figure 21:
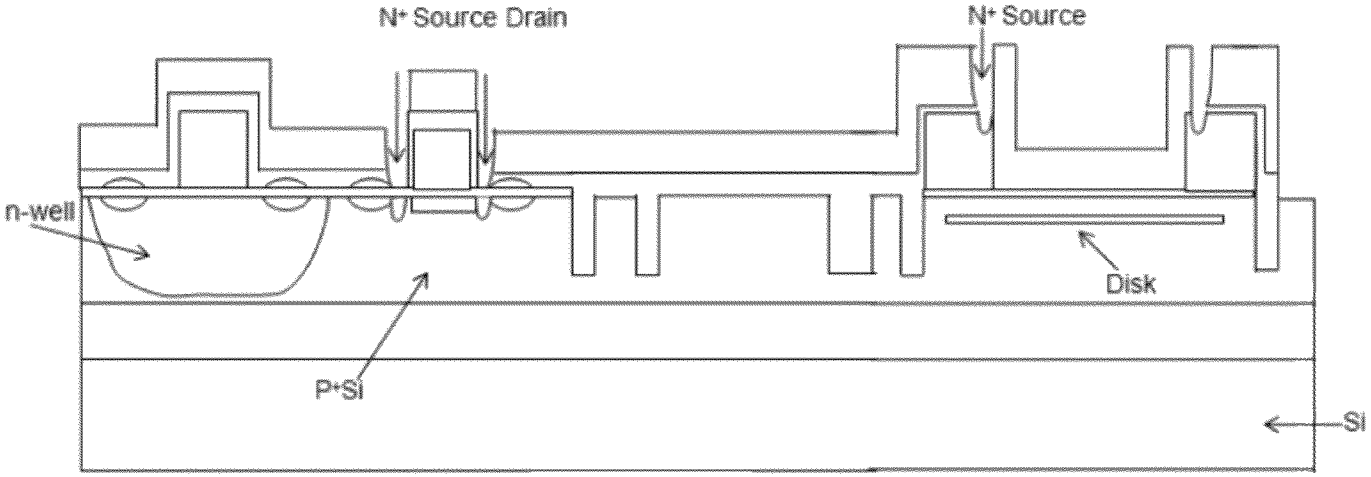
Figure 22:
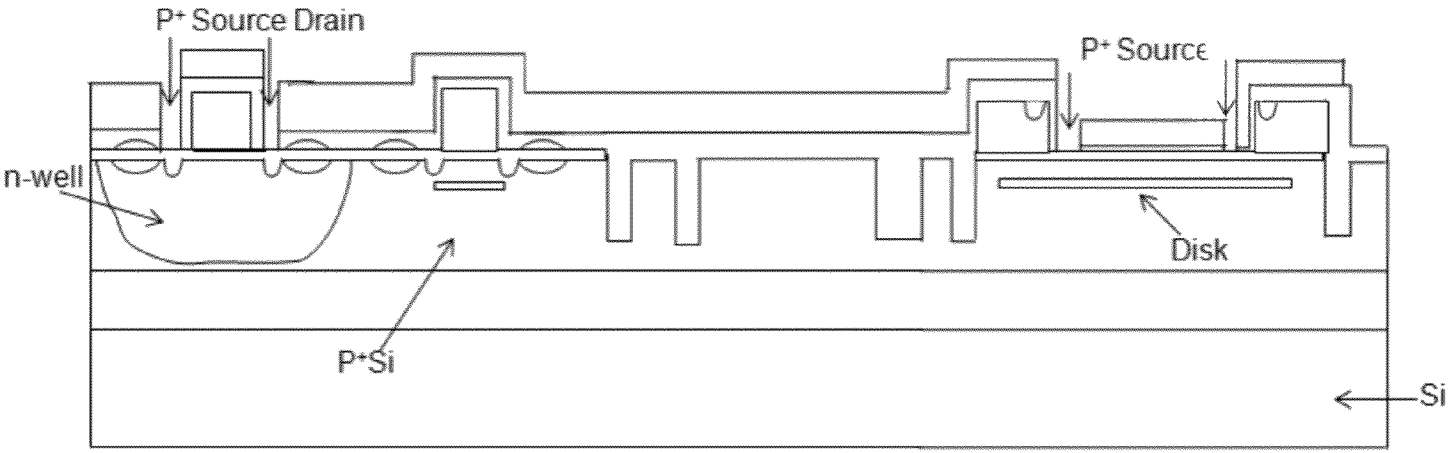
Figure 23:
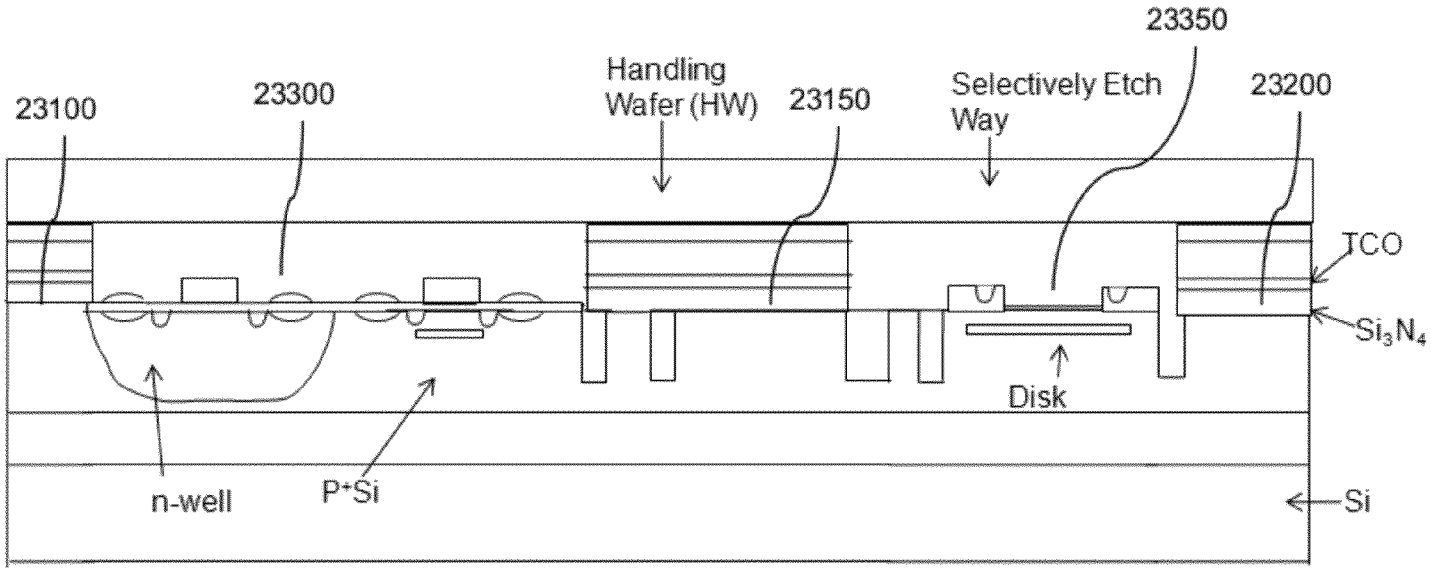
Figure 24:
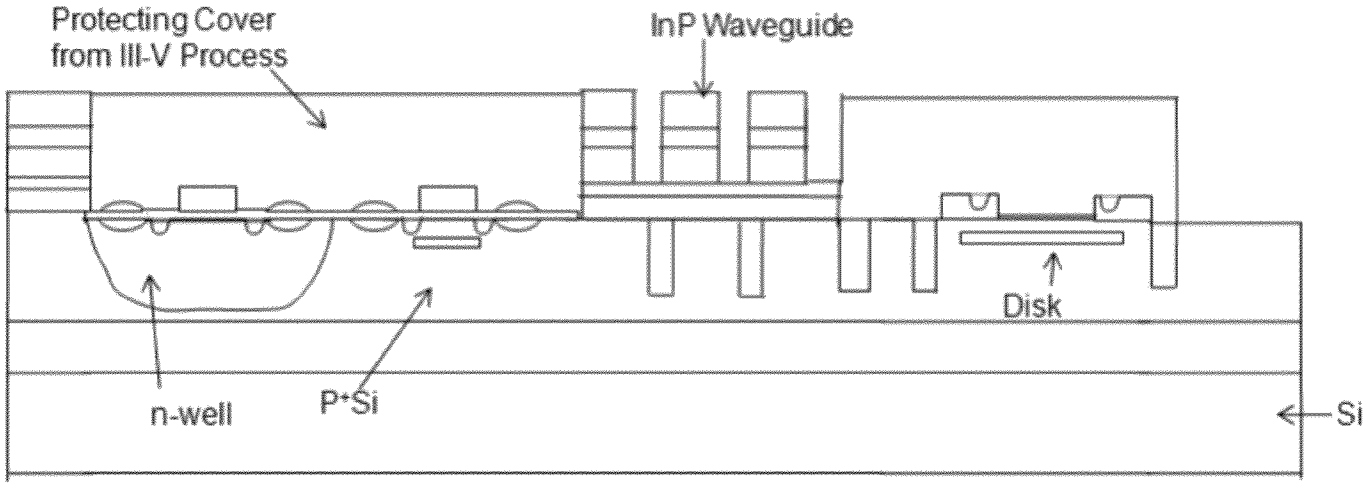
Figure 25:
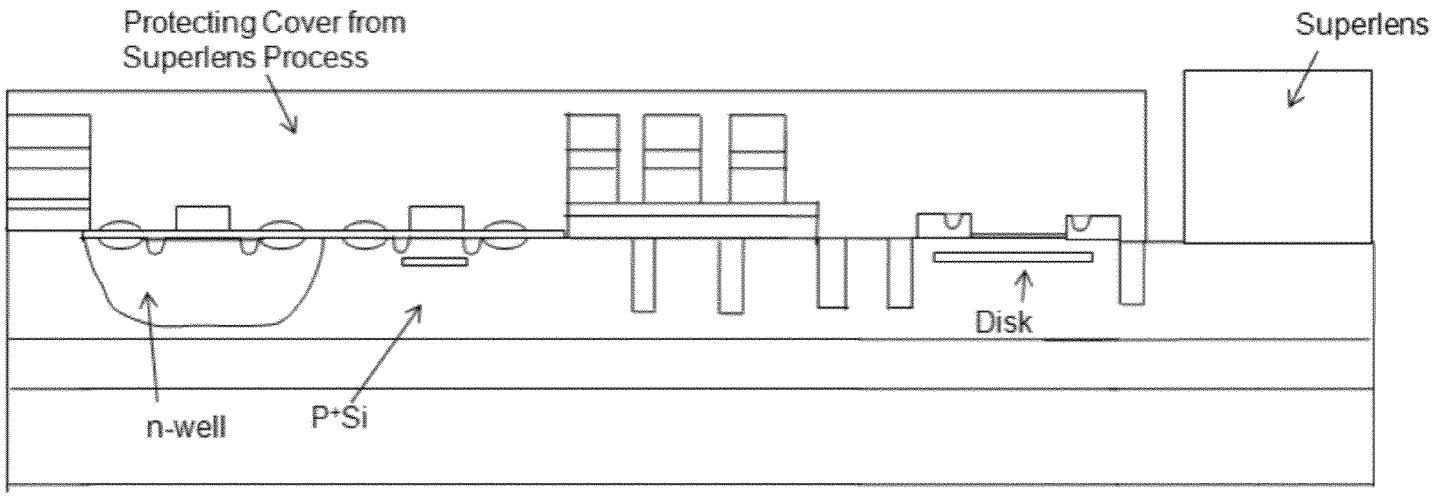
Figure 26:
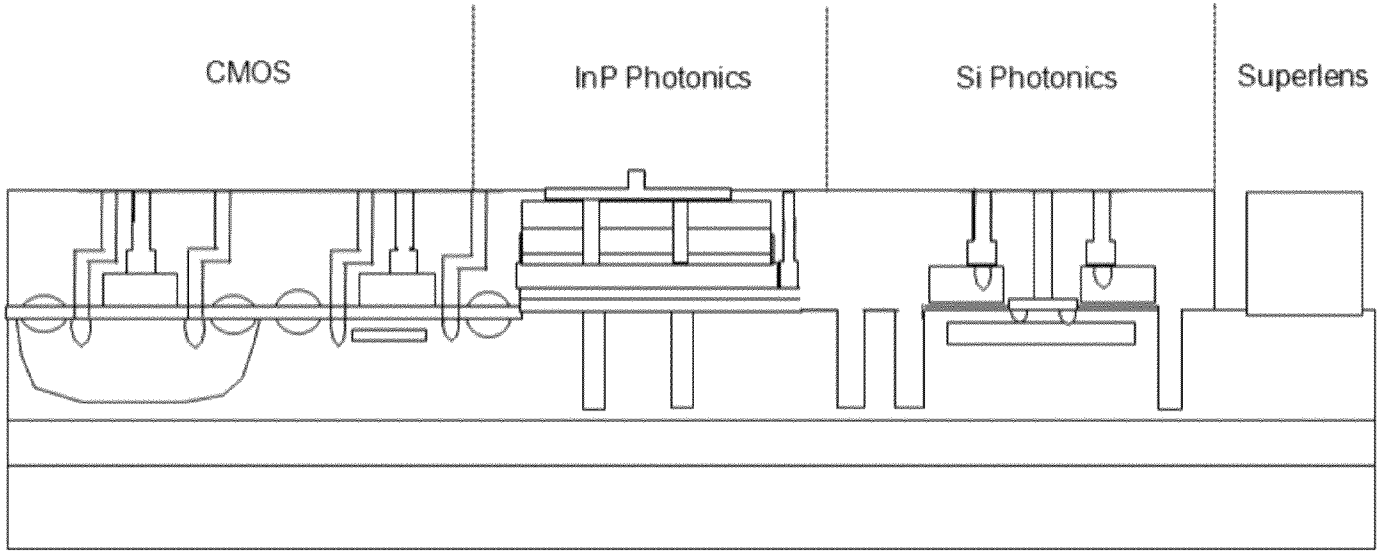

The silicon based photonic devices are fabricated on the Silicon-On-Insulator (SOI) wafer together with the CMOS components using CMOS wafer-level process. The steps 1 to 20 are high temperature processes. Step 21, 22, 28, 29 are the beginning of the CMOS metal-interconnect process. The compound semiconductor (e.g. III-V InP/InGaAsP) wafer bonding begins either after step 20 or at step 23. The figures illustrated are assumed to have compound semiconductor (e.g. III-V InP/InGaAsP) wafer bonding after step 23. This is to ensure that the properties of compound semiconductor (e.g. III-V InP/InGaAsP) wafer do not change because of high temperature involved in steps 1 to 20. Step 5 is illustrated in FIG. 17; Step 7 is illustrated in FIG. 18; Step 10 is illustrated in FIG. 19; Step 14 is illustrated in FIG. 20; Step 17 is illustrated in FIG. 21; Step 19 is illustrated in FIG. 22; Step 23 is illustrated in FIG. 23; Step 25 is illustrated in FIG. 24; Step 27 is illustrated in FIG. 25; Step 29 is illustrated in FIG. 26; Other steps, which are not illustrated in these figures, will be apparent to a person skilled in the art.

Exemplary CMOS Compatible Fabrication Steps for EIC-PIC Chip with Triple or more Optical Layers:

Those skilled in the art will know how to generalize from two optical layers to three or more optical layers by inserting more wafer bonding steps to bond the third top layer to the second middle layer in a way similar to the bonding of the second optical layer to the first optical layer, and the fabrication of more tapered waveguide couplers for vertical coupling of light between two optical layers.

Wafer Bonding and Local-Area Wafer Bonding:

Part of the process steps mentioned above involve "local-area wafer bonding" resulting in thin-film transfer of active optical materials on a substrate. Exemplary embodiments for wafer boding and local-area wafer bonding processes are illustrated below.

Figure 27:
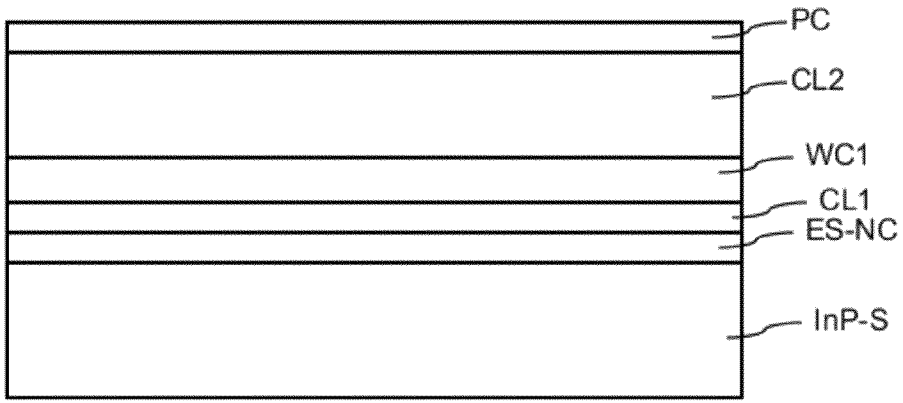
FIG. 27 illustrates an epitaxial layer structure for the local-area wafer bonding process shown in FIG. 28, in accordance with an embodiment of the invention.

Wafer Structure to Transfer:

For the purpose of illustration, we assume the compound semiconductor layer to be transferred involves InP/InGaAsP epitaxial layer structures often used for the fabrication of active photonic devices, such as optical amplifiers and lasers as are well known skilled in the art. The exemplary embodiments for a compound semiconductor (e.g. InP/InGaAsP) Wafer based Bonding and Etch Back are as follows: An epitaxial layer structure shown in FIG. 27 is grown on top of an InP substrate (InP-S). In some cases, the epitaxial layer further requires a 0.2 μm thick InGaAsP n+ doped etch-stop and n-contact layer (ES-NC), which is grown on the InP substrate. This is followed by a thin cladding layer (CL1) of InP/InGaAsP materials having a thickness of 0.2 μm. The use of n+ doped InGaAs as N+ contact may lead to a high optical absorption due to the smaller bandgap energy. Furthermore, in some other cases, a thin waveguiding core layer (WC1) of 0.25 μm is grown. WC1 layer includes approximately 5-10 quantum wells within the layer. There is a 1.5 μm "thick" cladding layer (CL2) on the top of WC1. After CL2, a thin InGaAs P+-doped p-contact layer (PC) is then grown. The epilayer structure is shown in FIG. 28 as Step 1.

Figure 28:
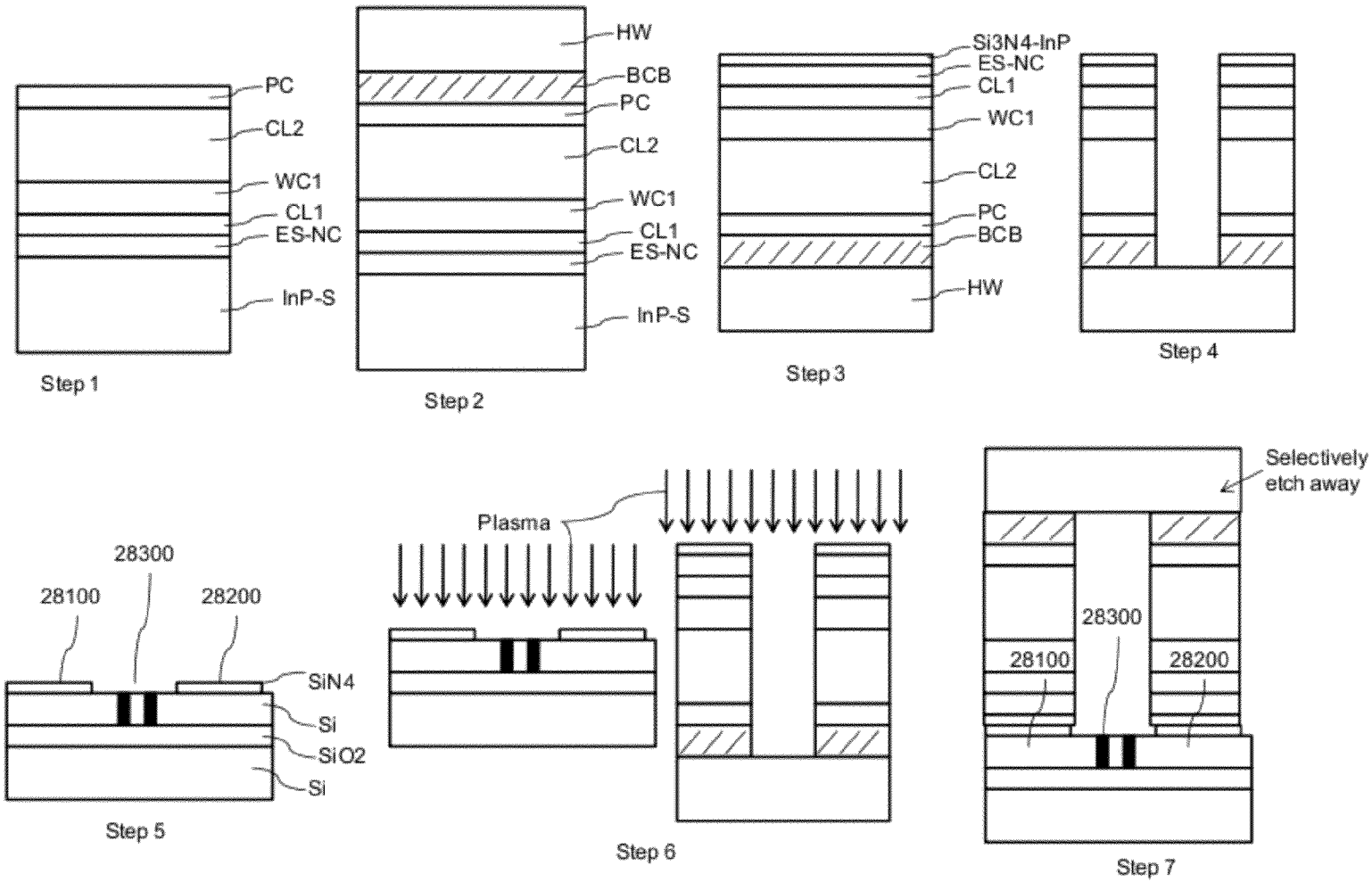
FIG. 28 illustrates an exemplary embodiment of the local-area wafer bonding process, in accordance with an embodiment of the invention.

N-Side Down for Near-Epi-Wafer-Smooth Bonding Surface:

After the epitaxial growth, an InP handling wafer (HW) is bonded to the epi-wafer through a Benzocyclobutene (BCB) polymer as shown by Step 2 in FIG. 28. Further, the epi-wafer substrate (InP-S) is etched by hydrochloric acid (HCl), which self-stops at the ES-NC due to the low etching rate of the InGaAsP layer. A thin silicon nitride layer ($Si_3N_4$—InP) is then grown on top of the n-contact layer (ES-NC) as shown by Step 3 in FIG. 28. In some cases, the thin silicon nitride layer has a thickness of 0.1 μm. ES-NC layer has Epi-Wafer-smooth bottom surface as it is the first layer after the Epi-wafer substrate (InP-S), as shown by Step 4 in FIG. 28. Therefore, the requirement for wafer bonding is accomplished, as thin $Si_3N_4$ layer provides a smooth surface. As shown in Step 4 of FIG. 28, the area that will not have photonic devices will be pre-etched away with indentation. This will enable the wafer to touch only the photonic areas shown as areas 28100 and 28200 in Step 5 of FIG. 28 (or equivalently also shown as 23100, 23150, and 23200 of FIG. 23) and not the electronic areas shown as area 28300 in Step 5 of FIG. 28 (or equivalently also shown as 23300 and 23350 of FIG. 23). This is one of the main features of the local-area wafer bonding process. The electronic areas will not have smooth surface as they would already be fabricated with electronic transistors and other electronic devices. The pre-etched indentations to match with indentations with the electronic areas will make it possible for the bonding wafer to avoid touching the surface of the electronic areas.

Local-Area Wafer Bonding to SOI:

As described earlier, the thin silicon nitride layer is deposited on top of the silicon surface of the SOI wafer designated for compound semiconductor devices, as shown by Step 5 in FIG. 28. The pre-etched silicon waveguides are provided for achieving vertical coupling. As this is a thin layer on the original SOI wafer surface, the $Si_3N_4$—Si layer will have smooth surface, meeting the requirement of wafer bonding. The wafer bonding takes place between the $Si_3N_4$ surface on the compound semiconductor (e.g. InP/InGaAsP) wafer and the $Si_3N_4$ surface on the SOI wafer. To enable the wafer bonding, the silicon-nitride surfaces are subjected to plasma treatment, as shown by Step 6 in FIG. 28, typically with 1-minute exposure to oxygen plasma (200 mTorr, 200 W) to create hydrophilic surfaces. Further, InP (thermal expansion coefficient $\alpha_{InP}$=4.6×10-6/K) is more thermally matched to silicon ($\alpha_{Si}$=2.6×10-6/K) than GaAs ($\alpha_{GaAs}$=5.7×10-6/K) which aids in meeting the smooth surface requirement of wafer bonding. The thermal expansion coefficient of silicon nitride is $\alpha_{Si3N4}$=3.3×10-6/K which is in between that of silicon and InP. This temperature difference reduces temperature-induced stress. The wafers are then brought together and bonding occurs across the two silicon nitride surfaces, as shown by Step 7 in FIG. 28. Bond strength of 0.16 Jm-2 is achieved by the process of annealing at 150° C. for greater than one hour. Higher bond strength of 1.1 Jm-2 can be achieved at low temperature with a annealing time of greater than 100 hours or by keeping a moderate annealing temperature of less than 400° C. The silicon nitride offers higher thermal conductivity, which is almost comparable to that of InP. Lastly, the handling wafer is selectively etched away using HCL. It will be apparent to a person skilled in the art that the process is assumed to be an exemplary process. This process enables multiple areas of the SOI substrate to be bonded with compound semiconductor epitaxial layers that are subsequently used for making the active photonic devices on those areas, which is referred to as "local-area wafer bonding".

The exemplary embodiments above are for the purpose of illustration and not limitation. For example, it is well known to those skilled in the art that there are more than one ways to achieve wafer bonding. The main steps, however, is the involvement of pressure and temperature treatment to press two wafers together and achieve atomic-level bonding. Subsequently, a selective etching step is performed to result in the transfer of the active optical thin film (e.g. the compound semiconductor thin film) on a substrate (e.g the SOI substrate). The selective etching can be wet chemical etching or dry selective etching using machines such as Reactive-Ion Etcher (RIE) or Inductively-Coupled Plasma Etcher (ICP), and the use of appropriate etching gasses.

Also for example, the main steps of the local-area wafer bonding illustrated involve a handling wafer with pre-etched areas to match the electronic areas so that many subareas of the active materials (e.g. the compound semiconductor active layer) can be transferred to the substrate wafer (e.g. the SOI wafer) in a single effort without having the bonding wafer touching the electronic area. Another step include covering the photonic areas with protective materials during the high-temperature electronic fabrication or CMOS process, and then uncover the protected photonic areas by removing the photonic-area protective materials so that a fresh silicon surface will be uncovered for performing the wafer bonding. For such protective process steps, see for example Step 2 and Step 23 of the two sections describing "CMOS Compatible Fabrication Steps for Exemplary IDDOL-EIC-PIC Chip". As mention there, a good protective material to use is $In_2O_3$ material that is resistive to most fluorine chemistries that etches $SiO_2$ and are commonly used in electronic device fabrication processes, but can be removed by Chlorine chemistries sledome used in electronic device fabrication processes. Other protective materials include a combination of $In_2O_3$ and metallic films or certain polymer materials. Other steps may be specific to the type of materials being bonded. Thus, the process described here is for illustrative purpose only and it does not limit the scope of the invention in any way. Different combinations of these steps and other similar steps are contemplated and are within the scope of the present invention.

Exemplary Embodiments of EIC-PIC with Multiple Photonic Device Components and Photonic Sub-System on Chip:

Above, we have illustrated the essential exemplary structure and fabrication processes for various EIC-PICs. Below, we will provide more exemplary EIC-PIC based integrated circuits with multiple device components, resulting in photonic subsystem on chip with active and passive photonic devices integrated with electronic circuits. The simplest case of an EIC-PIC has:

(1) A fiber input coupler or a fiber output coupler or both;

(2) At least one integrated photonic or nanophotonic device connected to the fiber input coupler or the fiber output coupler with an optical waveguide; and (3) An optional electronic device or electronic integrated circuit on the chip.

Electronic-Integration Compatible Photonic/NanoPhotonic Integrated Circuit (EIC-PIC) is a photonic integrated circuit or a nanophotonic integrated circuit fabricated to be compatible with an electronic integrated circuit. However, this provides a benefit of simple fabrication processes, thus providing compatibility with electronic integrated circuit manufacturing line. The presence of an electronic circuit is optional. Applications of EIC-PIC include, but are not limited to, optical receivers used in fiber optic communication.

The performance is enhanced by integrating photonic devices and optical fiber connections with electronic microprocessor chip. This results in an increase in the speed of data input and output from the electronic microprocessor chip. The applications are capable of performing very fast computation on chip as compared to the current microprocessor chips. However, the current microprocessors are capable of performing fast computation at a data rate of 3-10 Gigabits per second (1 Gigabit/sec=$10^9$ bits/sec), with the difference that the microprocessor chips suffer from the slow electrical connections to devices outside the chip through an electrical wire. The use of electrical transmission line may increase electrical data transmission speed to tens of Gigabit/sec, however the cost of electrical transmission line is high.

Further, enhancement is achieved by combining high data transmission rate of photonic system with the high computation speed of electronic integrated circuit. The data transmission speed of photonic system is enhanced by using multiple optical wavelengths (40-100 different wavelengths), each wavelength being capable of carrying high data rate of 2.5-40 Gigabits/sec. Such a photonic data transmission system is commonly referred to as 'Dense Wavelength Division Multiplexing' (DWDM) system. For example, with 40 wavelengths, each operating at 40 Gigabit/sec, a total aggregated data rate of 1.6 Terabits/sec (1 Terabit/sec=1012 bits/sec) is achieved. To carry this huge data into and out of the electronic microprocessor chip, only single optical fiber is sufficient. Considering the advantage provided by the optical fiber, the electrical wires are replaced by an optical DWDM data transmission system on an electronic chip to enable integrated ultra-high-speed data transmission in-to or out-of the electronic circuits using optical fibers. The photonic data transmission system integrated on EIC-PIC is therefore referred to as integrated chip-level optical network (ICON). An EIC-PIC with ICON is referred to as EIC-PIC+ICON.

The ICON on EIC-PIC results in increasing the input and output data rates from and to an electronic microprocessor, thus enabling ultra-high-speed data transmission between two or more electronic integrated circuits. Such a photonic data transmission link is referred to as an inter-chip optical interconnect. ICON also helps to increase data transmission speed within the electronic chip. In that case, photonic waveguides and devices on the chip are used to transmit information from one part of the electronic circuit to another part of the electronic circuit on the same substrate. Such a photonic data transmission link is called an intra-chip optical interconnect.

The two exemplary EIC-PIC devices are illustrated below in accordance with the preferred embodiments of the present invention. It will be apparent to a person skilled in the art that there are many different possible configurations for an EIC-PIC device in terms of the photonic integrated circuit geometry, the electronic integrated circuit geometry, the specific photonic and electronic devices employed in the circuits, and the fabrication method thereof. These exemplary devices are therefore shown for the purpose of illustration and they do not limit the scope of the present invention in any way.

Figure 29A:
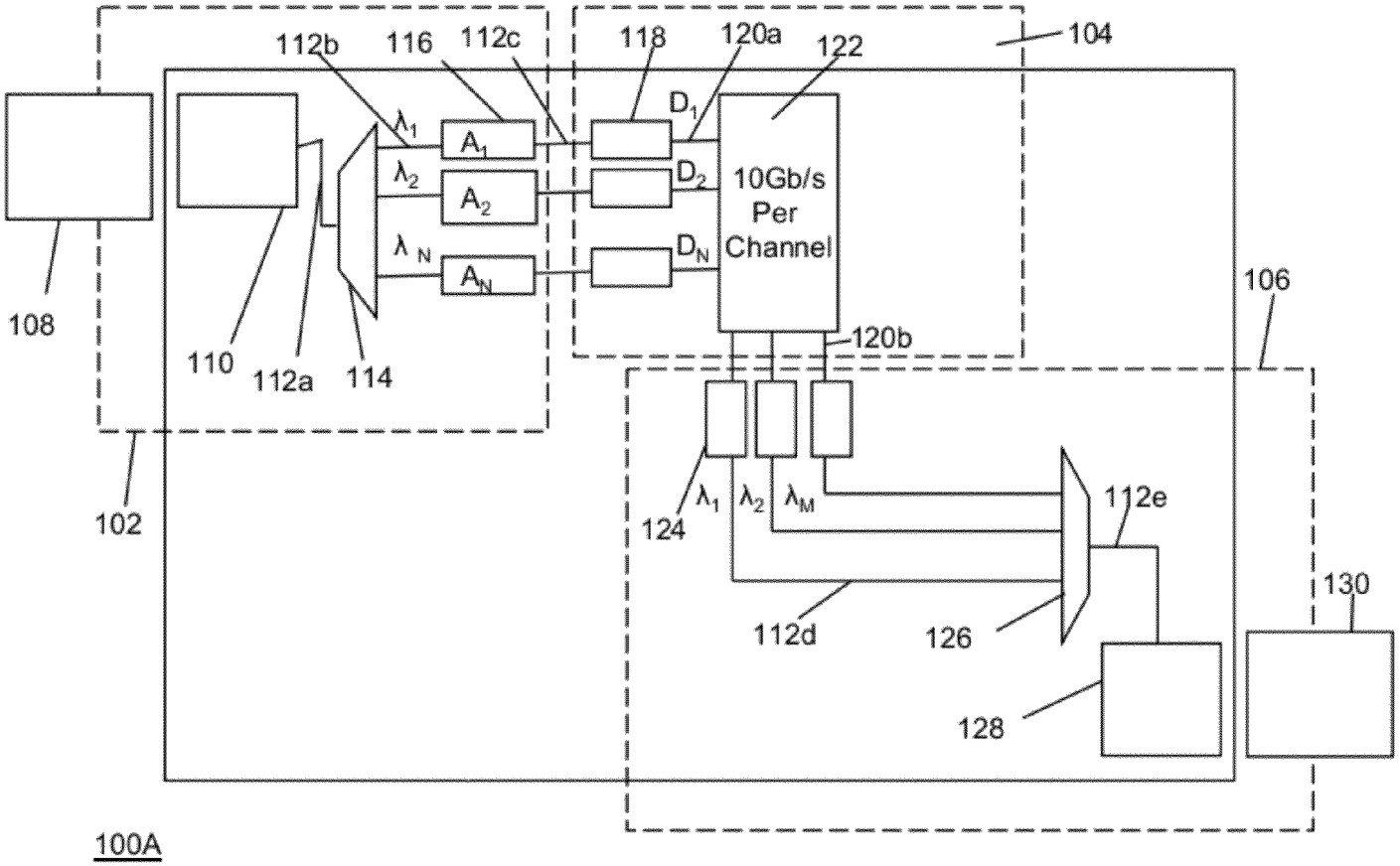
FIG. 29A illustrates a schematic for the connections between various devices in a first exemplary electronic-integration compatible photonic/nanophotonic integrated circuit with integrated chip-level optical network (EIC-PIC+ICON) device in accordance with various embodiments of the invention.

First Exemplary EIC-PIC-ICON Device:

FIG. 29A illustrates a schematic for the connections between various devices in a first exemplary electronic-integration compatible photonic/nanophotonic integrated circuit with integrated chip-level optical network (EIC-PIC+ICON) device, in accordance with various embodiments of the invention. EIC-PIC+ICON 100A has three main chip parts, namely, an Input Part 102, an Interior Part 104, and an Output Part 106. The three main chip parts have been described below.

The first part is an Input Part 102. The Input Part 102 includes a fiber input coupler 108, and a Photonic Integrated Circuit (PIC). The fiber input coupler 108 is integrated on a chip. An optical beam, with N wavelength channels, propagating in the input optical fiber, is connected to the coupler 108. Each of the N wavelength channels carries encoded signals as intensity modulation of the wavelength channel.

A Photonic Integrated Circuit (PIC) is included to perform optical DWDM data demultiplexing and optical to electrical data conversion. The PIC includes a coupling optic 110 to couple light into a waveguide 112a that guides the optical beam to a wavelength de-multiplexer 114. The wavelength de-multiplexer 114 splits the light in N wavelength channels as N outputs from the demultiplexer 114. Each of the N outputs of the demultiplexer 114 is connected to an integrated optical amplifier 116 through an optical waveguide 112b to amplify the optical power.

The second part is the interior part 104. The Interior Part 104 consisting of an integrated electronic circuit area includes:

(1) N optical-to-Electrical Data Conversion Lines using photodetectors are used to convert optical power to electrical signals. The optical amplifier 116 output from the Input Part 102 is connected to an integrated photodetector 118 through another optical waveguide 112c. The photodetector 118 converts the optical signal in that wavelength channel to a stream of electrical signals. Therefore, there are N photodetectors 118 to produce N number of electrical signals.

(2) N electrical data lines 120a are used to transfer the electrical data from the N photodetectors 118 to an electronic circuit 122.

(3) The electronic circuit 122 receives the electrical data from the N electrical data lines 120a to process the electrical data streams that are received.

(4) There are M electrical data output lines 120b from the electronic circuit. The M electrical data streams are converted to M optical data streams by modulating the optical outputs from M semiconductor lasers 124.

The third part is a Fiber Output Port 106 incorporating Electrical-to-Optical Data Conversion, DWDM Wavelength Multiplexing, and Optical Fiber Output. Further, the Optical Fiber Output includes a Photonic Integrated Circuit (PIC) and a wavelength multiplexer.

The Photonic Integrated Circuit (PIC) is configured to perform electrical to optical data conversion and DWDM optical data multiplexing. This PIC comprises M integrated semiconductor lasers 124 with intensity directly modulated by the M electrical data output lines 120 from the electronic circuit 122. The M lasers 124 have different emission wavelengths. Each wavelength is tuned to one of the standard DWDM wavelength channels. The intensity modulation of each of the M lasers 124 can be achieved by modulating the injection current to the M lasers 124 for data rates up to about 10 Gigabit/sec. For higher data rates (>10 Gigabit·sec), an integrated modulator such as an electro-absorption modulator or an electro-optic modulator is used by connecting the modulator to the output of the M lasers 124 with an integrated waveguide. The outputs of the M modulated lasers 124 have different DWDM wavelengths and are sent to an integrated wavelength multiplexer 126 with M inputs through a waveguide 112d. The wavelength multiplexer 126 combines the M different wavelength channels to produce a single output. The output of the wavelength multiplexer is a single optical beam.

The output beam from the wavelength multiplexer 126 is transmitted to an integrated fiber coupler 128 through an integrated waveguide 112e. The optical coupler 128 couples the output beam from the output waveguide to an output optical fiber 130.

The integrated photonic devices in the EIC-PIC include, but are not limited to, optical input coupler, optical wavelength demultiplexer, optical amplifier, photodetector, optical waveguide semiconductor laser, optical modulator, optical wavelength multiplexer, and optical output coupler. It will be apparent to a person skilled in the art that the devices may be regular photonic devices or nano-photonic devices capable of performing the same function, which further provide much smaller device size.

Figure 29B:
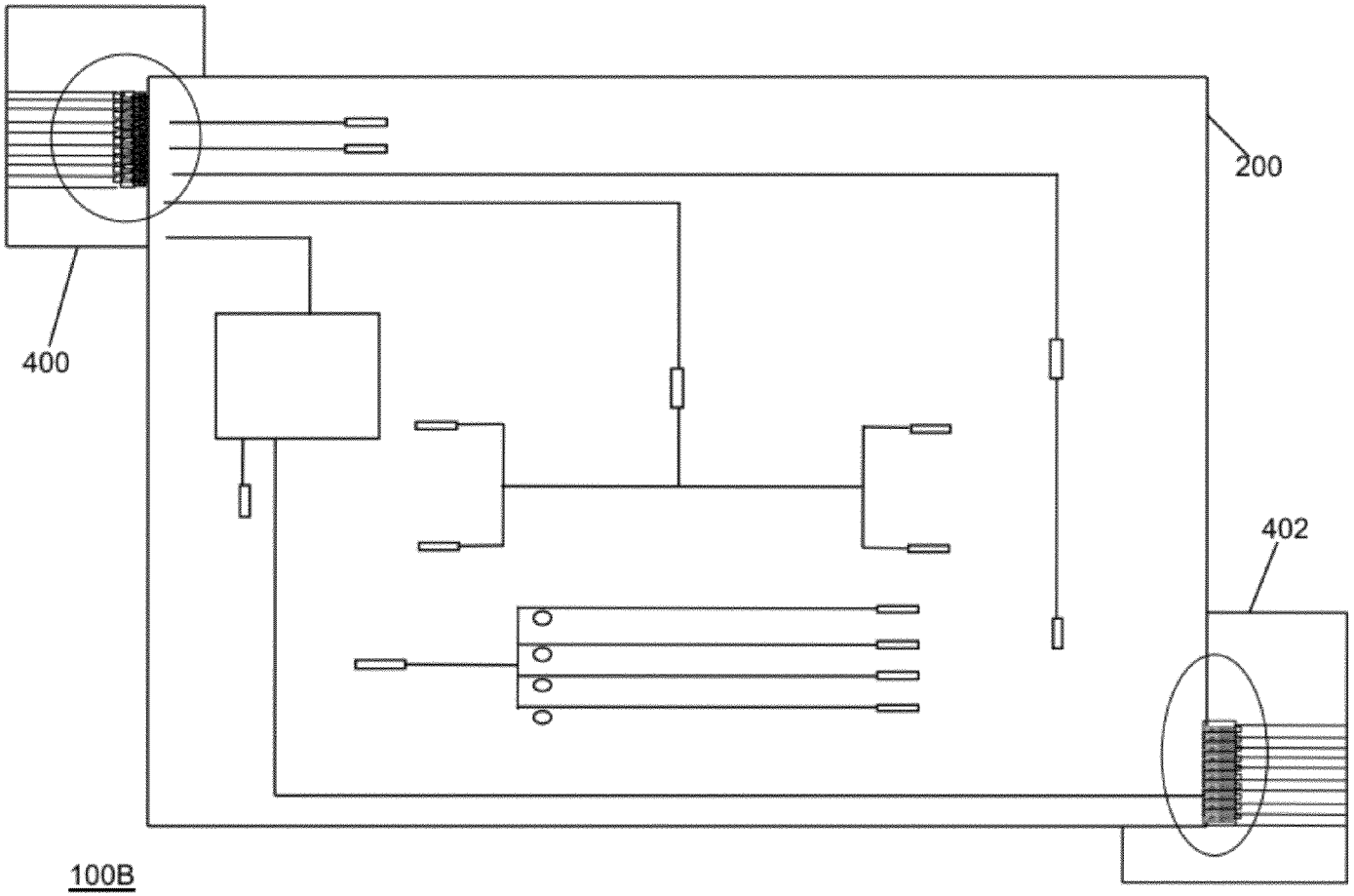
FIG. 29B illustrates a second electronic-integration compatible photonic/nanophotonic integrated circuit with integrated chip-level optical network EIC-PIC+ICON device in accordance with an embodiment of the invention.

Second Exemplary EIC-PC-ICON Device:

FIG. 29B illustrates a second electronic-integration compatible photonic/nanophotonic integrated circuit with integrated chip-level optical network EIC-PIC+ICON device 100B in accordance with an embodiment of the invention. EIC-PIC+ICON 100B further provides an Input Port 400, an Interior Part 200, and an Output Port 402.

The Input Port 400 with multiple Optical Fiber Input Parts 100Ca-100Ch and Input Parts 142 and 144 is further illustrated in conjunction with FIG. 32. Each Optical Fiber Input Part 100C performs various functions including the functions of Optical Fiber Coupling, and DWDM Wavelength Demultiplexing.

The Interior Part 200 receives optical beams from the input port 400 and performs various functions, including Optical-to-Electrical Data Conversion and data processing with electronic integrated circuits.

The Output Port 402 with multiple Optical Fiber Output Parts 300a-300h and Output Parts 312 and 316 performs various functions including the functions of Electrical-to-Optical Data Conversion, DWDM Wavelength Multiplexing, and providing optical Output.

The Input Port:

The Input Port 400 of the EIC-PIC+ICON device 100B (hereinafter referred to as electronic-photonic device or EP device) has multiple optical fiber input parts 100a-100h and other input parts 142 and 144. An optical fiber input part 100C of the multiple optical fiber input parts 100a-100h is as illustrated in conjunction with FIG. 29C. Each of the input parts 100a-100h of the multiple optical fiber input port 400 is designed to carry one optical beam. Therefore, the EP device 100B can have input of different optical beams through the input port 400. Each beam has an ability to carry multiple optical wavelength channels. In an embodiment of the present invention, the number of multiple optical wavelength channels that can be carried by a beam is five. Each wavelength channel has the ability to carry signals with a data rate of 20 GB/s resulting in a total data rate of 100 GB/s for the optical beam at each input part. The input port 400 with ten input parts (input parts 100a-100h and the other input parts 142 and 144), therefore carries a total data rate of about 1 Tb/s. The input port 400 has been further described in detail in conjunction with FIG. 32.

The optical fiber input part 100C includes a fiber 132, a coupling optics 134, a wavelength multiplexer 136 and plurality of active device 138. The light beam travels through the fiber 132 of each of the optical fiber input part 100C. The light beam from the fiber 132 is coupled to coupling optics 134. The coupling optics 134 couples light beam from the fiber 132 into the wavelength multiplexer 136 through a passive waveguide layer 160 (not shown in the figure). The passive waveguiding layer 160 has been further described in detail in conjunction with FIG. 35. In an embodiment of the present invention, the coupling optics 134 is a monolithically integrated superlens coupling optics for single-mode fiber to silicon waveguide (SLCO-SmfSiw) 134. (The general design of superlens is given in US patents "Varying refractive index optical medium using at least two materials with thickness less than a wavelength, U.S. Pat. No. 7,426,328" and "Superlens and a method for making the same, U.S. Pat. No. 7,643,719~, and are herein incorporated by reference.)

In accordance with an embodiment of the present invention, the superlens is deposited on a substrate. The structure of superlens 134 comprises multiple layers of two alternating materials with different refractive indices and having a thickness substantially less than its optical wavelength of operation. The thickness ratio of the two layers defines an effective index of the superlens 134 around that layer. The refractive indices of the superlens 134 can thus be varied in a direction vertical to the substrate to fit any refractive index profile vertically. An illustrative design of the refractive index profile for the superlens 134 is described below.

Hereinafter, the superlens coupling optics 134 will be interchangeably referred to as the SLCO-SmfSiw 134. The SLCO-SmfSiw 134 could also be referred to as the integrated ultra-compact superlens coupling optics for passive-aligned multiport coupling between waveguides and single-mode fibers 132. In one embodiment of the invention, the SLCO-SmfSiw 134 couples light into 0.3 μm thick passive silicon wave guiding layer 160 located on an SOI substrate. In another embodiment of the invention, the SLCO-SmfSiw 134 can be 10 μm thick. In some cases, the output beam power of the SLCO-SmfSiw 134 is ~100-160 μW and practical coupling loss is ~1-3 dB.

In one embodiment of the invention, SLCO-SmfSiw 134 is used for coupling short wavelengths of light in an optical fiber communication wavelength range of 1.5 μm. The advantages of using the SLCO-SmfSiw 134 will be apparent to a person skilled in the art due to its integration capability and its ultra compact size. In another embodiment of the invention, thin-film photonics requires coupling of light into a thin film having a thickness of 0.2-0.3 μm for operation at an optical wavelength of 1.5 μm. This can be achieved using the SLCO-SmfSiw 134, wherein the integrated superlens SLCO-SmfSiw 134 has one half of the parabolic profile having a refractive index layer at the surface of a wafer. In some cases, the superlens SLCO-SmfSiw 134 has a varying refractive index in the range of $n_{Si}$~3.6 for silicon (Si) to $n_{SiO2}$~1.45 for silicon dioxide ($SiO_2$). In some other cases, the refractive index is graded down to a value of around 1.5 at the top of the superlens SLCO-SmfSiw 134, whereas the refractive index at the bottom has a value nearly equal to that of the waveguide. The grading down of the refractive index results in a rapid vertical expansion of the beam emerging from the silicon waveguide, which is further bent using the focusing power of the superlens 134. The output 140a of SLCO-SmfSiw 134 would be resulting in a vertically plane wavefront within a short propagation distance. The beam size of the output 140a is therefore enlarged to a value mating the large mode size of an optical fiber of typically around 5-8 μm. Further, there is no reflection from the superlens-waveguide interface as there is no sharp refractive-index step. In an embodiment of the present invention, the coupling into fiber is greater than fifty percent and less than one hundred percent.

The output beam 140a from one of the lenses of the SLCO-SmfSiw 134 is further wavelength demultiplexed through the multiplexer 136. In an embodiment of the present invention, the multiplexer 136 is a silicon ultra-compact wavelength multiplexer/demultiplexer (hereinafter referred to as Si-UCλDeMux 136). (The general design of ultra-compact wavelength multiplexer/demultiplexer is given in patents "Curved grating spectrometer, U.S. Pat. No. 7,283,233" and "Integrated signal manipulator for manipulating optical signals, application Ser. No. 11/451,797," and is herein incorporated by reference.) In an embodiment of the invention, Si-UCλDeMux 136 has a channel spacing of 5 nm. Si-UCλDeMux 136 could also be referred to as Silicon Ultra-Compact Wavelength Multiplexer/DeMultiplexer, based on Ultra-Large-Angle-Grating for High Bandwidth Data Communications through WDM. In some cases, the output beam power at the demultiplexer 136 output is ~25-80 μW and practical loss is less than ~3-6 dB.

Ultra-Large-Angle-Grating is an optical component of the Si-UCλDeMux 136 with a specific regular pattern, which splits light into multiple beams travelling in different directions depending on their wavelength channels. Each direction goes to an active device 138. In another embodiment illustrated in conjunction with FIG. 29C, the Si-UCλDeMux 136 splits light in five different wavelength channels into five different directions going into five different active devices 138a to 138e. The spacing of the grating and the wavelength of the light define the directions of the beams, the grating being a dispersive element. Therefore, the gratings provide applications in the field of spectrometers. The size of wavelength multiplexer/demultiplexer 136 is in accordance with the size of its entrance slit or exit slit defined by the size of its entrance or exit waveguide. The wavelength multiplexer/demultiplexer 136 can also be interchangeably referred to as a grating spectrometer. Also, smaller is the size of the slit, larger is the beam diffraction angle at the slit. Therefore, a small change in diffraction angle leads to a considerable spatial aberration. Spatial aberration prevents the diffracted beam from the grating to come to a sharp focus at the exit slit. Using Si-UCλDeMux 136, the spatial aberration caused by the grating could be corrected. The correction of spatial aberration can be achieved by using a curved grating design, which accepts large beam diffraction angles without spatial aberration at large angles.

One of the output beams 140b-140f from the Si-UCλDeMux 136 is further coupled to the active layer of an active device 138 through a tapered waveguide coupler 602 (not shown in the figure). Tapered waveguide coupler 602 has been further described in detail in conjunction with FIG. 34. In an embodiment of the invention, the active layer is an InP active layer made of InP/InGaAs materials. The output of the active device 138 is coupled back to the passive layer through another tapered waveguide coupler 602. The InP active layer has the integrated active device 138. In one embodiment of the present invention, the active device 138 is an InP optical amplifier. In another embodiment of the invention, the active device 138 is an InP photon-transistor based high-efficiency wavelength converter-amplifier-regenerator (PT-HE-WC-A-R) 138 on silicon, based on gain & absorption manipulation of coupler's interference (GAMCI). (The general design of photon transistor is given in U.S. Pat. Nos. 6,788,838, 6,473,541, and 6,298,180" and is herein incorporated by reference.) PT-HE-WC-A-R 138 provides functionalities for wavelength conversion, amplification, polarization conversion, pulse regeneration and optical isolation. In some cases, the output beam power of PT-HE-WC-A-R 138 is ~250-800 μW.

PT-HE-WC-A-R 138 are photon transistors and require powering laser sources. The photon transistor PT-HE-WC-A-R 138 acts as an optical switching device. The wavelength converters of PT-HE-WC-A-R 138 are used to convert the input wavelengths to a common wavelength. The common wavelength is used by the light beams in the interior part of the EP device 100B. Further, it also provides an optical gain (G) to boost the input signal. In some cases, the optical gain, G is ~10. PT-HE-WC-A-R 138 therefore, serves the function of both a pulse regenerator and an optical isolator. The speed of operation is enhanced by a combination of low switching power and use of saturation and stimulated emission. To keep the switching power low, a linear gain is used. The gain is also used to affect interference of coupler which results in a switching action.

GAMCI based devices include a pair of energy-up photonic transistor (EUPT) and energy-down photonic transistor (EDPT). The pair works sequentially to provide multiple functionalities. The figure of merit provided by GAMCI based photonic transistor is much better than those provided by semiconductor amplifiers. The main function of the pair is to provide wavelength conversion, pulse regeneration and power amplification without broadband spontaneous-emission noise, polarization conversion to TE polarization for on-chip polarization-sensitive devices and optical isolation preventing feedback to the input optical fiber.

In some embodiments of the present invention, the output beams 140g-140k from PT-HE-WC-A-R 138 have a power in the range of 250-800 μW. The output beams 140g-140k are further sent to the interior part of the device with a power to sustain a loss greater than 10 dB before detection, to enable the propagation of the output beams 140g-140k to a considerable distance. Also, in another embodiment of the present invention, the output beams 140g-140k can be split into multiple beams to reach multiple destinations in the EP device 100B.

In an embodiment of the invention, the beam from the coupler SLCO-SmfSiw 134 is sent through an exemplary route to a wavelength filter 142. In another embodiment of the present invention, the wavelength filter 142 is a silicon ring-resonator tunable wavelength filter (Si-R-TWF) 142. The Si-R-TWF 142 filters the wavelengths by picking a particular wavelength. Therefore, a single fiber channel of a particular wavelength could be selected. The output of Si-R-TWF 142 is further sent to a high-speed photo-detector (HS-PD) 212 (not shown in the figure). The HS-PD 212 is located in the interior part of the EP device. The Si-R-TWF 142 is further described in detail in conjunction with FIGS. 32 and 33.

Figure 30:
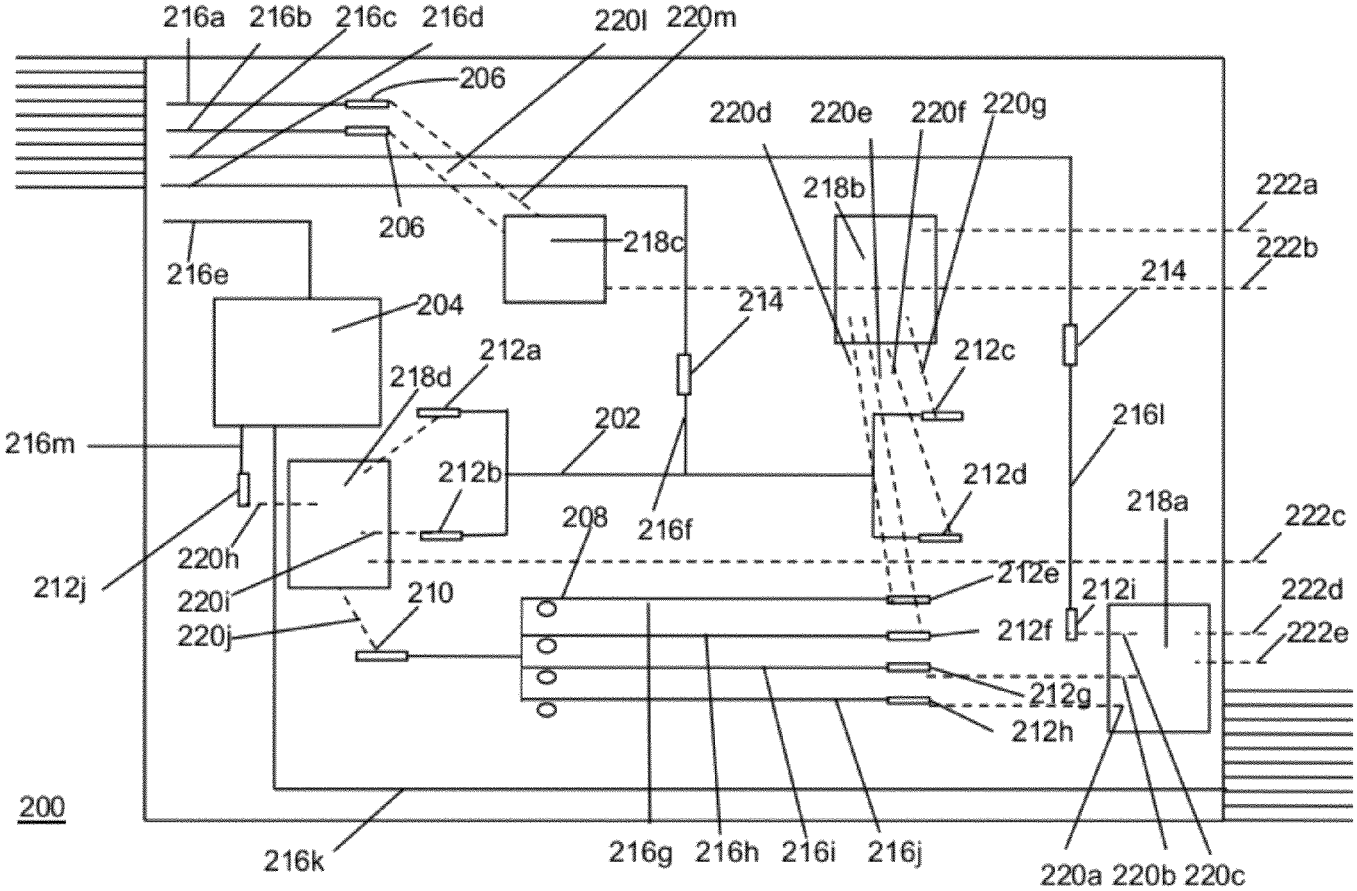
FIG. 30 illustrates an electronic-photonic device set-up, in accordance with various embodiments of the invention.

The Interior Part:

The output beams from the input port 400 of the EP device are sent to different parts in the interiors of the EP device. Four different scenarios receiving the beams from the input are discussed below:

FIG. 30 illustrates an interior part 200 set-up of the electronic-photonic (EP) device in accordance with various embodiments of the invention. The four scenarios that receive the output beam from the input part 100 describe the working of the interior part are optical clock distribution 202, all-optical computing chip 204, direct detection 206, and interior optical interconnects 208. The four scenarios are discussed in detail below:

1. Optical Clock Distribution 202: The signal beam (i.e. the output beam) 140g-140k received from the input part 100C is further sent to multiple parts of the EP device for optical clock distribution 202 of signals. In an embodiment of the invention, the optical clock distribution 202 is such that each clock signal lies within a range of ~1-2 mm with a similar value of tolerance, of any transistor circuit. The beam propagates for a considerably long distance in the device. The clocked signal distribution will be apparent to a person skilled in the art.

2. All-Optical Computing (AOC)/Signal Processing Chip 204: The signal beam received from the input port 100 is further sent to a circuit referred to as an all-optical chip 204. The all-optical chip 204 performs required ultra-fast all-optical computing before detecting and sending it to the output part. In some cases, the all-optical chip 204 also performs signal processing before detecting and sending it to the output part 300. All-optical computing will be apparent to a person skilled in the art.

3. Direct Detection 206: The signal beam is detected and converted to electrical signals. The electrical signals can be used to drive the electronic circuitry.

These three scenarios as described above are used for direct data transport in the EP device. An integrated optical amplifier 214 provides a boost to weak signals propagating over a long distance. In an embodiment of the present invention, the optical amplifier 214 is an InP semiconductor optical amplifier for nano-waveguide (SOA-Nw). Narrow width of SOA-Nw 214 allows the SOAs to operate at low current. In some cases, the SOA-Nw 214 operates with current in the range ~20-40 mA. In other cases, the width of SOA-Nw 214 can be 1.5 μm. The current is approximately five times lesser than a conventional SOA.

In an embodiment of the invention, to convert optical signals into electrical signals, an integrated photodetector 212 is used. The photodetector 212 is an InP high-speed PIN-diode Photodetector 212. Hereinafter, the photodetector 212 is interchangeably referred to as an InP high-speed PIN-diode photodetector (HS-PD) device 212. PIN diode in the InP high-speed PIN-diode photodetector 212 provides a working efficiency at wavelengths of about 1550 nm for a speed greater than 20 Gb/s. The significance of using PIN detector is the ease provided during integration with planar photonic circuits.

4. Interior Optical Interconnects 208: The signals from the electronic sub-circuitry are sent optically from one part of the EP device to another part by using interior optical interconnects 208.

To serve the purpose of transmission of signal from part of the EP device to another, in some cases, an on-chip transmitter-receiver pair is required. A directly modulated laser 210 is used to power multi-destination interior optical interconnects for waveguides for multiple locations. The directly modulated laser 210 has small size, low threshold, reasonably high output, and high direct modulation speed. In an embodiment of the invention, directly modulated laser 210 provides high power efficiency and is referred to as low-threshold high-performance nano-laser (LTHP-NL) 210. The output power of LTHP-NL 210 is greater than 2 mW. The light beam from the LTHP-NL 210 is coupled to a silicon layer. In another embodiment of the invention, the LTHP-NL 210 splits into multiple destinations for point-to-point signal transport within the device, providing a peak output of ~60-120 μW.

The Output Port:

The output optical beams and output electrical signals from the interior part of the EP device are sent to different parts in the output port 402. The output port has multiple output parts 300a-300g of the EP device as per the requirements of the circuitry and the application in which the EP device is used. The output from the EP device can be fed to an electronic device or a photonic device. In some embodiments of the invention, a multiple optical fiber output port 402 with 10 optical fibers is used. The multiple optical fiber output port 402 is described in detail in conjunction with FIG. 32B. Each fiber of the optical fiber output port 402 is expected to carry multiple optical wavelengths having a wavelength spacing of 5 nm, centered on 1550 nm. Each wavelength can carry optical signals at 20 Gb/s data rate and therefore, provides a total of 1 Tb/s data rate. The signals at the output may be sent to the electronic device or the photonic device as described in conjunction with FIG. 31.

Figure 31:
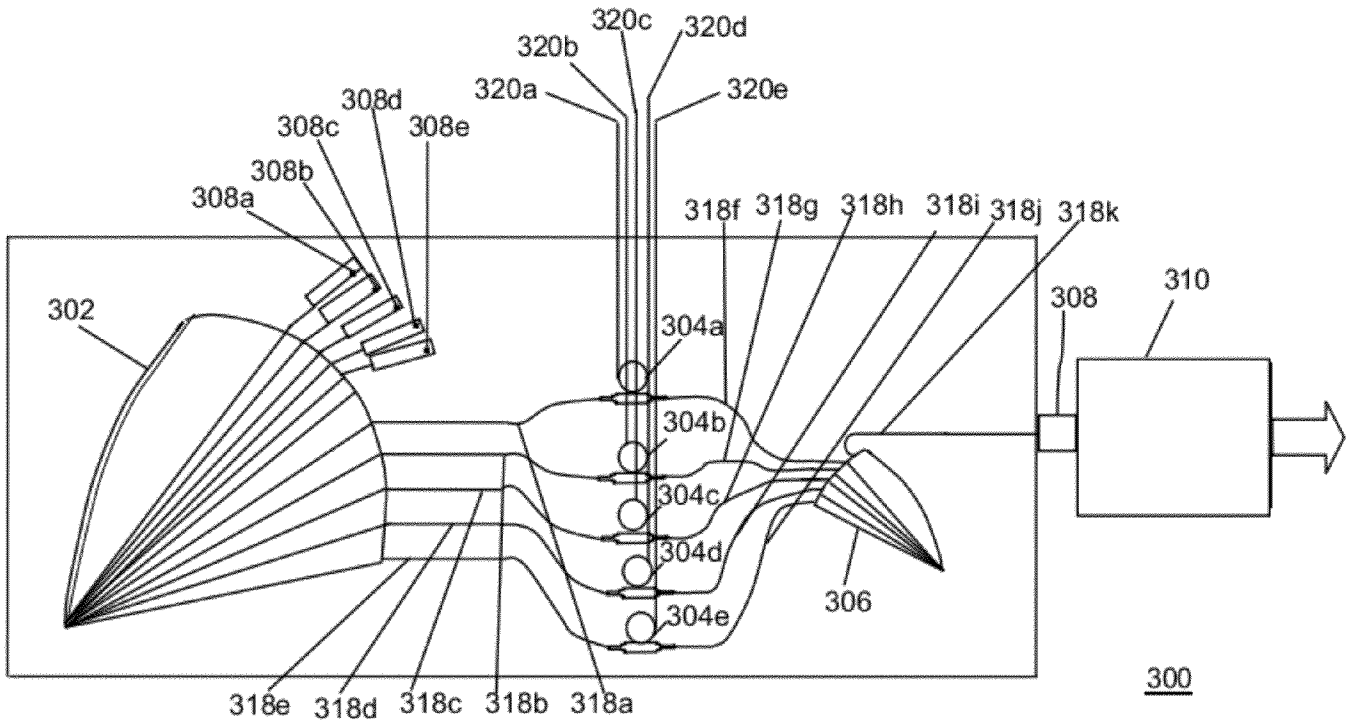
FIG. 31 illustrates a set-up for output part of electronic-photonic device, in accordance with an embodiment of the invention.

FIG. 31 illustrates the output part of Electronic-Integration Compatible Photonic/NanoPhotonic Integrated Circuit (EIC-PIC) device, in accordance with an embodiment of the invention. To describe the invention, reference will be made to FIGS. 29, 30 and 32. It will be apparent to those skilled in the art that the output part 300 can be applicable to any other embodiment of the invention.

The output part 300 includes a grating laser 302, electro-optic modulators 304, a multiplexer/demultiplexer 306, coupling optics 308 and an optical waveguide 318. An external laser chip 312 and coupling optics 314 for vertical emission are separately provided in the output port 402. The optical beam path in the output port involves a grating laser 302 and the coupling optics 308 to bring the light beam in from the beam output ports of Interior Part 200, which is further provided to passive optical waveguides 318a-318e. The typical electrical signal path in the output port involves an electrical wire 320 to bring the electrical signals in from the electrical signal output wire 222 of Interior Part 200. With reference to FIG. 30, the electronic device and/or the photonic device that receive output from the inner part 200 are described below:

From Electronics at output port: To transport a large amount of data out of the device, a specific grating laser 302 is used. The grating laser 302 is referred to as stepper-lithography compatible multiple-wavelength WDM curved grating laser (SC-WDM-CGL) 302. SC-WDM-CGL 302 provides multiple beams with different wavelengths having a pre-defined spacing. In one embodiment of the present invention, SC-WDM-CGL 302 provides 5 beams for 5 wavelength channels having a spacing of 5 nm. Further, SC-WDM-CGL 302 can be fabricated using stepper lithography. It will be apparent to a person skilled in the art that a stepper is a device used in the manufacture of integrated circuits (ICs) and has operation similar to that of a photographic enlarger. The process of lithography is a process used in micro-fabrication to selectively remove parts of a thin film or the bulk of a substrate. The grating pitch of few μm and a compact size provide a high-quality laser with wavelength determined by the grating, resulting in a relatively smaller WDM laser.

The beams from SC-WDM-CGL 302 are coupled to a silicon layer. Output from laser 302 is sent to a passive waveguide 318. In some cases, the coupling loss is less than 0.5-1 dB. The beam is further sent to silicon high-speed electro-optic modulators (Si-HS-EOMs) 304. Si-HS-EOMs 304 convert the electrical data to optical beam. It will be apparent to a person skilled in the art that electro-optic modulator 304 is an optical device having a signal-controlled element displaying electro-optic effect, which can be used for modulation. Electro-optic modulator 304 can be used in the invention to modulate light. In some cases, the output of Si-HS-EOM is ~0.5-1 mW with a loss of 3-6 dB. Si-HS-EOMs 304 provide a modulation rate of 20 Gb/s.

The output beams 318f-318k modulated by Si-HS-EOMs 304 are sent to a silicon ultra-compact wavelength multiplexer (Si-UC λMux) 306 that combines wavelengths to a single output beam. In an embodiment of the invention, the channel spacing provided by Si-UC λMux 306 is 5 nm. The power output is 125-500 μW and a loss of less than 3-6 dB.

The output beam from the Si-UC λMux 306 is further coupled to an optical fiber 310 through an integrated coupler 308. In an embodiment of the invention, the integrated coupler 308 is referred to as Superlens Coupling Optics for Single-Mode Fiber to Silicon Waveguide (SLCO-SmfSiW) 308 and is functionally similar to the SLCO-SmfSiW 104. A peak pulse power of ~60-400 μW from the fiber 310 could be achieved. The required power of greater than 200 μW could be achieved within this range.

Figure 32B:
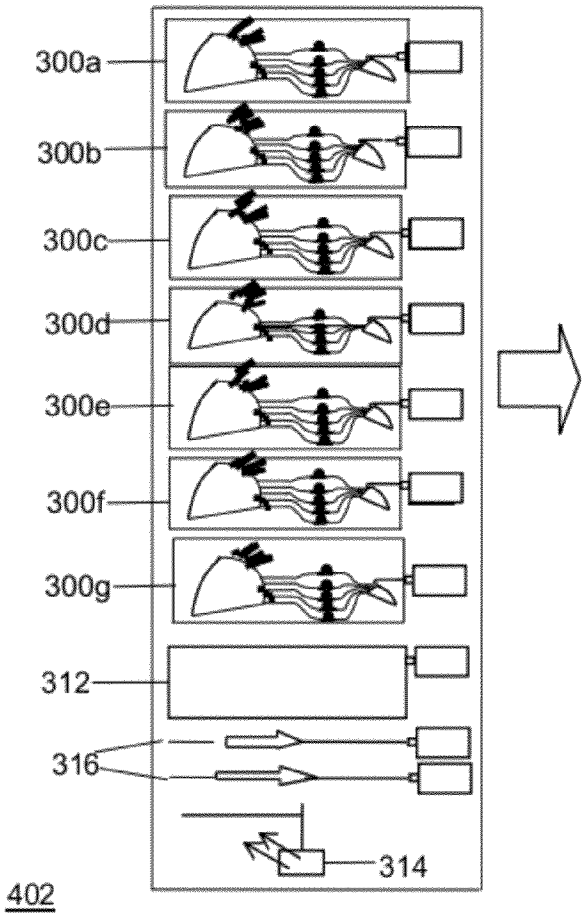
FIG. 32B illustrates a multiple optics fiber output port, in accordance with an embodiment of the invention.
Figure 32A:
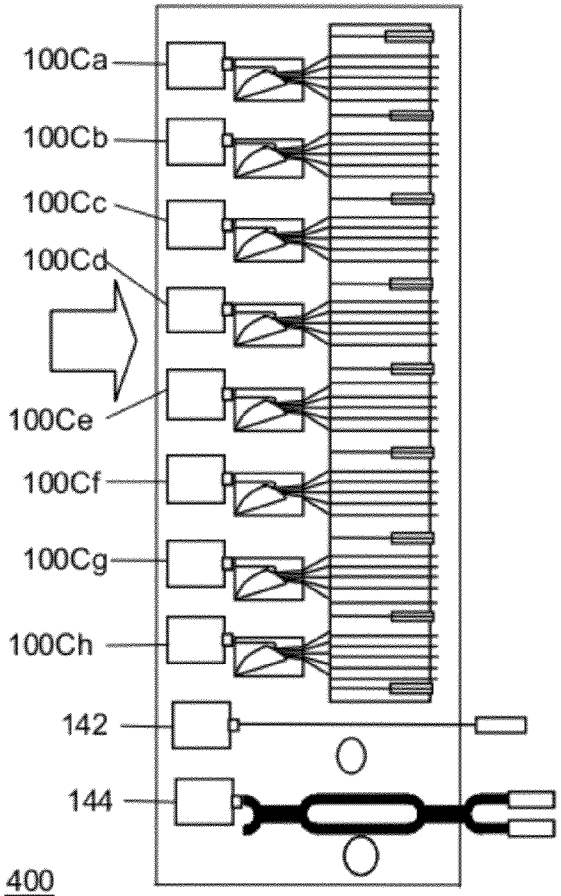
FIG. 32A illustrates a multiple optics fiber input port, in accordance with an embodiment of the invention.

FIG. 32A illustrates multiple optical fiber input port 400, in accordance with an embodiment of the invention. The multiple optical fiber input port 400 has ten small-mode-size optical fibers 100Ca-100Ch, 142 and 144 having small diameter connected to a photonic input area. In an embodiment of the invention, the diameter of small-mode-size optical fibers 100Ca-100Ch is ~6 μm. Each of the fibers 100Ca-100Ch is designed to carry multiple optical wavelengths. Each wavelength has the ability to carry optical signals with a data rate of 20 GB/s resulting in a total data rate of 1 Tb/s.

The other input part of the input port 400 is a tunable wavelength filter 142. In an embodiment of the present invention, the tunable wavelength filter is referred to as Silicon Ring-Resonator Tunable Wavelength Filter (Si-R-TWF) 142. In Si-R-TWF 142, a silicon MZI resonator having a nano waveguide and a micro-ring or micro-disk resonator is used to achieve enhancement in speed and to maintain a low value of RC constant. The advantages of ring shape in a ring resonator will be apparent to a person skilled in the art. The resonator has a whispering gallery mode. In an embodiment, the resonator has a diameter less than 0.5 μm. The whispering gallery mode provides an advantage by allowing lower electrode to be placed in the inner side of the ring/disk, by propagating around the edge of the ringdisk. This allows thicker core on the side, which leads to lower resistance for lower electrode. Further improvement is achieved by introducing Transparent Conducting Oxide (TCO) material as the upper gate electrode. TCO provides an effective waveguide cladding with fast evanescent decay of the guided field, the reason being a low refractive index 'n' less than a value of 1.7 at 1550 nm. By placing top electrode on the top of a thin layer of TCO, a lower resistance is achieved, resulting in a much enhanced speed. The other advantages provided by TCO are simple fabrication steps. The TCO to be selected should have a low enough optical absorption at 1.5 μm to avoid a high optical propagation loss coefficient $\alpha$. The desirable loss should be less than thirty percent. The use of Silicon MZI structure with micro-disk or ring resonators is incorporated. The structure provides a function of tunable wavelength filter 142 along with a fast optical switch. By thermally or electrically tuning the index, and therefore the resonant ring wavelength, filtering and switching can be achieved in a precise manner. The output of the wavelength filter 142 is provided to interior part of the device.

According to yet another embodiment of the invention, the beam from the coupler is sent through another exemplary route to an optical switch 144. In an embodiment of the present invention, the optical switch 144 is a silicon high-speed optical switch (Si-HS-OS) 144. Hereinafter, the optical switch 144 is interchangeably referred to as Si-HS-OS 144. The Si-HS-OS 144 is designed to provide on-chip all-optical signal routing. The switching speed provided by all-optical switch (Si-HS-OS) 144 is less than 0.1 ns. The output beam power offered by Si-HS-OS 144 is in the range of ~50-80 μW.

FIG. 32B illustrates multiple optical fiber output port 402, in accordance with an embodiment of the invention. The multiple optical fiber output port 402 includes ten optical fibers 300a-300g, 312 and 316. In an embodiment of the invention, each of the ten optical fibers 300a-300g, 312 and 316 is expected to carry multiple optical wavelengths having a wavelength spacing of 5 nm, centered on 1550 nm. Each wavelength carrying optical signals at 20 Gb/s data rate provides a total of around 1 Tb/s data rate with the use of 5 wavelengths and 10 fibers.

In an alternate route, an external InP WDM laser chip 312 emitting multiple wavelengths with ~4 mW power per wavelength channel provides a WDM laser. The chip 312 is flip-chip bonded to the silicon wafer. In an embodiment of the invention, the coupling is done using Silicon wafer with light coupled into silicon layer through a superlens coupling optics for external chip to silicon waveguide coupling. Hereinafter, the coupler is interchangeably referred to as referred to as Superlens Coupling Optics on Si for External Silicon Chip (SLCO-EcSiw) 312. A practical coupling loss is less than 1-3 dB.

From an external photonic chip: In one scenario, a light beam 316 from interior part of the device is coupled to an optical fiber or through a wavelength multiplexer 312. In another scenario, the light signals from a silicon waveguide are emitted out vertically to provide vertical emission through a coupling optics device 314 for vertical coupling to external device. In an embodiment of the invention, a coupling optics device 314 is referred to as Superlens Coupling Optics on Si for Vertical Emission (SLCOSiwVe) 314. Hereinafter, a coupling optics device 314 is interchangeably referred to as SLCO SiwVe 314. The external device is flip-chip bonded onto the silicon platform and coupled to a waveguide. The waveguide is referred to as a silicon waveguide through a superlens based external-chip optical coupler (SLCO-EcSiw) 312.

Figure 33A:
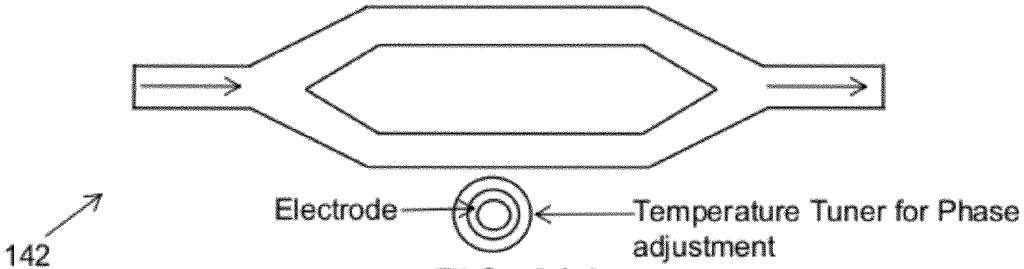
FIG. 33A illustrates a silicon ring-resonator tunable wavelength filter (Si-R-TWF) to be used in electronic-photonic device, in accordance with an embodiment of the invention.

FIG. 33A illustrates a silicon ring-resonator tunable wavelength filter (Si-R-TWF) 142 used in electronic-photonic device, in accordance with an embodiment of the invention. As shown in FIG. 33A, the Si-R-TWF 142 filters the wavelengths by picking a particular wavelength. A single fiber channel of particular wavelength is selected. The output is further sent to a high-speed photo-detector (HS-PD) 212. The Si-R-TWF 142 structure with micro-disk or ring resonators incorporated can also be used to achieve tunable wavelength filter and fast optical switch. The index can be thermally or electrically tuned; therefore, the resonant wavelength of the ring is also altered, resulting in precise filtering and switching operations.

Figure 33B:
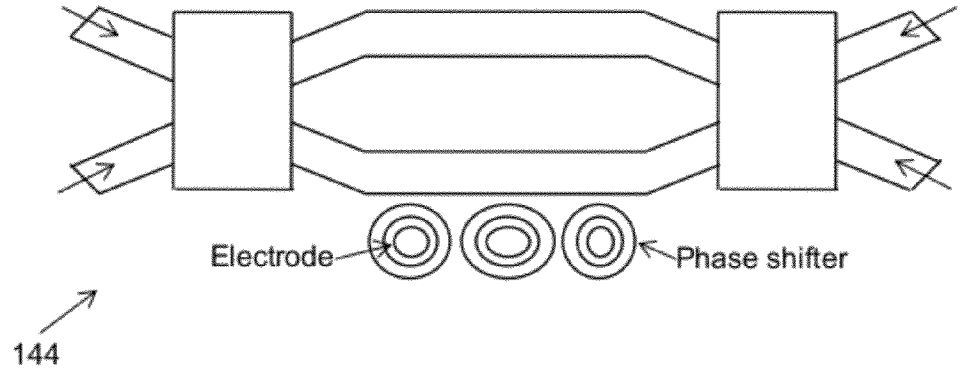
FIG. 33B illustrates a silicon high-speed optical switch (Si-HS-OS) to be used in an electronic-photonic device, in accordance with another embodiment of the invention.

FIG. 33B illustrates a silicon high-speed optical switch (Si-HS-OS) 144 used in an electronic-photonic device, in accordance with another embodiment of the invention. An optical switch is a unit that switches the light between fibers; and a photonic switch is one that does this by exploiting nonlinear material properties to steer light. As shown in FIG. 33B, Si-HS-OS 144 is designed to provide on-chip all-optical signal routing. The switching speed provided by all-optical switch (Si-HS-OS) 144 is less than 0.1 ns. The output beam power offered by Si-HS-OS 144 is in the range of ~50-80 μW. The phase shifting is achieved by changing the resonant wavelength of the ring. The illustrated Si-HS-OS switch 144 is a 2×2 optical switch. Slow optical switches are used for alternate routing of an optical transmission path, such as routing around a fault. Fast optical switches, used in electro-optic modulation are used to perform logic operations.

General Specifications of the Devices and Structures:

The details described here are for illustrative purpose only and they do not limit the scope of the invention in any way. For example, the waveguide can be made of any dielectric material (for example InP, GaAs, GaN, Titanium Dioxide, Silicon Dioxide, Silicon Nitride) as long as waveguiding function can be achieved as is known to those skilled in the art, and need not be silicon. The various powers are for illustration only and the optical power in these devices can be of any value as long as the device or waveguide can withstand it as is well known to those skilled in the art. The wavelength does not have to be around 1550 nm and can be any optical wavelength ranging from deep ultra violet to far infrared, depending on the materials used as is known to those skilled in the art. The waveguide and device dimensions are in general, linearly proportional to the optical wavelength used, as is known to those skilled in the art. The connection between any two devices, when not specifically stated, is generally achieved by using optical waveguide. Each device can be optional depending on the photonic function to be achieved. For example, at the input part, the photon transistor is optional (that is, it can be absent and a waveguide can be replaced in lieu of the device) if the function is wavelength demultiplexing. This can be achieved by the ultra-compact grating alone and the pulse regeneration function of the photon transistor is not essential. At the output part, the optical modulator is optional (that is, it can be absent and a waveguide can be replaced in lieu of the device) if the function is to produce intensity modulation of the laser light. This can be achieved by directly modulating the current to the semiconductor laser. In the input part, output part, or interior part, the optical amplifier is optional (that is, it can be absent and a waveguide can be replaced in lieu of the device), as long as no intensity amplification is needed. This can be replaced by the use of low-loss waveguide, higher-efficiency photodetector, or higher-power laser. As is discussed above, the EIC-PIC may be configured with different set of devices in different ways and can be as simple as one device with one input port or a single device with one output port to perform a single function or as many devices as needed with many input parts and many output ports to perform a plurality of functions.

Furthermore, the device performing the optical wavelength converter or pulse regeneration or pulse shaping function does not have to be the photon transistor described and it can be replaced by other devices performing the same photonic function, such as Semiconductor-Optical-Amplifier (SOA) based wavelength converter and pulse regenerator or pulse shaper. Likewise, the wavelength multiplexing and wavelength demultiplexing devices do not have to be the ultra-compact gratings and they can be replaced by array-waveguide grating (AWG) as long as the wavelength multiplexing and demultiplexing functions can be achieved. The laser does not have to be the grating laser described and can be other semiconductor lasers such as Distributed Feedback (DFB) Laser, Bragg-Reflector (DBR) Laser, Sample-Grating Distributed Feedback Laser (SGDBR), Fabry Perot (FP) Laser, Ring Laser, Microdisk Laser, Microloop Mirror Laser, and it can be replaced by wavelength tunable or wavelength selectable or fixed wavelength laser, as long as the lasing light can be produced. The modulator does not have to be the silicon modulator described and it can be replaced by other silicon modulator, organic modulator, InP modulator, GaAs modulator, as long as the intensity modulator function can be achieved. The ring resonator does not have to be single ring and it can be replaced by multiple ring resonator or other tunable filter as long as the wavelength filtering function can be achieved. The optical input or output coupler does not have to be superlens, and it can be replaced by grating coupler, tapered waveguide coupler, or other optical beam coupling devices. The up-down coupling device does not have to be the tapered waveguide coupler, and it can be replaced by an up-down coupling device as long as energy can be coupled from the passive layer to the active layer. Many of these other devices, with proper design, can also be fabricated using the fabrication processes described here.

Fabrication Method:

The fabrication part of the device through monolithic integration process includes monolithic integration of active and/or passive photonic devices and their process insertion into the CMOS process and monolithic integration of compound semiconductor (e.g. III-V semiconductor) active and/or passive devices and their process insertion into the CMOS process.

Monolithic integration provides a number of advantages. It provides best way to minimize any trade-offs in performance. Further, monolithic integration on a substrate like silicon provides a better heat-conducting platform, resulting in improved power efficiency of the EP device components including electronic transistors and lasers. In addition, the power requirement is also lowered and an increase in the output power is observed.

Monolithic integration reduces the need for pick-and-place each component, bonding of components and other assembly processes necessary in hybrid assemblies, including those that place discrete elements on a silicon substrate. The integration of compound semiconductor (e.g. III-V semiconductor) devices on silicon is based on three important CMOS compatible processes. These processes include:

1. Wafer-level bonding at low temperature, with N-side down technique for near-epi-wafer-smooth bonding surface. In wafer processing, monolithic integration of the photonic and electronic structures and process requires the development of highly skilled process techniques. During the manufacturing process, the management of thermal budgets and surface planarity issues flow must be done to eliminate or minimize adverse effects on all of the integrated circuit elements on the chip.

Furthermore, wafer bonding of compound semiconductor (e.g. III-V semiconductor) devices to silicon is a low-temperature process. The process involves silicon-nitride ($Si_3N_4$) bonding with good bond strength, good thermal conduction, and thermal matching to InP and silicon. In the process of wafer bonding, InP is introduced only after the heat treatment procedure to avoid any adverse effects caused by heat treatment, which may lead to a change in the properties of InP, which results in a difference in the functionality provided by InP.

2. Re-growth free III-V integration of passive, active and WDM broad band devices based on CMOS-compatible quantum well intermixing (QWI) technique. The QWI technique will be apparent to a person skilled in the art. The QWI technique is developed with a low loss and wide spectral shift of a value greater than 120 nm. The process provides better passive-active sections having multiple bandgap energies within a few steps for a wide variety of integrated devices, ranging from lasers, modulators, to detectors. This results in a wide wavelength range coverage (>40 nm) of WDM devices.

3. Tapered-waveguide up-down coupling technique to provide up-down coupler to steer light between the silicon and the compound semiconductor (e.g. III-V semiconductor) layer. Such tapered up-down coupler has a good tolerance to fabrication process variation. Efficient coupling of the light beam between compound semiconductor (e.g. III-V semiconductor) layer and Si is achieved using tapered waveguides. This approach does not need precise dimensions control as it is based on phase matching that will self-adjust to occur at slightly different part of the tapering section in case there are dimensional variations. TE/TM balanced coupling can be engineered.

Figure 34:
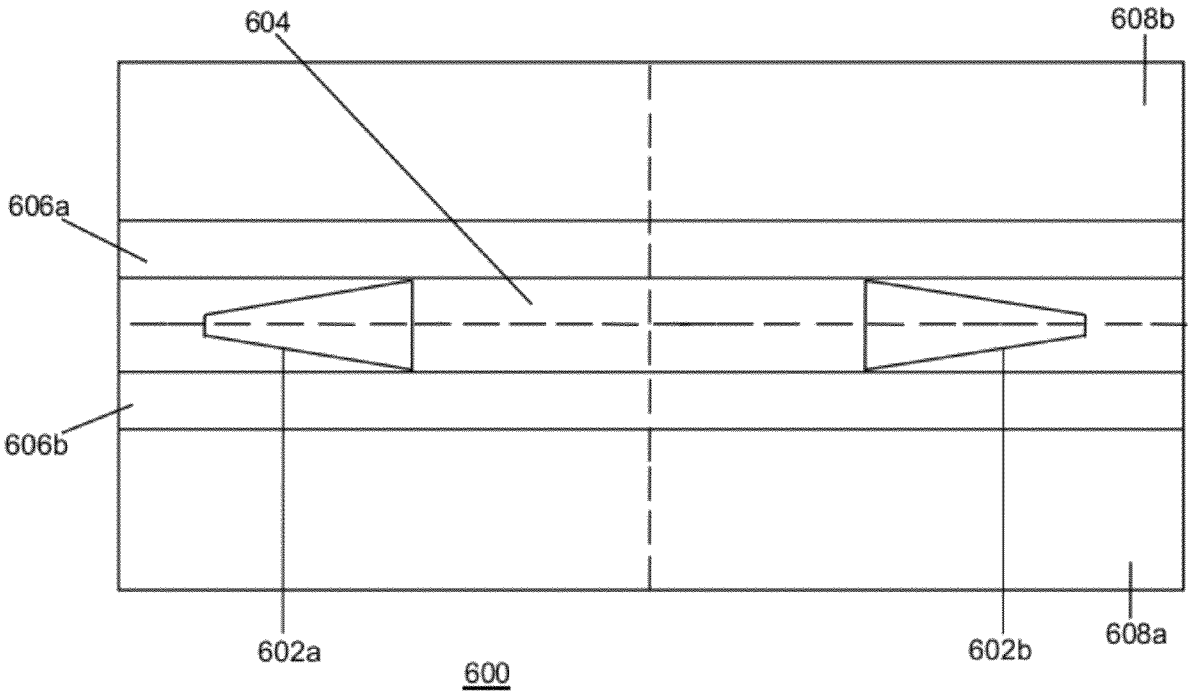
FIG. 34 illustrates a view of device structure for the evanescence coupling between compound semiconductor (e.g. III-V semiconductor) and Si waveguide and metal contact configuration in accordance with another embodiment of the invention.

FIG. 34 shows the device structure at the coupling section 600, in accordance with an embodiment of the invention. Tapered waveguide (602a, 602b) are present on both sides at the top of compound semiconductor (e.g. III-V semiconductor) device (604). Light from Si waveguide trench (WG)

(606a, 606b) is coupled through the front taper section 602a into the top compound semiconductor (e.g. III-V semiconductor) WG 604 and keeps on traveling in the top WG 606a, since compound semiconductor WG have higher effective-refractive index than bottom Si WG 606b. Typically, the thin 0.3 μm Si WG has effective index of 2.9.

Figure 35:
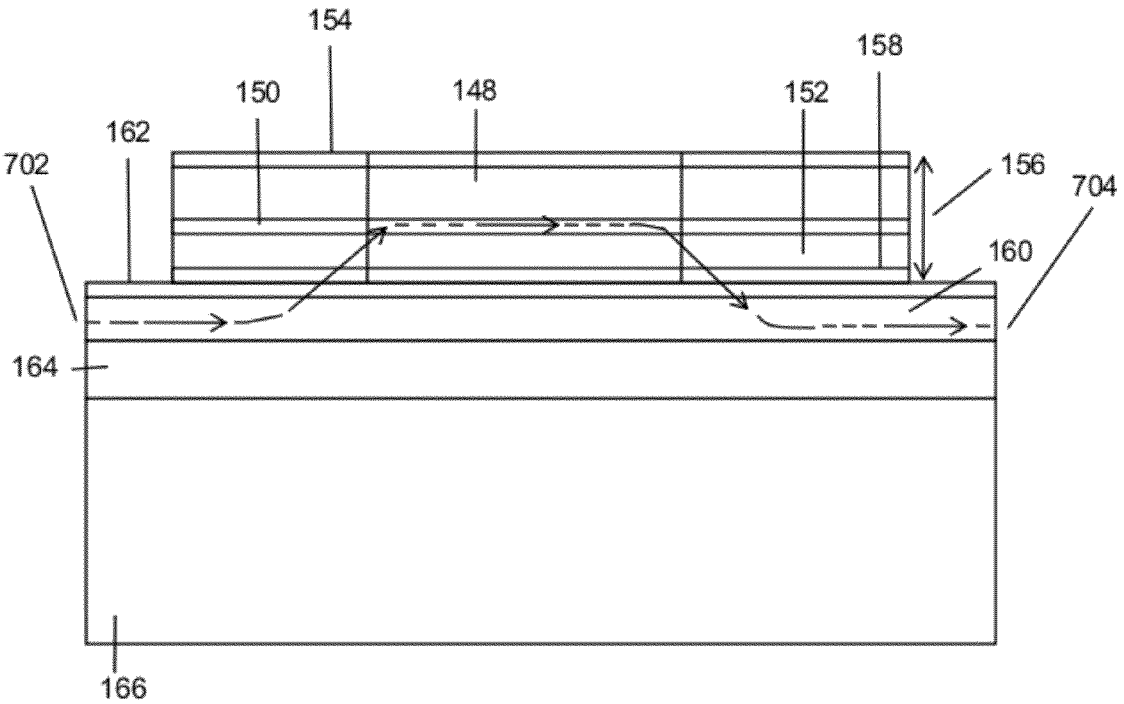
FIG. 35 illustrates another view of device structure for the evanescence coupling between compound semiconductor and Si waveguide and metal contact configuration in accordance with another embodiment of the invention.

FIG. 35 illustrates another view of the device structure for the evanescence coupling between compound semiconductor (e.g. III-V semiconductor) and Si waveguide and metal contact configuration, in accordance with another embodiment of the invention. FIG. 35 shows a top electrical contact conducting current and voltage through the top electrically conductive layer 148 to the active device 700 with active material 150, and a bottom electrical contact conducting current and voltage through the bottom electrically conductive layer 152. Layers 150, 152, and 154 form an active layer structure 156. The Ohmic contact to the electrical wire from the top is through a thin Ohmic contact layer 154. The Ohmic contact to the electrical wire from the bottom is through a thin Ohmic contact layer 158. From input 702, the optical beam entering input 702 is coupled through the passive waveguiding layer 160 to the active layer structure 156. In an embodiment of the invention, the coupling is achieved by using the up-down tapered waveguide coupler 602a. The optical beam, after propagating through the active layer 150, is coupled from the active layer structure 156 to the passive waveguiding layer 160 and exits the output port 704. In an embodiment of the invention, the coupling is achieved by using the up-down tapered waveguide coupler 602b. In another embodiment of the invention, the active layer structure is an InP based active layer.

In an embodiment of the invention, the InP based active layer comprises an InP layer 156 with total thickness of 300 nm and at the center of this layer is a quantum well structure 150 with five InGaAs quantum wells having thickness of 8 nm for each quantum well spaced by 10 nm of InP. The InP layer 148 above the quantum well structure is n-doped and the InP layer 152 below the quantum-well layer is p-doped. The n and p doping enable this active layer to be electrically pumped to achieve desired optical gain. The top Ohmic contact layer 154 is n-doped InGaAs and the bottom Ohmic contact layer is p-doped InGaAs. The passive waveguiding layer 160 is of silicon, with a thickness of 300 nm, the intermediate layer 162 is of silicon nitride with a thickness of 300 nm, the lower cladding layer 164 is of silicon dioxide, and the substrate 166 is of a silicon substrate. The passive waveguiding layer 160 is also referred to as waveguide core 160.

The waveguide core 160 is on top of a transparent lower waveguide cladding 164. The lower waveguide cladding 164 is on top of a substrate 166. The waveguide core layer 160 material is a transparent material with high refractive index nCOR to guide the optical wave. The transparent lower cladding material layer 164 has a refractive index nCL lower than that of the waveguide core 160. As is well known to those skilled in the art, the waveguide core or cladding material can be chosen from semiconductors (Si, InP, GaAs, GaN etc), dielectrics ($TiO_2$, $SiO_2$, $Si_3N_4$), and other transparent materials. The substrate 166 provides mechanical rigidity and can be of any mechanically strong material; including semiconductor, polymer, dielectrics, metal, ceramic etc.

According to an embodiment of the present invention, the optical beam has optical wavelengths around 1.5 micrometers (1.5 m). The waveguide core layer 160 is of silicon, which is transparent at the wavelength of 1.5 m. The silicon waveguide core layer 160 has a refractive index nSi=3.5, and the thickness of layer 160 is 300 nanometers (300 nm). Furthermore, the cladding material layer 164 is of silicon dioxide ($SiO_2$) with refractive index $n_{SiO2}$=1.5 and a thickness of 300 nm or larger. The substrate material 166 is silicon (Si). In an embodiment of the invention, the waveguide core 160, lower waveguide cladding 164, and substrate 166 are formed by a Silicon-On-Insulator (SOI) substrate. In some cases, the wavelength of the input beam is around 1.5 μm. In an embodiment of the invention, coupling of beam from waveguiding layer 160 to the active layer structure 156 is achieved by the up-down tapered waveguide coupler 602a and the beam energy efficiency can be as high as ninety five percent. In another embodiment of the invention, it is preferred that high-frequency CMOS applications have thin buried oxide (BOX) of 100 nm-500 nm and the top silicon layer thickness of 5 nm-200 nm.

For photonic applications, the silicon layer thickness needs to be thicker, which could be managed by using epitaxial growth of silicon at the photonic device area. However, it is a difficult task to change the BOX thickness. For a given BOX thickness, there is a minimal silicon thickness needed to confine TE/TM losses to a value lesser than 1/cm. For example, for a BOX of 300-500 nm, a good silicon thickness to be used would be ~0.3 μm.

FIGS. 17-26 illustrate steps in fabrication process of electronic-photonic device, in accordance with various embodiments of the invention. The fabrication steps for electronic-photonic device are discussed below.

a) Insertion of silicon and compound semiconductor (e.g. III-V semiconductor) photonic integration process into CMOS process.

The steps include:

1. A thin film of $SiO_2$ dielectric layer is placed on a silicon (Si) wafer by heat treatment process involving a temperature of 1000° C.
2. A silicon wafer doped with p-type dopants is deposited over the thin film of $SiO_2$ dielectric layer. N-type dopants are implanted on the silicon wafer layer to form N-wells.
3. A process of Wafer Annealing is carried out to activate the implanted dopants. The process requires heat treatment involving a temperature of 1000° C. The structure formed after wafer annealing process is considered as a first substrate layer.
4. A pattern for creating a nano-waveguide and a silicon-based ring/disk modulator is created on the first substrate layer. The patterning process involves epitaxial growth of thick silicon on the waveguide region. The nano waveguide is typically 0.3 μm thick.
5. A first dielectric layer of $SiO_2$ and a second dielectric layer of $Si_3N_4$ are deposited over the structure formed after creating the nano-waveguide and the modulator. The $SiO_2$ and $Si_3N_4$ dielectric layers act as a field oxide mask for the waveguide, protecting the waveguide from the following process.
6. A process of channel-stop ion implantation is carried out over the structure formed after step 5. The process involves creating a photoresist layer over the $SiO_2$ and $Si_3N_4$ layers. After performing channel-stop implant, the photoresist layer is removed and a thick oxide layer is grown on the exposed portions of the silicon, thus producing Field Oxide (FOX). FOX grows in the area where $Si_3N_4$ layer is absent.

7. Portions of $SiO_2$ and $Si_3N_4$ dielectric layers placed over the ring/disk modulator are removed to open the ring/disk modulator for p-type adjustment of dopants.
8. After implanting p-type dopants into the modulator, Gate Oxide is grown in the areas where FOX is absent. The growth of Gate Oxide acts as a gate dielectric (TOX).
9. The process of growing TOX is followed by a Threshold-adjust implantation to adjust native threshold voltage. The native threshold voltage is adjusted by implanting a thin layer of dopants near the surface of the structure formed after step 8.
10. A polysilicon or n-Transparent Conducting Oxide (n-TCO) or a combination of n-TCO and polysilicon layer is deposited as a deposition layer on top of the gate dielectric (TOX).
11. The deposition layer is removed by etching, in a way such that portions of the deposition layer over the edges of the modulator are only maintained and rest of the deposition layer is removed.
12. A process of Chemical Vapor Deposition (CVD) is performed to place a CVD oxide layer on the deposition layer. In CVD, the structure formed after step 11 is exposed to one or more volatile precursors, which react and/or decompose on the surface to produce a desired deposit.
13. A pattern for N+ implant is created over the silicon based modulator. The process of patterning involves a process of depositing a negative photoresist and a process of photolithography. After photolithography all portions to receive n+ implants are exposed.
14. The patterning process is followed by N+ ion implantation to form N+ source region and N+ drain region.
15. The N+ source region and the N+ drain region are protected by placing a resist cover over the implanted N+ source region and N+ drain region and then opening the silicon based modulator for implanting P+ dopants.
16. After opening the silicon based modulator, the P+ dopants are implanted over source and drain terminals to form P+ source region and P+ drain region.
17. A process of annealing is performed at 900-1100° C. to activate the implanted dopants.
18. An oxide space is created around gate terminal, such that the deposition of the silicide during silicidation process will not short the gate region with source region or drain region.
19. A process of silicidation is performed. The silicidation process involves depositing conductive material on gate region or source region or drain region through Chemical Vapor Deposition (CVD) process. The structure formed after the process of silicidation is considered as an integrated structure.
20. Semiconductor compound semiconductor (e.g. III-V semiconductors) wafer bonding is carried out between an $Si_3N_4$ layer deposited on the integrated structure and an $Si_3N_4$ layer of a second substrate, wherein the second substrate is an compound semiconductor (e.g. InP) substrate. The process of wafer bonding is further explained in detail.
21. Quantum Well Intermixing (QWI) process is followed by the wafer-bonding process. The QWI process involves implanting ions into a number of quantum wells using thin layer of oxides as an implant mask. The QWI process can also be performed before the wafer bonding process, depending on situation.
22. After QWI, during a process of an photonic device (e.g. InP device) fabrication, a protective cover material is applied over the compound semiconductor (e.g. III-V semiconductor) device to protect the compound semiconductor (e.g. III-V semiconductor) device from the superlens processes.
23. A superlens is deposited on the structure formed after step 22;
24. Etching of the superlens is performed after deposition. During the process of deposition and etching of superlens, a protective cover material is maintained over the rest of the structure.
25. Metal masking process is performed after the etching of superlens. A 500 nm thick oxide layer is used for the process of metal masking.
26. This step involves creation of metal contacts for drain region, source region, gate region and metal contacts for photonic devices using multi-level metals.
27. This step involves mounting an optical fiber on the substrate to facilitate a coupling of light beam energy between the optical fiber and an optical waveguide on the substrate through a coupling optics (e.g. the superlens);
28.

The steps discussed are a combination of standard CMOS process and additional CMOS compatible steps that aid in the fabrication of both Si and compound semiconductor (e.g. InP) based photonic devices. Steps 4, 7, 10, 11, 13, 15, 20, 21, 22, 23, and 24 are the additional CMOS compatible steps according to various embodiments of the invention.

The silicon based photonic devices are fabricated on the Silicon-On-Insulator (SOI) wafer together with the CMOS components using CMOS wafer-level process. The steps 1 to 18 are high temperature processes. Step 18 is the beginning of the CMOS metal-interconnect process. The compound semiconductor (e.g. III-V InP) wafer bonding begins either after step 17 or at step 19. The figures illustrated are assumed to have compound semiconductor (e.g. III-V InP) wafer bonding after step 19. This is to ensure that the properties of compound semiconductor (e.g. III-V InP) wafer do not change because of high temperature involved in steps 1 to 18. Steps 2, 4, 7, 10, 14, 16, 20, 22, 24, and 26 are illustrated in FIG. 17 to FIG. 26. Other steps, which are not illustrated in these figures, will be apparent to a person skilled in the art.

b) Silicon Photonic Device Fabrication: A scenario is discussed in accordance with the integration steps. Depending on the situations, there may be certain variations in the process. At step 4, fabrication of silicon passive waveguides on SOI is performed as illustrated in FIG. 18. Certain areas of the silicon chip are designated as photonic device areas. At step 5, $SiO_2$ and $Si_3N_4$ are deposited on the top of the photonic device area, ensuring protection. As illustrated in FIG. 19, an implant dose adjustment for silicon-based electro-optic modulators and switches is carried out at step 7. At step 10, polysilicon deposition or n-Transparent Conducting Oxide (n-TCO) or a combined n-TCO-polysilicon deposition is carried out and is illustrated in FIG. 20. Furthermore, the polysilicon or TCO is removed, maintaining the polysilicon deposited only at the side of the modulator. A mask patterning for N+ implant at the modulator is carried out at step 13. As illustrated in FIG. 21, step 14 is used to perform N+ implantation. At step 16, N+ implanted region is covered by resist and the windows are opened for P+ implantation process at the modulator as illustrated in FIG. 22.

c) Compound semiconductor (e.g. III-V semiconductor) Photonic Device Integration: Certain areas of the silicon chip are designated as photonic device area. Compound semiconductor (e.g. III-V semiconductor) device area is covered by $SiO_2$ and $Si_3N_4$ starting from step 5 to the end of step 19. After that, a scenario is discussed in accordance with compound semiconductor (e.g. InP/InGaAsP) wafer bonding and etch back, compound semiconductor (e.g. III-V semiconductor) device fabrication, superlens structural deposition, superlens patterning and etching.

i) InP/InGaAsP Wafer Bonding and Etch Back: An epitaxial layer structure is grown on top of an InP substrate (InP-S). In some cases, the epitaxial layer further requires a 0.2 μm thick InGaAsP n-F doped etch-stop and n-contact layer (ES-NC), which is grown on the InP substrate. This is followed by a thin cladding layer (CL1) of InP/InGaAsP materials having a thickness of 0.2 μm. The use of n+ doped InGaAs as N+ contact may lead to a high optical absorption due to the smaller bandgap energy. Furthermore, in some other cases, a thin waveguiding core layer (WC1) of 0.25 μm is grown. WC1 layer includes approximately 5-10 quantum wells within the layer. There is a 1.5 μm "thick" cladding layer (CL2) on the top of WC1. After CL2, a thin InGaAs P+-doped p-contact layer (PC) is then grown.

ii) N-Side Down for Near-epi-Wafer-Smooth Bonding Surface: After the epitaxial growth, an InP handling wafer (HW) is bonded to the epi-wafer through a Benzocyclobutene (BCB) polymer. Further, the epi-wafer substrate (InP-S) is etched by hydrochloric acid (HCl), which self-stops at the ES-NC due to the low etching rate of the InGaAsP layer. A thin silicon nitride layer ($Si_3N_4$—InP) is then grown on top of the n-contact layer (ES-NC). In some cases, the thin silicon nitride layer has a thickness of 0.1 μm. ES-NC layer has Epi-Wafer-smooth bottom surface as it is the first layer after the Epi-wafer substrate (InP-S). Therefore, the requirement for wafer bonding is accomplished, as thin $Si_3N_4$ layer provides a smooth surface.

iii) Local-Area Wafer Bonding to SOI: As described earlier, the thin silicon nitride layer is deposited on top of the silicon surface of the SOI wafer designated for compound semiconductor (e.g. III-V semiconductor) devices. The pre-etched silicon waveguides are provided for achieving vertical coupling. As this is a thin layer on the original SOI wafer surface, the $Si_3N_4$—Si layer will have smooth surface, meeting the requirement of wafer bonding. The wafer bonding takes place between the $Si_3N_4$ surface on the III-V InP wafer and the $Si_3N_4$ surface on the SOI wafer. To enable the wafer bonding, the silicon-nitride surfaces are subjected to plasma treatment, typically with 1-minute exposure to oxygen plasma (200 mTorr, 200 W) to create hydrophilic surfaces. Further, InP (thermal expansion coefficient $\alpha_{InP}$=4.6×10-6/K) is more thermally matched to silicon ($\alpha_{Si}$=2.6×10-6/K) than GaAs ($\alpha_{GaAs}$=5.7×10-6/K) which aids in meeting the smooth surface requirement of wafer bonding. The thermal coefficient of silicon nitride is $\alpha_{Si3N4}$=3.3×10-6/K which is in between that of silicon and InP. This temperature difference reduces temperature-induced stress. The wafers are then brought together and bonding occurs across the two silicon nitride surfaces. Bond strength of 0.16 Jm-2 is achieved by the process of annealing at 150° C. for greater than one hour. Higher bond strength of 1.1 Jm-2 can be achieved at low temperature with a annealing time of greater than 100 hours or by keeping a moderate annealing temperature of less than 400° C. The silicon nitride offers higher thermal conductivity, which is almost comparable to that of InP. It will be apparent to a person skilled in the art that the process is assumed to be an exemplary process. This process enables multiple areas to be bonded with compound semiconductor (e.g. III-V semiconductor) epitaxial layers that are subsequently used for making the active photonic devices on those areas, which is referred to as "local-area wafer bonding". The process described here is for illustrative purpose only and it does not limit the scope of the invention in any way. Different combinations of these steps and other similar steps are contemplated and are within the scope of the present invention.

d) High-spatial Resolution Bandgap Engineering: An ideal nano-photonics integration & device optimization technology shall have the following properties:

(1) High spatial resolution: ~1 μm spatial resolution is required in joining active-passive sections.

(2) High spectral resolution & uniformity: A wavelength of ~5 nm spectral resolution for shift in gain peak with uniform shift across a 2" or 3" wafer with less than 5 nm wavelength variation.

(3) Low passive section loss: The loss of the passive section is low with $\alpha$<~1/cm.

(4) High active section quality: The active section gain similar to as-grown materials.

(5) Low optical reflection at joint: Joint reflection is less than 0.05% so gain greater than 1,000 is allowed.

These properties are achieved through an advanced passive-active device integration technology based on quantum well intermixing (QWI). This technology is applicable to InGaAsP/InP materials at 1.3-1.55 μm, which do not require materials regrowth. In an exemplary embodiment of the QWI process, the QWI process involves ion-implantation with thin layer of oxides as implant mask, therefore enabling better control of area-specific bandgap shifts. In another embodiment of the QWI process, a "low-energy temperature-assisted ion-implantation quantum well intermixing" (LETAI-QWI) is used. The "low-energy temperature-assisted ion-implantation quantum well intermixing" process is described in patent "Method for shifting the bandgap energy of a quantum well layer, U.S. Pat. No. 6,878,562" and "Method for quantum well intermixing using pre-annealing enhanced defects, U.S. Pat. No. 6,984,538," and are hereby incorporated by reference. In an exemplary embodiment of the LETAI-QWI process for InGaAsP/InP materials, phosphorus ions are implanted near the surface of the wafer having low ion implantation energy of ~360 keV, at about 0.5-1.5 μm away from the quantum well structure. The implantation process is a controlled process in order to create point lattice vacancies or point defects. These point defects are then diffused down to the quantum well region through thermal process. This results in a large shift in energy bandgap of a value greater than 120 nm. This is done by inducing inter-diffusion of atoms between the quantum wells and barrier materials of quantum wells. The well is InGaAs and phosphorus ions are diffused from the InGaAsP barrier into the well, causing the well to be effectively narrower. This narrowing of the quantum well causes a blue shift in the energy bandgap. The LETAI-QWI process is an improvement over the already existing low-temperature QWI process. The LETAI-QWI process can also be applied to both unstrained and strained quantum wells. Polarization insensitive devices could be achieved using strained quantum well.

One-Step Process for Multiple Bandgaps:

In another exemplary embodiment of the LETAI-QWI process, multiple bandgap energies could be achieved by fabricating $SiO_2$ ion implant masks of differing thicknesses on the wafer. This is done by using a process referred to as photolithography having a gray-scale mask. The gray scale mask exposure results in variation in the photo-resist thickness, which is transferred into variations in the thickness of $SiO_2$. The different $SiO_2$ thicknesses block the ions in a different manner. This results in different ion dosages with only one implant, giving multiple bandgap energies. Therefore, 5-10 bandgap shifts could be achieved for the gain curve with basically a one-step process.

Excellent Gain Materials Quality:

Five different lasing wavelengths from Fabry-Perot lasers fabricated with one implant on one wafer are used. The lasing wavelength λ spans across a bandwidth of greater than 100 nm, with the most wavelength-shifted laser showing smaller change (of less than ten percent) in the lasing thresholds. Therefore, processed wafer could give much better gain material quality.

High Spatial Resolution:

The large energy shift in bandgap provides a good passive section with measured loss of less than 1/cm (4 dB/cm) including the free-carrier absorption of the p-side dopants. In an exemplary embodiment of the LETAI-QWI process, the LETAI-QWI process is capable of spatial resolution of ~1 μm as ion-implantation is a spatially well defined process. In case of thin-film nano-photonics, implantation is at ~0.5 μm away from the quantum well and expected spatial resolution is less than 0.5 μm. A 0.5 μm top InP will be etched away after QWI.

High-quality integrated device fabrication: Examples of high performance integrated devices have been previously realized using the LETAI-QWI bandgap engineering method. Some of these examples include:

(1) Polarization insensitive optical-amplifier photo-detector involving a SOA 214 integrated with 10 GHz PIN detector;

(2) Integrated DWDM grating optical spectrometer (integration of grating with detectors). In case of grating spectrometer, a propagation length of 1 cm and a propagation loss of less than fifty percent could be achieved for a large passive waveguiding region is bandgap shifted by a value greater than 120 nm.

The electronic-photonic device consolidates all the optical functions required in an optical transport system into a single device. Monolithic integration provides the greatest simplicity and reliability benefits when consolidating optical components into a single device. Complete photonic and electronic integration will increase subsystem functionality, robustness and design flexibility. Optical interconnects reduce electromagnetic interference and improve signal integrity better than traditional electrical-transport methods. By significantly reducing the number of fiber couplings between components, the device reduces the number of failure points and improves system reliability.

Figure 36:
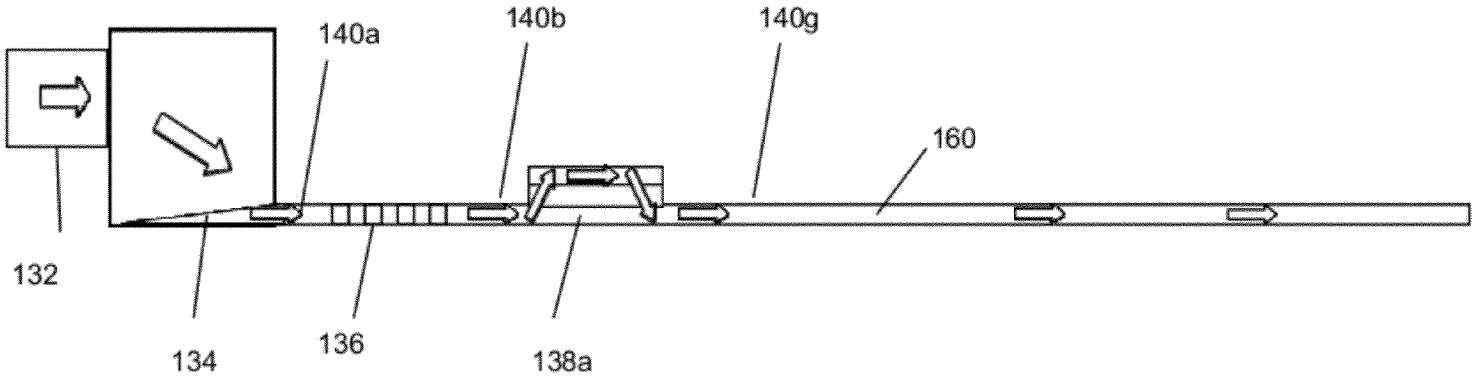
FIG. 36 illustrates a vertical structure for Input Port of an electronic-integration compatible photonic/nanophotonic integrated circuit with integrated chip-level optical network EIC-PIC+ICON device, in accordance with an embodiment of the invention.

FIG. 36 illustrates a vertical structure for Input Port of electronic-integration compatible photonic/nanophotonic integrated circuit with integrated chip-level optical network EIC-PIC+ICON device according to an embodiment of the invention.

Figure 29C:
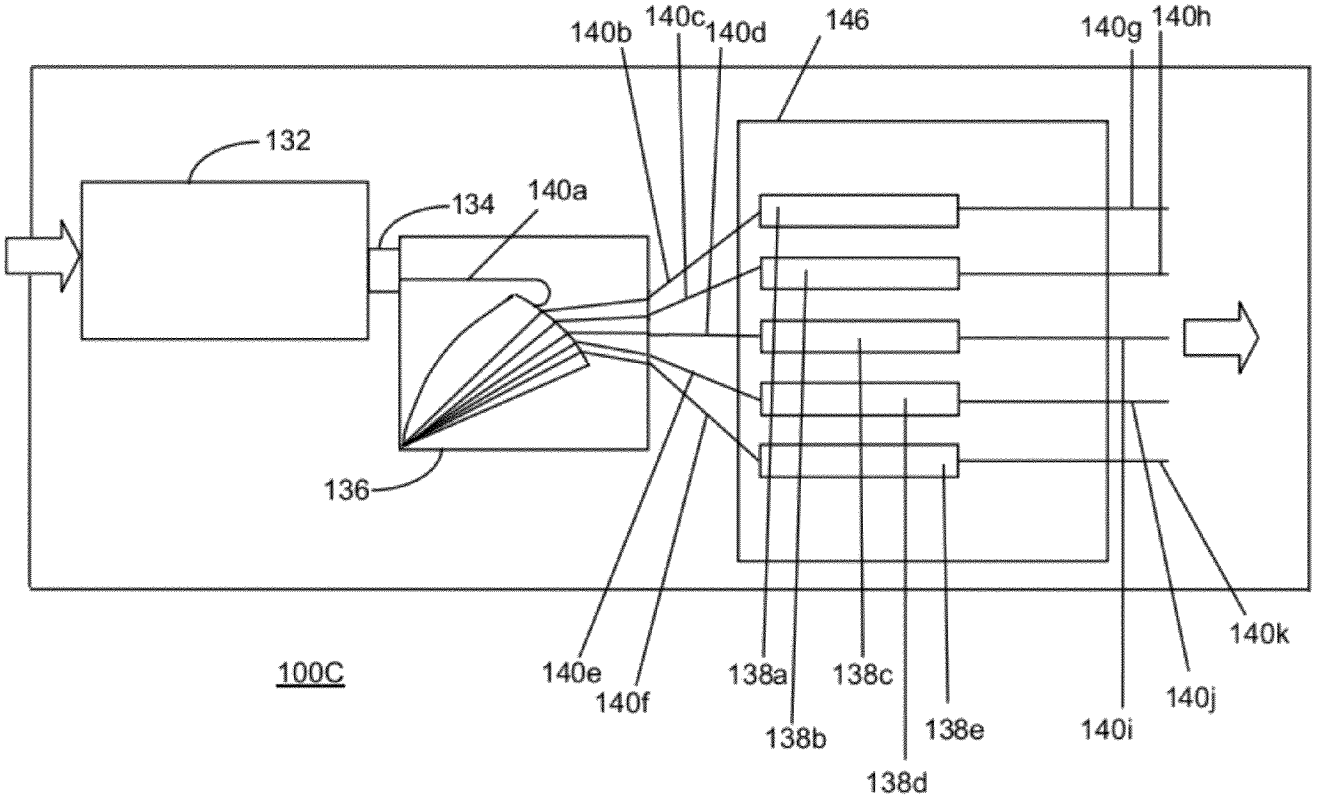
FIG. 29C illustrates a set-up for input part of electronic-photonic device, in accordance with an embodiment of the invention.

In the following description, references are made to FIG. 29C, FIG. 34 and FIG. 35. In an exemplary embodiment of the present invention, the Input Port 400 has a vertical structure shown in FIG. 36. For each input part 100C in the input port 400, optical beam from optical fiber 132 is coupled into optical coupler 134. Optical coupler 134 couples light into a passive waveguiding core layer 160. The waveguide core 160 is on top of a transparent lower waveguide cladding 164. The lower waveguide cladding 164 is on top of a substrate 166.

In accordance with an embodiment of the present invention, the optical wavelength demultiplexer 160 is fabricated into the waveguide core layer 160 and cladding layer 164. The optical wave in demultiplexer 136 is propagated in waveguide core layer 160. The output from the optical demultiplexer 136 is sent to the active device 138 through a vertical up-down tapered waveguide coupler that couples light from the passive waveguiding layer 160 layer to an Active Structure Layer 156. Active Structure Layer 156 is made up of optical materials that can provide amplification, absorption, or phase shifting of optical energy and can be semiconductor (InP, GaAs, GaN etc) or doped materials (erbium-doped glass or semiconductor) or any other optical material that can provide optical gain, loss, or phase shifting. Active device 138 can be powered electro-optically or all-optically, as is known to those skilled in the art. Active Structure Layer 156 is on top of an intermediate material layer 162. The intermediate material layer 162 is on top of the passive waveguiding layer 160. The active structure layer has a waveguide core 150 with a refractive index $n_{ACT\text{-}COR}$. The intermediate layer 162 is any optical dielectric material characterized by a refractive index $n_{INT}$. In an embodiment of the present invention, $n_{INT}$ has a value smaller than $n_{ACT\text{-}COR}$ and $n_{COR}$ so that the optical beam can be freely coupled from the passive layer 160 to the active layer 156 using the up-down tapered waveguide coupler 602a and from the active layer 156 to the passive layer 160 using the up-down tapered waveguide coupler 602b. In an exemplary preferred embodiment, the intermediate layer 162 is Silicon Nitride ($Si_3N_4$) with thickness of around 300 nm and refractive index $n_{INT}$=1.9 and the active layer is thin-film InP based active layer with refractive index of $n_{ACT\text{-}COR}$ of about 3.4. The passive layer is 300 nm thick silicon with refractive index of $n_{ACT\text{-}COR}$ of also about 3.4. Silicon Nitride has a thermal expansion coefficient between Silicon (Si) and Indium Phosphate (InP), which will enable the thermal stress due to mismatch of the thermal coefficients between the passive and active layer to be minimized (i.e. it acts as a stress releasing layer as is known to those skilled in the art). Silicon Nitride also has high thermal conductivity compared to other dielectrics such as silicon dioxide, which will help in dissipating heat from the active devices to the silicon substrate. As is known to those skilled in the art, in one embodiment the InP based active layer comprises an InP layer 156 with total thickness of 300 nm and at the center of this layer is a quantum well structure 150 with five InGaAs quantum wells having thickness of 8 nm for each quantum well spaced by 10 nm of InP. The InP layer 148 above the quantum well structure is n-doped and the InP layer 152 below the quantum-well layer is p-doped. The n and p doping enable this active layer to be electrically pumped to achieve optical gain.

The refractive index of $n_{INT}$ does not have to be smaller than $n_{COR}$ and $n_{ACT\text{-}COR}$. In another embodiment, the layer 162 has a refractive index $n_{INT}$ that can be comparable to or larger than either $n_{COR}$ or $nACT_{\text{-}COR}$ or both or layer 162 can be entirely omitted. In this embodiment, energy is leaked from the passive layer 160 to the active layer 156 so that the light beam can interact with the active materials.

Light beam from active device 138 is coupled down to the passive layer at the output and the beam at the output is transmitted to the Interior Part described below.

Figure 37:
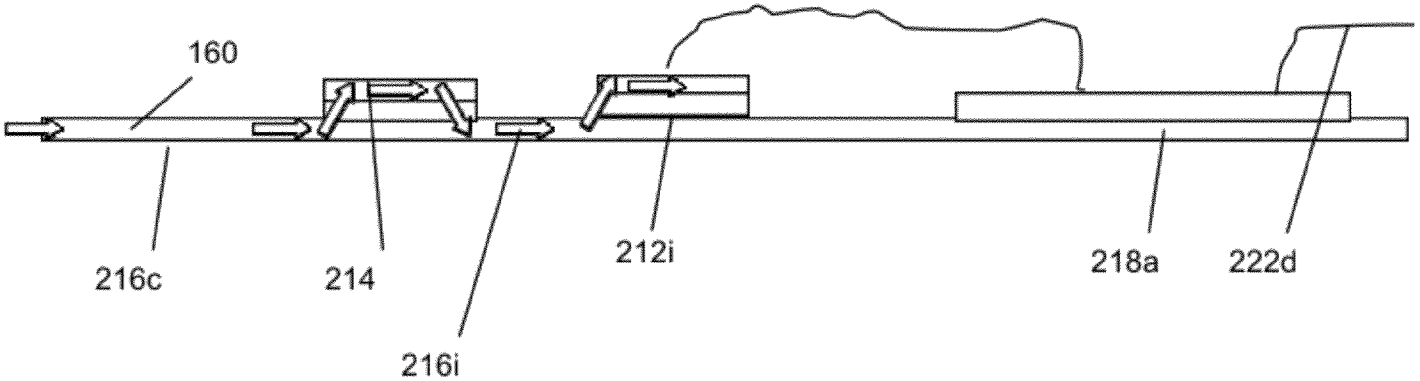
FIG. 37 illustrates a vertical structure for Interior Part of electronic-integration compatible photonic/nanophotonic integrated circuit with integrated chip-level optical network EIC-PIC+ICON device in accordance with an embodiment of the invention.

FIG. 37 illustrates vertical structure for Interior Part of electronic-integration compatible photonic/nanophotonic integrated circuit with integrated chip-level optical network EIC-PIC+ICON device according to an embodiment of the invention.

In the following description, references are made to FIG. 30 and FIG. 35. The typical optical beam path in the interior part involve an optical waveguide 216 to bring the light beam in from the beam output ports of Input Port 400. The beam is then further split by beam splitters if more than one beam destinations are needed, or transmitted through optical amplifier if amplification of the light power is needed. The beam or split beams are then subsequently detected by an integrated photodetector. In an exemplary embodiment of the present invention, Interior Part 200 has a vertical structure shown in FIG. 37. The light beam from Input Port 400 enters Interior Part 200 via an optical waveguide 216 by guiding in the passive waveguiding layer 160. The waveguide core 160 is on top of a transparent lower waveguide cladding 164 and below the intermediate layer 162, and the lower waveguide cladding 164 is on top of a substrate 166. Layers 160, 162, 164, 166, are as described above in FIG. 35. In a presently preferred exemplary embodiment, the optical beam has optical wavelengths around 1.5 micrometers (1.5 μm), the waveguide core layer 160 is silicon, which is transparent at the wavelength of 1.5 μm. The silicon waveguide core layer 160 has refractive index $n_{Si}$=3.5, and the thickness of layer 160 is 300 nanometers (300 nm). Furthermore, the cladding material layer 164 is silicon dioxide ($SiO_2$) with refractive index $n_{SiO2}$=1.5 and a thickness of 300 nm or larger. The intermediate layer 162 is silicon nitride with a thickness of 300 nm. The substrate material 166 is silicon (Si) substrate. In this preferred embodiment, the waveguide core 160, lower waveguide cladding 164, and substrate 166 are formed by a Silicon-On-Insulator (SOI) substrate as is known to those skilled in the art.

In an embodiment of the invention, the optical wavelength waveguide 216 is fabricated into the waveguide core layer 160 and cladding layer 164. The optical waveguide 216 is propagated in waveguide core layer 160. The output from the optical waveguide 216 is sent to the active device 214 through a vertical up-down tapered waveguide coupler 602a that couples light from the passive waveguiding layer 160 layer to an Active Structure Layer 156. In one embodiment, active device 214 acts as an optical amplifier and amplifies the light beam power. The beam traveling through Active Device 214 at active layer 166 is coupled down to the passive layer 160 using up-down tapered waveguide coupler 602b. Active Structure Layer 156 is as described above in FIG. 35. In a preferred embodiment, the intermediate layer 162 is Silicon Nitride ($Si_3N_4$) with thickness of around 300 nm and refractive index $n_{INT}$=1.9 And the active layer is thin-film InP based active layer with refractive index of $n_{ACT\text{-}COR}$ of about 3.4. The passive layer is 300 nm thick silicon with refractive index of $n_{ACT\text{-}COR}$ of also about 3.4. As is known to those skilled in the art, in one embodiment the InP based active layer comprises an InP layer with total thickness of 300 nm and at the center of this layer is a quantum well structure with five InGaAs quantum wells having thickness of 8 nm for each quantum well spaced by 10 nm of InP. The InP above the quantum well structure is n-doped and the InP below the quantum-well layer is p-doped. The n and p doping enable this active layer to be electrically pumped to achieve optical gain.

Beam from the output of Active Device 214 at the passive layer 160 is propagated along a passive waveguide 216 at the passive layer 160. The beam is subsequently sent to active device 212 through a vertical up-down tapered waveguide coupler 602a that couples light from the passive waveguiding layer 160 layer to an Active Structure Layer 156. In one embodiment, active device 212 acts as an optical photodetector and detects the light beam power. The photodetector 212 converts the optical power to electrical power. The electrical current from the photodetector is transmitted to an electrical circuit 218a via an electrical wire 220c. The electrical circuit 218a processes the data now carried by electrical current and voltage. The electrical circuits 218a to 218d produce electrical outputs carried by electrical wires 222a to 222e. The electrical outputs are sent to the Output Port 402. In the Interior Part, there are optical beam path ways that are not terminated by a photodetector but are processed optically and the optical data after processing is sent to the output port via an optical waveguide 216k in the transparent waveguiding layer 160. The optical waveguide 216, electrical circuit 218, electrical wires 220, and electrical wires 222 are further described in detail later.

Figure 38:
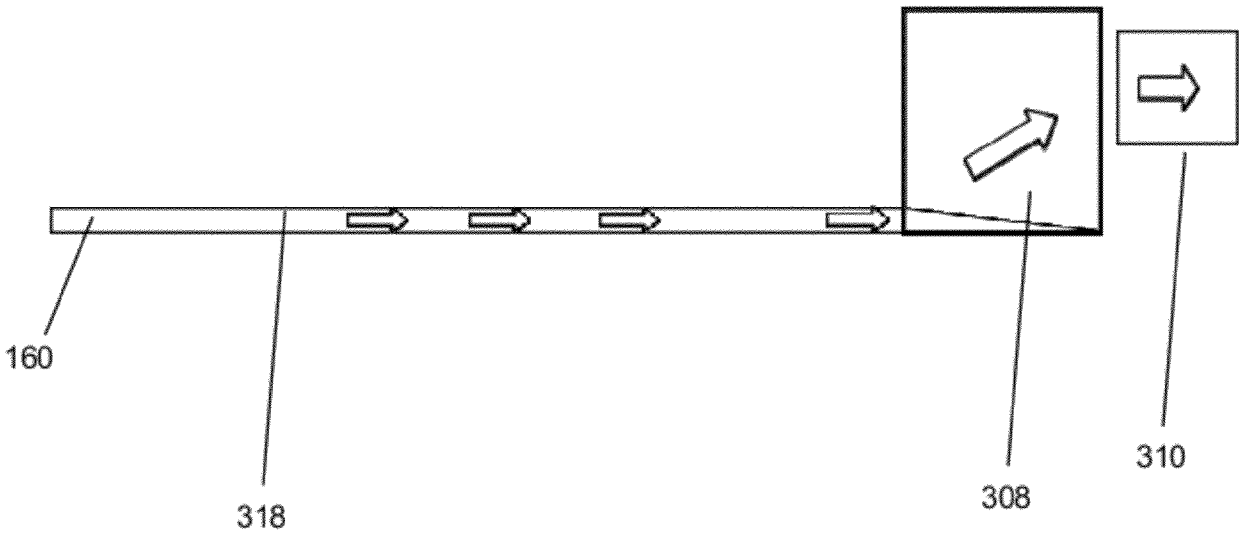
FIG. 38 illustrates a vertical structure for Output Port of an electronic-integration compatible photonic/nanophotonic integrated circuit with integrated chip-level optical network EIC-PIC+ICON device in accordance with an embodiment of the invention.
Figure 39:
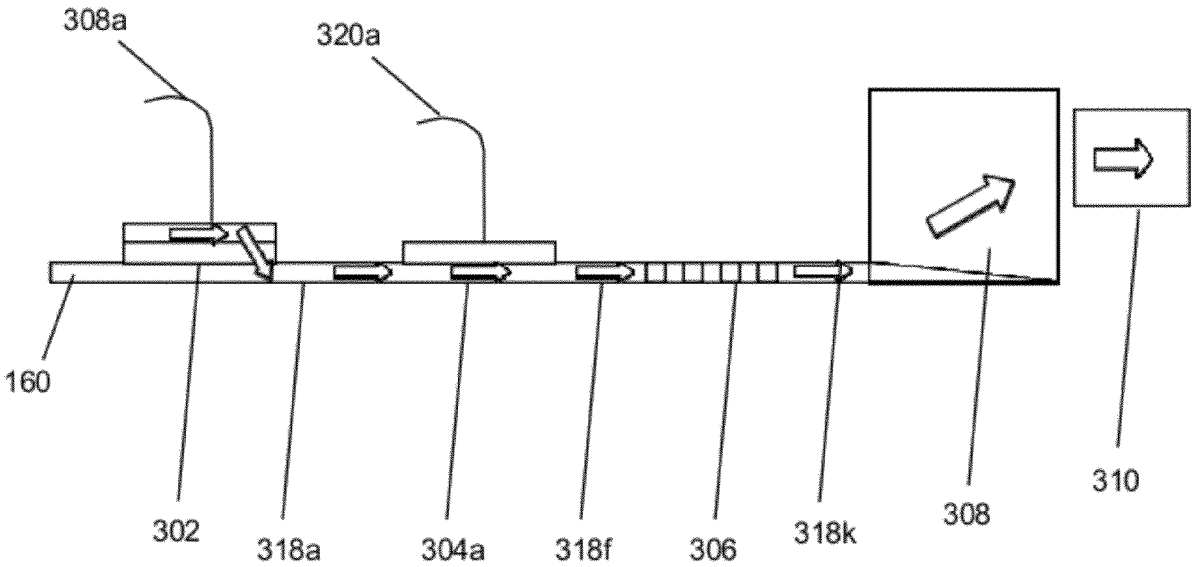
FIG. 39 illustrates a vertical structure for Output Port of an electronic-integration compatible photonic/nanophotonic integrated circuit with integrated chip-level optical network EIC-PIC+ICON device in accordance with another embodiment of the invention.

FIG. 38 and FIG. 39 illustrate vertical structure for Output Port of electronic-integration compatible photonic/nanophotonic integrated circuit with integrated chip-level optical network EIC-PIC+ICON device in accordance with an embodiment of the invention.

To describe these figures, reference will be made to FIGS. 31 and 35. There are optical beam paths and electrical signal paths that enter the Output Port 402 from the interior Part 200. The typical optical beam path in the output port involve an optical waveguide 318 to bring the light beam in from the beam output ports of Interior Part 200. The beam is then sent to an optical fiber coupling optics 308 to couple light into an optical fiber 310. In an exemplary embodiment of the present invention, Output Part 316 in Output Port 402 has a vertical structure as explained in conjunction with FIG. 39. The light beam from Interior Part 200 enters Output Port 402 through an optical waveguide 318.

As illustrated in FIG. 35, the waveguide core 160 is on top of a transparent lower waveguide cladding 164 and below the intermediate layer 162, and the lower waveguide cladding 164 is on top of a substrate 166. In a presently preferred exemplary embodiment, the optical beam has optical wavelengths around 1.5 micrometers (1.5 μm), the waveguide core layer 160 is silicon, which is transparent at the wavelength of 1.5 μm. The silicon waveguide core layer 160 has refractive index $n_{Si}$=3.5, and the thickness of layer 160 is 300 nanometers (300 nm). Furthermore, the cladding material layer 164 is silicon dioxide ($SiO_2$) with refractive index $n_{SiO2}$=1.5 and a thickness of 300 nm or larger. The intermediate layer 162 is silicon nitride with a thickness of 300 nm. The substrate material 166 is silicon (Si) substrate. In this preferred embodiment, the waveguide core 120, lower waveguide cladding 164, and substrate 166 are formed by a Silicon-On-Insulator (SOI) substrate as is known to those skilled in the art.

In accordance with an embodiment of the present invention, the optical wavelength waveguide 318 is fabricated into the waveguide core layer 160 and cladding layer 164. The optical waveguide 318 is propagated in waveguide core layer 160. The output from the optical waveguide 318 is sent to the fiber coupling optics 308 to couple light into an optical fiber 310 as shown in FIG. 39.

The typical electrical signal path in the output port involve an electrical wire 320 to bring the electrical signals in from the electrical signal output wire 222 of Interior Part 200. The electrical signal is then sent to modulate a semiconductor laser 302 through direct current modulation. Alternatively, electrical signal through electrical wire 320 is sent to modulate the laser beam from the laser 302 by modulating an optical intensity modulator 304 connected to the output of the semiconductor laser 302 as illustrated in FIG. 31. The details described here are for illustrative purpose only and they do not limit the scope of the invention in any way. It is assumed that the wire 320 is used to modulate the optical modulator 304. According to an embodiment of the present invention, Output Part 300 in Output Port 402 has a vertical structure. The semiconductor laser 302 is fabricated into an active layer structure 156. Light output from laser 302 is sent to a passive waveguide 318 through a vertical up-down tapered waveguide coupler 602b that couples light from the active structure 156 to a passive waveguiding layer 160. The output of the waveguide 318 is sent to a silicon modulator. In that case the silicon modulator is fabricated into the waveguide core layer 160 and cladding layer 164. The output of the silicon modulator is sent to a silicon wavelength multiplexer 306. The wavelength multiplexer 306 is fabricated into the waveguide core layer 160 and cladding layer 164. The output of wavelength multiplexer 306 is sent to a passive waveguide 318. The output from the optical waveguide 318 is sent to the fiber coupling optics 308 to couple light into an optical fiber 310.

Figure 40:
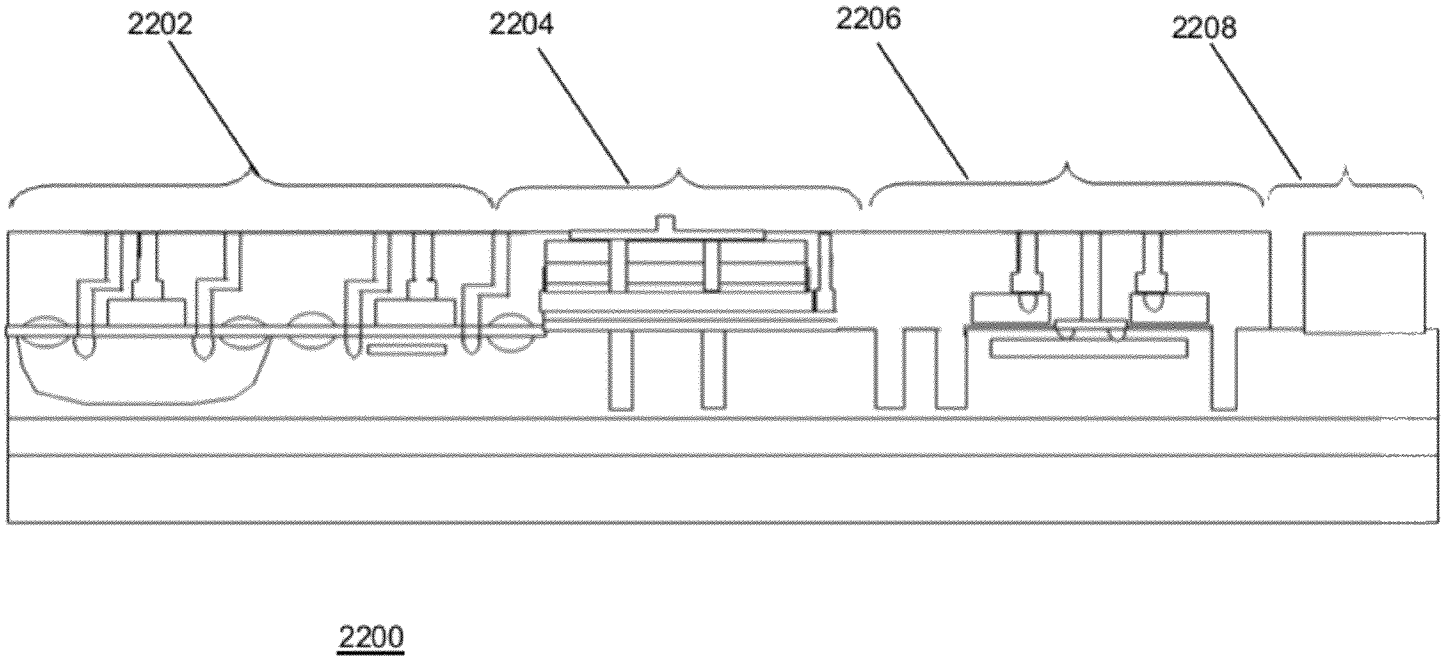
FIG. 40 illustrates general cross section of an electronic-integration compatible photonic/nanophotonic integrated circuit EIC-PIC device according to an embodiment of the invention.

FIG. 40 illustrates general cross section of an electronic-integration compatible photonic/nanophotonic integrated circuit EIC-PIC device according to an embodiment of the invention.

After the fabrication process, a general cross section of an EIC-PIC 2200 fabricated is shown in FIG. 40 in which there are 4 mains types of device area, namely: (1) electronic integrated circuit area such as CMOS electronic circuit area 2202; (2) active photonic device area 2204 such as that comprising active photonic devices based on InP; (3) passive photonic device or active silicon photonic device area 2206, including passive photonic devices such as waveguide, beam splitter, and wavelength multiplexer and demultiplexer. They also include active photonic devices that made use of silicon such as silicon based EO modulators; and (4) Fiber coupling optic area 2208 such as that comprising superlens.

General Specifications of the Devices Fabrication:

The various specifications of the above exemplary device fabrication for an EP chip are given for the purpose of illustration and not limitation for a currently preferred exemplary embodiment of an EIC-PIC. For example, the CMOS process may be replaced by other electronic integrated circuit fabrication or CMOS fabrication processes as long as the low-temperature photonic active-device processes done with wafer bonding is performed after all the high-temperature processes in the electronic integrated circuit fabrication or CMOS fabrication processes. The silicon photonic device fabrication can be done after or before the high-temperature processes. The electronic integrated circuit may be necessarily based on silicon and can be based on GaN material or other semiconductor materials (InP and GaAs).

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

[1. A method for integrating one or more photonic devices on a substrate with a semiconductor device, wherein the semiconductor device comprises one or more electronic devices, the method comprising:

a. creating a first optical cladding layer on a first substrate;

b. creating a first optical core layer on top of the first optical cladding layer, wherein the first optical cladding layer and the first optical core layer form a first optical waveguide;

c. creating a first optical-fiber coupling lens on the first optical waveguide;

d. creating a first optical device, wherein an optical beam in the first waveguide propagates substantially in the first optical core layer;

e. optically connecting the first optical device to the first waveguide;

f. creating a first interspaced dielectric structure layer on top of the first optical core layer;

g. creating a second optical core layer on top of the first interspaced dielectric structure layer; and h. creating a second optical device with optical beam propagating substantially in the second optical core layer;

i. mounting a first optical fiber on the first substrate to facilitate a coupling of light beam energy between the first optical fiber and the first optical waveguide.]

[2. The method of claim 1, wherein the first substrate is a silicon-on-insulator wafer, the first optical cladding layer is a silicon dioxide layer, and the first optical core layer is a silicon-on-insulator wafer.]

[3. The method of claim 1, wherein the first optical-fiber coupling lens is a superlens.]

[4. The method of claim 1, wherein the first optical device is one of an optical waveguide, an optical wavelength multiplexer, an optical wavelength demultiplxer, an optical grating, an optical beam splitter, a polarization beam splitter, an optical isolator, a polarization rotator, an optical interferometer, an optical modulator, an optical ring resonator, an optical disk resonator, an optical curved reflector, an optical mirror, an optical amplifier, an optical detector, a laser, a light-emitting device, a nonlinear-optical device, a photonic transistor, a optical harmonic frequency generator, and an all-optical device.]

[5. The method of claim 1, wherein the first substrate comprises a trench to support the optical fiber.]

[6. The method of claim 1, wherein the first substrate comprises a V-groove to support the optical fiber.]

[7. The method of claim 1, wherein the optical beam enters the second optical device through a tapered waveguide structure made from the second optical core layer.]

[8. The method of claim 1, wherein the optical beam exits the second optical device through a tapered waveguide structure made from the second optical core layer.]

[9. The method of claim 1, wherein the second optical core layer is fabricated by wafer bonding.]

[10. The method of claim 1, wherein the second optical core layer is fabricated by local-area wafer bonding.]

[11. The method of claim 10, wherein the steps a-e are performed by using a process used in fabricating electronic devices.]

[12. The method of claim 1, wherein the electronic devices are one of an electronic transistor, an electronic diode, a resistor, a capacitor, or an inductor.]

[13. The method of claim 1, wherein the electronic devices form a CMOS integrated circuit.]

[14. The method of claim 1, wherein the semiconductor device comprises one or more Complementary Metal-Oxide-Semiconductor (CMOS) devices, the method further comprising:

a. growing a first dielectric layer and a second dielectric layer on a nano-waveguide and a disk;

b. creating a deposition layer on the first dielectric layer and the second dielectric layer;

c. creating a source region and a drain region by implanting N+ dopants and P+ dopants on the deposition layer, wherein an integrated structure is formed.]

[15. The method of claim 14, wherein the one or more Complementary Metal-Oxide-Semiconductor (CMOS) devices are integrated by using a standard CMOS fabrication process.]

[16. The method of claim 1, wherein the second optical core layer is a III-V compound semiconductor layer.]

[17. The method of claim 1 further comprising performing Quantum Well Intermixing (QWI) on the second optical core layer.]

[18. A semiconductor device manufactured by the method as claimed in claim 14.]

[19. The semiconductor device of claim 18 further comprising a plurality of electronic circuit structures.]

[20. The semiconductor device of claim 19, wherein the plurality of electronic circuit structures further comprise at least one of an active electronic device and a passive electronic device.]

[21. The semiconductor device of claim 18 further comprising a plurality of photonic circuit structures.]

[22. The semiconductor device of claim 21, wherein the plurality of photonic circuit structures further comprise at least one of an active photonic device and a passive photonic device.]

*23. A method for integrating one or more photonic devices on a substrate, the method comprising:*

*a. providing a substrate with one or more electronic devices on one or more connected or disjointed electronic device areas on a first substrate;*

*b. providing an area of the first substrate having a layer structure with a first optical cladding layer and a first optical core layer, wherein part of the first optical cladding layer and the first optical core layer form a first optical waveguide;*

*c. providing a first optical device;*

*d. optically connecting the first optical device to the first waveguide;*

*e. creating a second optical core layer above the first waveguide via a local-area wafer bonding process comprising:*

*i. creating a first material layer structure on a second substrate, wherein the first material layer structure comprises plurality of material layers in which at least one of the plurality of material layers comprises a second optical core layer,*

*ii. attaching a handling fixture to the first material layer structure,*

*iii. removing the second substrate, leaving the handling fixture attached to the first material layer structure without the second substrate such that one or more areas on the first material layer structure, that will not be used for fabricating photonic devices and will later cover over the first electronic device areas during the wafer bonding process, are pre-etched away with indentation; and*

*f. bonding the first material structure to the top surface of the first waveguide either directly or via an additional dielectric layer between the first material layer structure and the first optical core.*

*24. The method of claim 23, further comprising creating the first optical device along with the first optical core layer such that an optical beam in the first optical device propagates substantially in the first optical core layer.*

*25. The method of claim 24, wherein the first optical device is one of an optical waveguide, an optical wavelength multiplexer, an optical wavelength demultiplexer, an optical grating, an optical beam splitter, a polarization beam splitter, an optical isolator, a polarization rotator, an optical interferometer, an optical modulator, an optical ring resonator, an optical disk resonator, an optical curved reflector, an optical mirror, an optical amplifier, an optical detector, a laser, a light-emitting device, a nonlinear-optical device, a photonic transistor, an optical harmonic frequency generator, and an all-optical device.*

*26. The method of claim 23, further comprising creating a second optical device along with the second optical core layer such that an optical beam in the second optical device propagates substantially in the second optical core layer.*

*27. The method of claim 23 wherein the first optical cladding layer is air or dielectric material.*

*28. The method of claim 23, wherein one or more electronic devices or one or more photonic devices are created on the substrate or any of the optical layers.*

*29. The method of claim 28, wherein the electronic devices are one of an electronic transistor, an electronic diode, a resistor, a capacitor, or an inductor.*

*30. The method of claim 28, wherein the electronic devices form a CMOS integrated circuit.*

*31. The method of claim 28, wherein the semiconductor device comprises one or more Complementary Metal-Oxide-Semiconductor (CMOS) devices, the method further comprising:*

*a. growing a first dielectric layer and a second dielectric layer on a nano-waveguide and a disk;*

*b. creating a deposition layer on the first dielectric layer and the second dielectric layer; and*

*c. creating a source region and a drain region by implanting N+ dopants and P+ dopants on the deposition layer, wherein an integrated structure is formed.*

*32. The method of claim 31, wherein the one or more Complementary Metal-Oxide-Semiconductor (CMOS) devices are integrated by using a standard CMOS fabrication process.*

*33. A semiconductor device manufactured by the method as claimed in claim 31.*

*34. The semiconductor device of claim 33 further comprising a plurality of electronic circuit structures.*

*35. The semiconductor device of claim 34, wherein the plurality of electronic circuit structures further comprise at least one of an active electronic device and a passive electronic device.*

*36. The semiconductor device of claim 33 further comprising a plurality of photonic circuit structures.*

*37. The semiconductor device of claim 36, wherein the plurality of photonic circuit structures further comprise at least one of an active photonic device and a passive photonic device.*

*38. The method of claim 23, wherein the first substrate is a silicon-on-insulator wafer, the first optical cladding layer is a silicon dioxide layer, and the first optical core layer is the top silicon layer of a silicon-on-insulator wafer.*

39. The method of claim 23, wherein the first substrate comprises a trench to support an optical fiber.

40. The method of claim 23, wherein the first substrate comprises a V-groove to support an optical fiber.

41. The method of claim 23, wherein the optical beam enters the second optical device through a tapered waveguide structure made from the second optical core layer.

42. The method of claim 23, wherein the optical beam exits the second optical device through a tapered waveguide structure made from the second optical core layer.

43. The method of claim 23, wherein the steps a-d are performed by using a process used in fabricating electronic devices.

44. The method of claim 23, wherein the second optical core layer is a III-V compound semiconductor layer.

45. The method of claim 23 further comprising performing Quantum Well Intermixing (QWI) on the second optical core layer.

46. The method of claim 23, wherein a first coupling lens further couples light between an optical fiber and a waveguide on the substrate.

47. The method of claim 46, wherein the first optical-fiber coupling lens is a superlens.

48. The method of claim 46, wherein the first coupling lens is a superlens and the superlens has a width WSPL, height HSPL and length LSPL fabricated on top of the waveguide by depositing multi-layers of alternating dual materials.

49. The method of claim 48, wherein the dual materials are Silicon (Si) and Silicon Dioxide (SiO2).

50. The method of claim 48, wherein the superlens dimensions are WSPL=20 μm, HSPL=15 μm, and LSPL=20 μm.

51. The method of claim 49, wherein the thickness ratio of Silicon to Silicon Dioxide is varied such that the effective index of the superlens is n=3.5 at the bottom of the lens near the surface of the waveguide and is at least partially of silicon, and the effective index of the superlens is n=1.5 near the top of the superlens and is at least partially of silicon dioxide.

52. The method of claim 46, wherein the optical fiber is an optical fiber with a full-width-half maximum (FWHM) mode size diameter of 8 μm.

53. The method of claim 51, wherein the index variation of the superlens is such that the mode from the waveguide will expand in the lens such that the strong lensing effect in the superlens results in an output beam of a larger diameter.

54. The method of claim 53, wherein the wavefront is a flat wavefront at the output surface of the superlens.

55. The method of claim 46, wherein the optical fiber is held from below by a structure having a V-groove or a trench configuration, fabricated on the substrate that holds the optical fiber at the right height with respect to the lens optical center to achieve maximum coupling of light beam energy between the optical fiber and the waveguide on chip.

56. The method of claim 55, wherein the structure is a trench of rectangular shape or of a shape adapted to hold the fiber in steady position.

57. The method of claim 55 wherein additional materials between substrate and fiber hold the fiber in place.

58. The method of claim 23, wherein the Bonding process is one that involves at least the following steps:

a. making a material layer structure on top of a wafer substrate, the material layer including an etch-stop layer first made on the substrate;

b. making a structure containing the second optical core layer on top of the etch-stop layer;

c. bonding a handling wafer to the second optical core layer side of the wafer, exposing the substrate;

d. etching the exposed substrate by an etching process that stops at the etch-stop layer, resulting in a new exposed surface;

e. initiating a wafer bonding process by pressing the new exposed surface onto the material at the top surface of the first optical core layer under pressure and elevated temperature;

f. removing the handling wafer resulted in the second optical core layer above the first optical core layer.

59. The method of claim 58, wherein the wafer substrate is indium phosphide (InP).

60. The method of claim 59, wherein the etch-stop layer in claim 59 is InGaAsP compound semiconductor material.

61. The method of claim 58, wherein the second optical core layer is an active optical material layer.

62. The method of claim 61, wherein the second optical core layer contains semiconductor quantum wells.

63. The method of claim 58, wherein the etched stop layer and active optical material layer are grown epitaxially on top of an InP substrate.

64. The method of claim 58, wherein the handling wafer is bonded to the second optical core layer side of the wafer using Benzocyclobutene (BCB) polymer.

65. The method of claim 58, wherein the etching process of step (d) of claim 58 is a selective chemical etching process that etches an InP substrate material at a rate faster than etching an etch-stop InGaAsP layer material.

66. The method of claim 65, wherein the chemical etching is done by hydrochloric acid (HCl).

67. The method of claim 58, wherein after the wafer bonding, resulted in a Direct Double Optical Layer structure for an Electronic Integration Compatible Photonic Integrated Circuit (DDOL-EIC-PIC).

68. The method of claim 58, wherein a thin interspaced dielectric layer is grown on the new exposed surface of step (d) and a thin interspaced dielectric layer is also grown on the top surface of the first optical core.

69. The method of claim 68, the interspaced dielectric layer is silicon nitride.

70. The method of claim 58, wherein in step (e), wafer bonding process is initiated by pressing the thin interspaced dielectric layer on the new exposed surface of step (d) against the interspaced dielectric layer on the top surface of the first optical core under external pressure and elevated temperature.

71. The method of claim 70, wherein the wafer bonding, results in an Indirect Double Optical Layer structure for an Electronic Integration Compatible Photonic Integrated Circuit (IDDOL-EIC-PIC).

72. The method of claim 58, wherein in step (e) of claim 58, the surfaces to be bonded is subjected to the plasma treatment to create hydrophilic surfaces before bonding.

73. The method of claim 72, wherein the plasma treatment is achieved with 1-minute exposure to oxygen plasma.

74. The method of claim 70, wherein the interspaced dielectric layer surfaces to be bonded is subjected to the plasma treatment to create hydrophilic surfaces before bonding.

75. The method of claim 74, wherein the plasma treatment is achieved with 1-minute exposure to oxygen plasma.

76. The method of claim 58, wherein in step (e), the bonding is achieved at an elevated temperature above 150° C. and less than 400° C.

*77. The method of claim 58, wherein the handling wafer is InP wafer and is selectively etched away using HCL in step (f).*

*78. The method of claim 23, wherein the wafer bonding involves a second wafer made with the second optical core layer with a second surface.*

*79. The method of claim 78, wherein the top exposed surface of the first optical core layer on the substrate is the first surface, and wafer bonding involves pressing the second surface of the second optical core layer onto the first surface of the first optical core layer under pressure and elevated temperature.*

*80. The method of claim 79, wherein before the pressing of the two surfaces, certain areas of the second surface that are not later be fabricated with photonic devices are pre-etched away with indentations resulting in a new second surface in such a way that the during the pressing down process, the new second surface touches only the area designated as photonic areas on the substrate wafer and not the electronic areas on the substrate wafer.*

*81. The method of claim 80, wherein the wafer bonding process resulted in local-area wafer bonding in which one or plurality of areas designed as the photonic areas are bonded with the second optical core layer.*

*82. The method of claim 23 wherein an additional step is added that includes covering the photonic areas with protective materials during the high-temperature electronic fabrication or CMOS process, and then uncover the protected photonic areas by removing the photonic-area protective materials so that a fresh silicon surface is uncovered for performing the wafer bonding.*

*83. The method of claim 82 wherein the protective material is In2O3.*

*84. The method of claim 62 wherein a quantum-well intermixing process to shift the bandgap energy of the quantum well is performed before the wafer bonding.*

*85. The method of claim 84 wherein the quantum well intermixing is "low-energy temperature-assisted ion-implantation quantum well intermixing" (LETAI-QWI).*

*86. The method of claim 62 wherein a quantum-well intermixing process to shift the bandgap energy of the quantum well is performed after the wafer bonding.*

*87. The method of claim 86 wherein the quantum well intermixing is "low-energy temperature-assisted ion-implantation quantum well intermixing" (LETAI-QWI).*

*88. The method of claim 23, wherein the second optical core layer is made of material selected from the group consisting of: Indium Phosphide (InP), Gallium Arsenide (GaAs), Indium Gallium Arsenide (InGaAs), Indium Gallium Arsenide Phosphide (InGaAsP), Indium Aluminum Gallium Arsenide (InAlGaAs), Aluminum Arsenide (AlAs), Aluminum Gallium Arsenide (AlGaAs), Indium Gallium Aluminum Phosphide (InGaAlP), Indium Gallium Phosphide (InGaP), Gallium Nitride (GaN), Aluminum Nitride (AIN), Gallium Aluminum Nitride (GaAlN), Gallium Phosphide (GaP), Aluminum Phosphide (AlP), Aluminum Antimonide (AlSb), Gallium Antimonide (GaSb), Zinc selenide (ZnSe), Zinc Sulphide (ZnS), Cadmium Sulphide (CdS), Silicon Carbide (SiC), Silicon Germanium (SiGe), Indium Gallium Antimonide (InGaSb), or Indium Antimonide (InSb), Germanium (Ge), Silicon-Germanium (SiGe), or two or more of the combinations thereof.*

*89. The method of claim 23, wherein the dielectric material layer including the first optical cladding layer and the first optical core layer are made of material selected from the group consisting of: tantalum pentoxide (Ta2O5), zirconium oxide (ZrO2), niobium pentoxide (Nb2O5), hafnium oxide (HfO2), zinc oxide (ZnO), germanium oxide (GeO2), lead oxide (PbO), yttrium oxide (Y2O3), aluminum oxide (Al2O3), silicon carbide (SiC), titanium carbide (TiC), titanium nitride (TiN), chromium nitride (CrN), carbon nitride (CN), carbon boride (CB), aluminum nitride (AlN), zinc selenide (ZnSe), barium fluoride (BaF2), magnesium fluoride (MgF2), Diamond like Carbon (DLC), Benzocyclobutene (BCB), cyclized transparent optical polymer (CYTOP), or a polymer of imide monomers (Polyimide), or two or more of the combinations thereof.*

* * * * *